United States Patent
Hampden-Smith et al.

(10) Patent No.: US 7,732,372 B2
(45) Date of Patent: Jun. 8, 2010

(54) PARTICULATE ABSORBENT MATERIALS

(75) Inventors: Mark J. Hampden-Smith, Albuquerque, NM (US); Paolina Atanassova, Albuquerque, NM (US); Jian-Ping Shen, Albuquerque, NM (US); James Brewster, Rio Rancho, NM (US); Paul Napolitano, Albuquerque, NM (US); Agathagelos Kyrlidis, Malden, MA (US)

(73) Assignee: Cabot Corporation, Boston, MA (US)

( * ) Notice: Subject to any disclaimer, the term of this patent is extended or adjusted under 35 U.S.C. 154(b) by 1447 days.

(21) Appl. No.: 10/996,672

(22) Filed: Nov. 24, 2004

(65) Prior Publication Data

US 2005/0230659 A1    Oct. 20, 2005

Related U.S. Application Data

(63) Continuation-in-part of application No. 10/723,424, filed on Nov. 26, 2003, now Pat. No. 7,267,811.

(60) Provisional application No. 60/525,462, filed on Nov. 26, 2003, provisional application No. 60/525,467, filed on Nov. 26, 2003.

(51) Int. Cl.
*B01J 20/00*    (2006.01)
(52) U.S. Cl. ..................... 502/407; 502/414
(58) Field of Classification Search ................. 502/407, 502/414, 415, 439
See application file for complete search history.

(56) References Cited

U.S. PATENT DOCUMENTS

| | | | |
|---|---|---|---|
| 2,155,119 A | 4/1939 | Ebner | 23/1 |
| 3,516,808 A | 6/1970 | Curran et al. | 48/197 |
| 3,847,837 A | 11/1974 | Boryta | 252/468 |
| 3,865,924 A | 2/1975 | Gidaspow et al. | 423/230 |
| 4,023,961 A | 5/1977 | Douglas et al. | 75/355 |
| 4,089,809 A | 5/1978 | Farrior, Jr. | 252/459 |
| 4,177,158 A | 12/1979 | Blue | 252/189 |
| 4,283,204 A | 8/1981 | Savage | 95/27 |
| 4,313,820 A | 2/1982 | Farha, Jr. et al. | 208/213 |
| 4,330,430 A | 5/1982 | Lancet et al. | 502/55 |
| 4,489,047 A | 12/1984 | de Jong et al. | 423/230 |
| 4,624,941 A | 11/1986 | Bendt et al. | 502/302 |
| 4,729,889 A | 3/1988 | Flytani-Stephanopoulos et al. | 423/593.1 |
| 4,755,459 A | 7/1988 | Pearson et al. | 437/7.36 |
| 4,775,396 A | 10/1988 | Rastelli et al. | 95/95 |
| 4,810,266 A | 3/1989 | Zinnen et al. | 55/68 |
| 4,910,180 A | 3/1990 | Berndt et al. | 502/304 |
| 5,186,727 A | 2/1993 | Chang | 95/117 |
| 5,214,019 A | 5/1993 | Nalette et al. | 502/400 |
| 5,244,641 A | 9/1993 | Khare | 423/220 |
| 5,520,894 A | 5/1996 | Heesink et al. | 423/230 |
| 5,539,205 A | 7/1996 | Reale | 250/326 |
| 5,554,739 A | 9/1996 | Belmont | 534/885 |
| 5,614,472 A | 3/1997 | Riddle et al. | 505/425 |
| 5,672,198 A | 9/1997 | Belmont | 106/31.75 |
| 5,851,280 A | 12/1998 | Belmont et al. | 106/472 |
| 5,900,029 A | 5/1999 | Belmont et al. | 8/550 |
| 5,958,361 A | 9/1999 | Laine et al. | 423/610 |
| 5,972,835 A | 10/1999 | Gupta | 502/439 |
| 5,998,328 A * | 12/1999 | Dawes et al. | 502/182 |
| 6,042,643 A | 3/2000 | Belmont et al. | 106/472 |
| 6,083,862 A | 7/2000 | Wheelock | 502/41 |
| 6,113,869 A | 9/2000 | Jain et al. | 423/219 |
| 6,150,288 A * | 11/2000 | Suzuki et al. | 501/105 |
| 6,171,372 B1 | 1/2001 | Ichiki et al. | 95/129 |
| 6,228,150 B1 | 5/2001 | Armstrong et al. | 95/139 |
| 6,251,348 B1 | 6/2001 | Scranton et al. | 423/244.01 |
| 6,280,503 B1 | 8/2001 | Mayorga et al. | 95/96 |
| 6,280,871 B1 | 8/2001 | Tosco et al. | 429/41 |
| 6,290,735 B1 | 9/2001 | Kambe et al. | 51/307 |
| 6,358,302 B1 | 3/2002 | Deng et al. | 95/96 |
| 6,379,430 B1 | 4/2002 | Monereau | 95/96 |
| 6,379,432 B1 | 4/2002 | Matacotta et al. | 95/129 |
| 6,387,845 B1 | 5/2002 | Masahiro | 502/407 |
| 6,399,202 B1 | 6/2002 | Yu et al. | 428/403 |
| 6,479,429 B1 | 11/2002 | Khare | 502/414 |
| 6,494,946 B1 | 12/2002 | Belmont et al. | 106/472 |
| 6,522,522 B2 | 2/2003 | Yu et al. | 361/502 |
| 6,524,704 B1 | 2/2003 | Wei et al. | 428/402 |
| 6,565,627 B1 | 5/2003 | Golden et al. | 95/96 |
| 6,589,493 B2 | 7/2003 | Hosaka et al. | 423/230 |
| 6,630,268 B2 | 10/2003 | Tosco et al. | 429/41 |
| 6,689,192 B1 | 2/2004 | Phillips et al. | 75/342 |
| 2002/0056686 A1 | 5/2002 | Kyrlidis et al. | 210/656 |
| 2002/0096048 A1 | 7/2002 | Cooper et al. | 95/116 |

(Continued)

OTHER PUBLICATIONS

"Nitrogen Oxides (NOx), Why and How They Are Controlled"; EPA Technical Bulletin; EPA 456/F-99-006R; Nov. 1999.

(Continued)

*Primary Examiner*—Edward M Johnson
(74) *Attorney, Agent, or Firm*—Marsh Fischmann & Breyfogle LLP

(57) ABSTRACT

Solid absorbent materials that are useful for absorption of chemical species from a fluid, such as a gas stream or a liquid stream. The absorbent materials are formed by spray processing and posses a well-defined chemical composition and microstructure. The absorbent materials can have a high absorption capacity for a chemical species such as $H_2S$, $CO_2$, $NO_x$, and $H_2$ and have a high recylability, such that the chemical species can be absorbed and desorbed over a large number of cycles.

55 Claims, 57 Drawing Sheets

U.S. PATENT DOCUMENTS

2003/0017379 A1  1/2003  Menashi ............. 429/44
2003/0022055 A1  1/2003  Menashi ............. 429/44

OTHER PUBLICATIONS

Nijkamp et al.; "Hydrogen Storage Using Physisorption-Materials Demands"; Appl. Phys. A 72, 619-623 (2001).
Arai et al.; "Removal of $NO_x$ Through Sorption-Desorption Cycles Over Metal Oxides and Zeolites"; Catalysis Today; 22 (1994); 97-109.
Wong et al.; "Carbon Dioxide Separation Technologies"; Carbon & Energy Management, (2002).
Chen et al.; "Interaction Of Hydrogen With Metal Nitrides And Imides"; 2002 Nature Publishing Group; Nature; vol. 420; Nov. 21, 2002; pp. 302-304.
Barkhordarian et al.; "Fast Hydrogen Sorption Kinetics Of Nanocrystalline Mg Using $Nb_2O_5$ As Catalyst"; Scripta Materialia 49 (2003) p. 213-217.
Eguchi et al.; "Reversible Sorption of Nitrogen Oxides in Mn-Zr Oxide"; Journal of Catalysis 158; pp. 420-426 (1996).
Sandrock, Gary; "A Panoramic Overview of Hydrogen Storage Alloys From a Gas Reaction Point of View"; Journal of Alloys and Compounds; 293-295 (1999) 877-888.
Haneda et al.; "$CeO_2$-$ZrO_2$ Binary Oxides for $NO_x$ Removal By Sorption"; Phys. Chem. Chem Phys., 2001, 3, 4696-4700.
Huang et al.; "Removal Of NO by Reversible Adsorption on Fe-Mn Based Transition Metal Oxides"; Langmuir 2001, 17, 4997-5003.
Agnihotri et al.; "Influence Of Surface Modifiers On The Structure of Precipitated Calcium Carbonate"; Ind. Eng. Chem. Res. 1999, 38, 2283-2291.
Li et al.; "Selective Adsorption of $NO_x$ From Hot Combustion Gases by Ce-Doped $CuO/TiO_2$"; Energy & Fuels; 1997; 11, 428-432.
Zuttel, Andreas; "Materials For Hydrogen Storage"; Materialstoday; Sep. 2003; pp. 24-33.
van der Ham et al.; "Proposal For a Regenerative High-Temperature Process For Coal Gas Cleanup With Calcined Limestone"; Ind. Eng. Chem. Res. 1996, 35 1487-1495.
Kanapilly et al.; "A New Method For The Generation Of Aerosols Of Insoluble Particles"; Aerosol Science; 1970, vol. 1; pp. 313-323.
Lin et al.; "Hydrogen Production From Coal by Separating Carbon Dioxide During Gasification"; www.fuelfirst.com; Fuel 81 (2002) 2079-2085.
Ortiz et al.; "Hydrogen Production Using Sorption-Enhanced Reaction"; Ind. Eng. Chem. Res. 2001, 40, 5102-5109.
Balasubramanian et al., "Hydrogen From Methane In a Single-Step Process", Chemical Engineering Science, 54 (1999), pp. 3543-3552.
Byer et al.; Kinetics of the Reaction between HF and CaO for Fluoride Emission Control; Environ. Sci. Technol., vol. 17, No. 2, pp. 84-88, 1983.
Dam-Johansen et al.; Catalytic Reduction of Nitric Oxide by Carbon Monoxide Over Calcined Limestone: Reversible Deactivation in the Presence of Carbon Dioxide; Applied Catalysis B: Environmental 5 (1995) 283-304.
Gullett et al.; Reaction Kinetics of Ca-Based Sorbents With HCl; Ind. Eng. Chem. Res. 1992, 31, 2437-2446.
Käßner et al., Comparative Characterization of Basicity and Acidity of Metal Oxide Catalysts For The Oxidative Coupling Of Methane By Different Methods; Applied Catalysis A: General 139 (1996) 107-129.
Koper et al.; Destructive Adsorption of Chlorinated Hydrocarbons On Ultrafine (Nanoscale) Particles of Calcium Oxide; Chem. Mater. 1993, 5, 500-505.
Lawrence et al., The Reactions Between Ca-based Solids and Gases Representative of Those Found In A Fluidized-Bed Incinerator; Chemical Engineering Science 55 (2000) 6129-6137.
Olanders et al., Reduction of Nitric Oxide Over Magnesium Oxide And Dolomite at Fluidized Bed Conditions; Energy & Fuels 1995, 9, 680-684.
Seki et al.; Calcium Oxide and Strontium Oxide As Environmentally Benign and Highly Efficient Heterogeneous Catalysts for the Tishchenko Reaction Of Furfural; Chem. Commun, 2001, 1000-1001.
Shirai et al.; Hot Defluorination of Reducing Gases With Lime Pellets; Environ. Sci. Techno. 2000, 34, 798-803.
Wei et al.; Effect Of Base Strength And Basicity On Catalytic Behavior Of Solid Bases For Synthesis Of Dimethyl Carbonate From Propylene Carbonate And Methanol; Fuel Processing Technology 83 (2003) 175-182.
Weinell et al.; Hydrogen Chloride Reaction With Lime And Limestone: Kinetics And Sorption Capacity; Ind. Eng. Chem. Res. 1992, 31, 164-171.
Zijlma et al.; The Influence of $H_2O$ and $CO_2$ On The Reactivity Of Limestone For The Oxidation of $NH_3$; Fuel 79 (2000) 1449-1454.

* cited by examiner (a)

(b)

(a)

(b)

(a)

(b)

(a)

(b)

(a)

(b)

(a)

(b)

PARTICULATE ABSORBENT MATERIALS

CROSS REFERENCE TO RELATED APPLICATIONS

This application is a continuation-in-part application of U.S. patent application Ser. No. 10/723,424, entitled "FUEL REFORMER CATALYST AND ABSORBENT MATERIALS", filed Nov. 26, 2003 now U.S. Pat. No. 7,267,811. This application also claims priority to U.S. Provisional Application No. 60/525,462, entitled "PARTICULATE ABSORBENT MATERIALS AND METHODS FOR MAKING SAME", filed Nov. 26, 2003, and to U.S. Provisional Application No. 60/525,467, entitled "CARBON DIOXIDE ABSORBENT MATERIALS AND METHODS FOR MAKING SAME", filed Nov. 26, 2003. This application is also related to U.S. patent application Ser. No. 10/996,791, entitled "FUEL REFORMER CATALYST AND ABSORBENT MATERIALS", filed on Nov. 24, 2004, and further identified by Attorney File No. 41890-01736. Each of the foregoing applications is incorporated herein by reference in its entirety.

BACKGROUND OF THE INVENTION

1. Field of the Invention

The present invention relates to solid particulate materials that are useful for the reversible absorption of chemical species from a fluid, such as from a liquid or gaseous stream, and particularly the removal of gases such as $CO_2$, $H_2S$ or $NO_x$, from a gas stream. Particulate materials useful for the reversible absorption of hydrogen are also provided. The particulate absorbent materials can be produced by spray processing to form a powder batch of absorbent material particulates, or intermediate compounds that can be converted to the absorbent material. The absorbent material particulates can be fabricated into shapes such as extrudates, pellets or monoliths.

2. Description of the Related Art

Solid absorbents are utilized in a wide range of applications to remove a chemical species from a gas or liquid stream. There are several mechanisms by which absorbents can remove the targeted chemical species, including physical sorption, chemical sorption and chemical reaction. The first two categories rely on the surface area and the surface composition of the solid sorbent to react with the targeted species and remove it from the stream. Solid reactive absorbents are chemical compounds that fix the selected chemical species by reacting with the chemical species to form a new compound.

Applications of these absorbent materials include, but are not limited to, the treatment of fuels to purify the fuels and the treatment of combustion gases, such as from a coal-fired power plant or an internal combustion engine, to remove noxious components. The removal of $H_2S$ (hydrogen sulfide) is motivated primarily by the desire to reduce environmental pollution. Also, the removal of sulfur-containing species, even to below the trace (ppm) concentration range, is desired prior to the use of gases in other applications, as sulfur can poison various catalysts.

Generally, coal includes sulfur as an impurity, which upon gasification typically enters the coal gas stream as $H_2S$. It is common practice to cool the gas below 77° C. to remove $H_2S$ by wet scrubbing. However, this practice reduces the overall efficiency of the power generation plant significantly. Hot gas cleanup methods capable of operating at temperatures close to the gasifier outlet temperature, such as from 725° C. to 1325° C., would increase the overall energy conversion efficiency of the plant. While various absorbents have been proposed for desulfurizing hot coal gas, few are effective at such high temperatures.

It is also known that zinc-based materials such as ZnO (zinc oxide) are highly effective for removing $H_2S$ at temperatures below about 650° C. Zinc-based compounds can be combined with other metal oxides (such as $Al_2O_3$ or $TiO_2$) to prepare absorbent materials with enhanced performance. U.S. Pat. No. 4,313,820 to Farha et al. describes the combination of zinc oxide with titania and at least one promoter selected from vanadium, chromium, manganese, iron, cobalt, nickel, molybdenum, rhenium and their compounds. U.S. Pat. No. 6,479,429 to Khare discloses a sorbent prepared by mixing a zinc-containing compound with an alumina component, among other components, spray drying the mixture to form particles and then subsequently calcining the mixture to form an enhanced $H_2S$ sorbent. Other combinations of metal oxides with zinc oxide are also known in the art, such as combinations with oxides of iron and/or nickel, such as those described in U.S. Pat. No. 5,244,641 to Khare. In certain cases, mixed oxides are prepared with the addition of an activator, such as a noble metal oxide, copper metal, copper carbonate, and others, to enhance the kinetics of the adsorption process. This process is described in U.S. Pat. No. 6,251,348 to Scranton. U.S. Pat. No. 4,729,889 to Flytzani-Stephanopoulos et al. describe regenerable $H_2S$ sorbents consisting of mixed oxides of Group VB or VIB metals and Group IB, IIB, VII metals supported on refractory metal oxide supports, such as alumina or zirconia. Similarly, U.S. Pat. No. 4,489,047 to de Jong et al. describes the use of $MnO_x$ or iron oxide, supported on a porous carrier consisting of alumina, which may also contain silica. U.S. Pat. No. 4,089,809 to Farrior et al. describes the use of silica supported iron oxide for the removal of $H_2S$ from gas streams. The contents of each of the foregoing U.S. patents are incorporated herein by reference in its entirety.

At higher temperatures, calcium-based absorbents are promising because the reaction of CaO with $H_2S$ is both thermodynamically and kinetically favorable. These reactions are illustrated by Equations 1 to 4.

$$\text{Absorption: } CaO + H_2S \rightarrow CaS + H_2O \qquad (1)$$

$$\text{Oxidation: } CaS + 2O_2 \rightarrow CaSO_4 \qquad (2)$$

$$\text{Reduction: } CaSO_4 + CO \rightarrow CaO + CO_2 + SO_2 \qquad (3)$$

$$CaSO_4 + H_2 \rightarrow CaO + H_2O + SO_2 \qquad (4)$$

It has been proven by van der Ham et al. (Ind. Eng. Chem. Res., 1996, 35, 1487) that the $H_2S$ content of gas produced by an air- and steam-blown coal gasifier operating under typical conditions can be reduced to 20 ppmv by employing CaO in highly reducing conditions at a temperature higher than 800° C. Regeneration can be accomplished at a temperature above the absorption temperature by employing a cyclic oxidation and reduction process as is disclosed in U.S. Pat. No. 6,083,862 to Wheelock.

$CO_2$ (carbon dioxide) is another chemical species that is often removed from certain fluid streams. Several technologies and processes are currently available to separate and capture $CO_2$ from other gases. Separation and capture is often required to: (1) remove $CO_2$ that is either present or produced as a co-product or by-product in industrial processes, such as synthetic ammonia production, $H_2$ production and natural gas processing; and (2) prevent the atmospheric release of $CO_2$ when it is created during the generation of electricity, such as by coal combustion.

With regard to the removal of $CO_2$ in industrial processes, pressure swing adsorption (PSA) is a common commercial process, and utilizes pressure changes to promote the cyclic adsorption and desorption of the gas. Generally, a column packed with a highly porous reversible adsorbent, such as activated carbon or surface modified zeolites is employed.

Other materials and methods used to remove $CO_2$ are described by Wong and Bioletti in "Carbon Dioxide Separation Technologies", Alberta Research Council, the contents of which are incorporated herein by reference in their entirety. These materials and methods include physical solutions, cryogenic separation, membrane separation and chemical absorption.

Zeolite-based materials have been used for $CO_2$ removal in a variety of applications. For example, $NH_4^+$-type or $H^+$-type faujasites, and ion-exchanged-type faujasites, such as with zinc or a rare earth can be used for $CO_2$ removal from a mixed gas of hydrogen, nitrogen and methane in the temperature range of 50 to 100° C., as described in U.S. Pat. No. 4,775,396 to Rastelli et al., the contents of which are incorporated herein by reference in their entirety. X or LSX ion-exchanged zeolites can also be used for cryogenic purification of inert gas from $CO_2$ to less than 10 ppb. These types of materials can also be used for hydrogen purification by removal of $CO_2$ from the reformate through PSA methods. Also, modified zeolites, such as a zeolite impregnated with one or more metal salts can be used for hydrogen production from steam reforming carbon-based fuels, as is described in U.S. Pat. No. 6,565,627 to Golden et al., the contents of which are incorporated herein by reference in their entirety.

Similar to porous zeolites, support materials with high surface area such as alumina or activated alumina, are also known to remove $CO_2$. For example, activated alumina with a high surface area that contains at least 80% alumina oxide, silicon oxide, iron oxides and up to 7.25% of alkali or alkaline-earth metal can be used for removal of $CO_2$ from air prior to cryogenic separation or from a synthesis gas, as disclosed in U.S. Pat. No. 6,379,430 to Monereau, the contents of which are incorporated herein by reference in their entirety. The combination of activated alumina with zeolites can be used for $CO_2$ removal for semiconductor purposes.

Other similar materials include aminated carbon molecular sieves, such as those described in U.S. Pat. No. 4,810,266 to Zinnen et al., the contents of which are incorporated herein by reference in their entirety. Another class of materials are the surface functionalized carbonaceous absorbents described in U.S. Patent Application Publication No. 2002/0056686 to Kyrlidis et al., the contents of which are incorporated herein by reference in their entirety, wherein the organic group attached to the surface of the particle comprises one or more amines.

Reactive absorbent compounds are chemical compounds that fix a selected chemical species by reacting with the chemical species to form a new compound. An example is the reaction of a metal oxide ($M_yO_x$) with $CO_2$ to form a carbonated compound ($M_yCO_3$), as is illustrated by Equation 5 for calcium oxide and Equation 6 for lithium oxide:

$$CaO + CO_2 \rightarrow CaCO_3 \tag{5}$$

$$Li_2O + CO_2 \rightarrow Li_2CO_3 \tag{6}$$

In many applications, it is desirable after absorption to regenerate the absorbent by desorbing the $CO_2$ from the carbonate compound. This can be accomplished, for example, by heating the carbonate compound.

A variety of reactive absorbent compounds are available for the absorption of $CO_2$, and each has a different absorption capacity. Chemically reactive $CO_2$ absorbent compounds are preferred, because these compounds typically have much higher equilibrium absorption capacity than other absorbents, as is illustrated in Table 1.

TABLE 1

| Material | Absorption Capacity (grams $CO_2$ per 100 grams material) |
|---|---|
| methylethanolamine (MEA) | 6 |
| silica gel | 1.32 |
| activated carbon | 8.8 |
| $K_2CO_3$/Hydrotalcite (HTC) | 1.98 |
| CaO | 78.57 |

In general, alkali metal and alkaline earth metal oxides and/or hydroxides are good materials for $CO_2$ sorption. Reaction of $CO_2$ with various metal oxides leads to the formation of the corresponding carbonates, as described by the following equations:

$$M(OH)_2 + CO_2 \rightarrow MCO_3 + H_2O \tag{7}$$

$$MO + CO_2 \rightarrow MCO_3 \tag{8}$$

$$2MOH + CO_2 \rightarrow M_2CO_3 + H_2O \tag{9}$$

$$M_2O + CO_2 \rightarrow M_2CO_3 \tag{10}$$

Such reactive absorbent compounds can be freestanding, mixed with or supported on inert porous substrates, such as silica ($SiO_2$), alumina ($Al_2O_3$), carbon, and the like. Known absorbent materials include calcium-based compounds, such as calcium hydroxide ($Ca(OH)_2$) and calcium oxide (CaO), magnesium-based compounds, such as magnesium hydroxide ($Mg(OH)_2$) and magnesium oxide MgO, and lithium-based compounds such as lithium hydroxide Li(OH) and lithium oxide $Li_2O$. These absorbents can be enhanced for certain applications with the addition of alkali metal carbonates ($M_2CO_3$, where M is an alkali metal) or bicarbonates ($MHCO_3$, wherein M is an alkali metal), at various stoichiometries, as described in U.S. Pat. No. 6,280,503 to Mayorga et al., the contents of which are incorporated herein by reference in their entirety. In other applications, such as the removal of $CO_2$ from air for anesthesiology applications, the presence of alkali metal hydroxides can be detrimental. For these applications, the absorbents should be alkali free, as described in U.S. Pat. No. 6,228,150 to Armstrong et al., the contents of which are incorporated herein by reference in their entirety.

Other materials that have been used for the sorption of $CO_2$ include mixtures of metal oxides, alkali carbonates and alkali fluorides, such as those described in U.S. Pat. No. 5,214,019 to Nalette et al., the contents of which are incorporated herein by reference in their entirety. Nalette et al. disclose that the metal oxide may be selected from the group consisting of MgO, AgO, ZnO and mixtures thereof and that these absorbents can be freestanding, mixed with or supported on an inert porous support. Similar mixed metal oxide absorbents are described in U.S. Pat. No. 5,186,727 to Chang the contents of which are incorporated herein by reference in their entirety. These mixed metal oxide absorbents consist of mixtures of a salt of silver metal with a salt of a second metal selected from magnesium, iron, cobalt, nickel, zinc and other metals for which the carbonate to oxide reaction is reversible. Chang discloses that the preferred metal salt is the carbonate or bicarbonate salt.

Iron oxide based absorbents for the absorption of $CO_2$ are also known in the art. Such materials have applications in the food industry, such as in the packaging of coffee and/or the removal of $CO_2$ from containers that hold respiring fruits and vegetables, as described by Brody et al. in "Active Packaging for Food Applications", CRC Press, the contents of which are incorporated herein by reference in their entirety. Solid $CO_2$ absorbents can also be combined with noble metal oxidation catalysts for the removal of trace amounts of CO and $H_2$ from gas streams by concurrent oxidation and sorption, as described in U.S. Pat. No. 6,589,493 to Hosaka et al. and U.S. Pat. No. 6,113,869 to Jain et al, the contents of each being incorporated herein by reference in their entirety.

Another class of sorption materials effective for $CO_2$ removal for both synthesis gas and effluents are porous, solid materials such as mixed oxides of lithium and silicon and/or zirconium. For example lithium zirconate (e.g., $LiZrO_2$) and lithium silicates (having the general formula $Li_xSi_yO_z$) as is described in U.S. Pat. No. 6,387,845 by Masahiro et al., the contents of which are incorporated herein by reference in its entirety, are examples of such materials. It is disclosed that these materials can also incorporate other dopants to enhance their performance, such as Al, K, Fe, Mg and the like, and that the lithium-based materials are reversible upon the application of heat. While the use of lithium zirconate is more widespread at present, the adoption of lithium silicate is increasing due to its lower production costs, lighter weight and rapid $CO_2$ absorption capabilities. For example, one gram of lithium silicate is capable of absorbing 62 milligrams of $CO_2$, making the material 30 times more efficient than lithium zirconate. Lithium silicate is also 70 percent lighter and about 85 percent less expensive than lithium zirconate, since it uses silicon instead of the more expensive zirconium as a starting material.

Despite the breadth of existing and potential solutions for the separation and capture of $CO_2$, there is still the need for improvements in the areas of capacity, high-temperature operation and long-term stability. Indeed, the need for such absorbents is even more pronounced with regard to the removal or collection of $CO_2$ present in the flue gases of fossil-fueled power plants, chemical plants and engines, the presence of which is a contributing factor in global warming and ocean acidification. The increasing use of fossil fuels to meet energy needs has led to higher $CO_2$ emissions into the atmosphere and $CO_2$ emissions from direct combustion of fossil fuels account for one-half of the greenhouse effect that causes global warming. It is therefore desirable to develop cost-effective $CO_2$ management schemes to curb $CO_2$ emissions. Many $CO_2$ management schemes consist of three parts: separation, transportation, and sequestration. The capture of $CO_2$ accounts for about 75% of the total cost of $CO_2$ management, and imposes a severe energy requirement on fossil fuel-based power plants, reducing their net electricity output by as much as 37%. The costs associated with current $CO_2$ separation technologies necessitate the development of economical alternatives. It is believed that, none of the preceding materials and methods have been applied at the scale required for a commercial $CO_2$ emissions mitigation strategy that also meets the associated cost and safety requirements. As such, techniques are needed to transform absorbed $CO_2$ materials into materials that can be economically and safely disposed, can be transported and sequestered for a long time, or can be used to make commercial products that can offset the associated costs of capture and transport. One potential solution is the carbonation of silicate rock, where $CO_2$ is captured in a stable and solid form for disposal. Preliminary estimates for silicate carbonation are in development, but show the potential for a significantly lower cost than solvent extraction.

In addition to the above, several smaller-scale applications exist for the removal of $CO_2$. Specifically, small scale applications exist for enclosed environments, whose elevated concentrations of $CO_2$ are potentially dangerous, such as submarines, space systems, anesthesia machines and diving rebreather equipment. $CO_2$ absorbents can also be used in the removal of trace concentrations of $CO_2$ from air prior to cryogenic separation applications, or removal of acid gases for the preparation of ultra-pure inert gases for semiconductor and other high purity applications. $CO_2$ absorbents are also used as components of $CO_2$ sensors due to the change in their physical properties as they absorb $CO_2$. In addition, $CO_2$ absorbents can help remove $CO_2$ from sensors of other gases, when the adsorption of $CO_2$ interferes with the sensing of the other target gas. In general, $CO_2$ absorbents can be utilized in any application where it is important to control the presence, concentration or release of $CO_2$, and includes chemical applications and applications related to cell culture and/or fermentation processes.

Natural CaO-based absorbents for the absorption of $H_2S$ and $CO_2$, such as limestone and dolomite, are plentiful and inexpensive, but they are soft, friable and do not stand up well to handling and use for multiple cycling. To improve- the recyclability, some work has focused on the pelletizing of limestone by using different binders. Work also focused on the modification of natural materials, such as dolomite, to tailor the physicochemical properties of the material. The synthesis of a CaO-based absorbent by boiling of CaO into $Ca(OH)_2$ or the carbonation of calcium salt solution such as calcium nitrate or $Ca(OH)_2$ into calcium carbonate, and subsequent decomposition of the carbonate into CaO is disclosed by L. S. Fan et al., Ind. Eng. Chem. Res., 1999, 38, 2283. Others have disclosed the preparation of CaO-based materials by aerogel methods. Other various materials useful for the absorption of $H_2S$ are disclosed in U.S. Pat. No. 4,729,889 to Flytani-Stephanopoulos et al., the contents of which are incorporated herein by reference in their entirety.

Generally, the above described methods result in poor control over the composition and microstructure of the powders. The morphology and surface properties such as surface area, pore volume and pore size, are characteristics that impact the performance of the absorbent. This is primarily due to the nature of the reactions that occur. With respect to $CO_2$, carbonation takes place on the external and internal surfaces of the CaO-based absorbent, thereby forming a carbonate layer. As the chemical reaction advances, $CO_2$ diffuses through the carbonate layer into the unreacted core CaO active sites. Therefore, higher reactivity and faster kinetics can be expected for small particle size CaO due to the higher ratio of atoms on the surface. A more porous structure will also lead to higher reactivity and recyclability, and a lower decarbonation temperature due to the easier $CO_2$ diffusion into and out of the outer carbonate layer.

Absorbent materials that can reversibly absorb and/or store $NO_x$ (nitrogen oxides) are also known. The emission of $NO_x$ (e.g., NO, $NO_2$, etc.) is detrimental to the environment. It has been shown that NO, can lead to the production of pollutants, such as ozone and can also lead to the formation of acid rain. One primary application for $NO_x$ sorbent materials is the removal of nitrogen oxides from exhaust gases. Exhaust gases generally are the products of the combustion of automotive fuels, e.g., long-chained hydrocarbons. The EPA estimates that 50% of $NO_x$ emissions are from mobile sources (e.g. automobiles) and about 30% are from stationary sources (e.g. electric power plants). Preferably, $NO_x$ is removed at the place of generation (in the vicinity of the engine) or from enclosed spaces, such as tunnels, garages, or other enclosed structures, where the gases may accumulate over time.

There are several other applications that would benefit from $NO_x$ absorption, including pickling operations in steel mills and silicon processing. In addition, chemical plants that produce nitric acid or that utilize nitric, or nitrous acids as reagents are additional sources of $NO_x$ emissions that could benefit from $NO_x$ absorbents. $NO_x$ present in air can also interfere with the cryogenic separation of oxygen and nitrogen and the manufacture of ultrapure gases for specialty applications (i.e. semiconductor processing) as described in U.S. Pat. No. 6,358,302 to Deng et al., the contents of which are incorporated herein by reference in their entirety.

Nitrogen oxides are also used in combination with oxygen and anesthetics in various medical applications, such as laughing gas. It is important in these applications to controllably release such gases during the anesthesia and to capture any fugitive gases.

Nitrogen oxides can also interfere with the operation of a variety of devices. For example, copying machines, such as those described in U.S. Pat. No. 5,539,205 to Reale, can generate nitrogen oxides that need to be abated in order to maintain reliable performance during operation of the device. Printed circuit boards, hard drives, or other computer hardware components that are operated in harsh environments containing acid gases, such as nitrogen oxides, can also suffer significant deterioration in performance in the presence of $NO_x$.

An additional application for $NO_x$ absorbent materials is in the area of sensors. The performance of sensors for other gases can be enhanced by removing nitrogen oxides from gas mixtures, if they interfere with the performance of the sensing material for the other components of the gas mixture.

The abatement of $NO_x$ can be achieved using various methods, (see for example EPA Technical Bulletin 456/F-99-006R), some of which interfere with known mechanism of $NO_x$ production, and others which help with the abatement of the $NO_x$ species after they are formed.

A variety of materials have been developed over the years for the absorption of nitrogen oxides. The composition and performance of these materials is strongly a function of the conditions under which they are expected to act as absorbents. Each material performs best in a specific environment. In some applications selection of a $NO_x$ absorbents is a function of its regenerability. An additional factor is the, potential for combining these materials with a catalyst for reducing the nitrogen oxides to inert nitrogen. Huang and Yang (Langmuir, Vol. 17, (2001), pp. 4997-5003) and its references list a variety of these materials, the contents of each being incorporated herein by reference in their entirety.

Alkali metal, alkaline earth, or lanthanide oxides, hydroxides, and/or carbonates can trap nitrogen oxides through the mechanism:

$$NO + 0.5\, O_2 \rightarrow NO_2 \tag{11}$$

$$MO + 2NO_2 + 0.5\, O_2 \rightarrow M(NO_3)_2 \tag{12}$$

$$MCO_3 + 2NO_2 + 0.5\, O_2 \rightarrow M(NO_3)_2 + CO_2 \tag{13}$$

The metal (M) can be selected depending on factors such as cost, desired capacity, and operating conditions. Typical metals include sodium, potassium, calcium and barium. Such materials may be used alone or in combination with an inert support, such as alumina, silica, as described for example in U.S. Pat. No. 4,755,499 to Neal et al., the contents of which are incorporated herein by reference in their entirety. Such inert materials may provide a substrate with the desired porosity, pore size distribution, and surface area to support the active sorbent.

Other materials that have been found to have enhanced sorption capacity for $NO_x$ are mixed oxides of manganese ($MnO_x$) and zirconium ($ZrO_2$) (as described by Eguchi et al., J. Catal. Vol. 158, (1996), p. 420, the contents of which are incorporated herein by reference in their entirety). The performance of these mixed oxides can be enhanced by the incorporation of additional metal oxides, such as oxides of titanium and/or iron.

Compositions including Y—Ba—Cu—O mixed oxides have also been shown to have is enhanced storage capacity for nitrogen oxides. For example, U.S. Pat. No. 6,379,432 to Matacotta et al., the contents of which are incorporated herein by reference in their entirety, describes a $Ba_2Cu_3O_6$ sorbent whose activity can be enhanced with the incorporation of oxides of La and/or Ce. Arai et al., Catalysis Today, Vol. 22 (1994), pp. 97-109, disclose the sorption of nitrogen oxides on $YBa_2Cu_3O_y$, which has been shown to have good sorption capacity for NO. These materials can also be supported on inert porous supports, such as those described above. Copper oxides supported on titanium dioxide and copper oxides supported on titanium dioxide, which incorporates cerium oxides, have also been shown to have enhanced performance by Li et al. (*Energy & Fuels*, Vol. 11, (1997) pp. 428-432), the contents of which are incorporated herein by reference.

The beneficial effect of cerium dioxide for the sorption of nitrogen oxides is also described by Haneda et al. (Phys. Chem. Chem. Phys., vol. 3, (2001), pp. 4696-4700), the contents of which are incorporated herein by reference in their entirety. It is disclosed that the performance of a $CeO_2$:$ZrO_2$ mixed oxide prepared by sol-gel processing was found to be significantly better than that of a similar material prepared by a co-precipitation method.

Other materials that have been shown to sorb nitrogen oxides include amino acid and amine impregnated porous carriers, such as those described in U.S. Pat. No. 6,171,372 to Ichiki et al., the contents of which are incorporated herein by reference in their entirety. Microporous carbons modified by $Fe_2O_3$ have also been shown by Inai et al., (Catal. Lett., Vol. 20 (1993), pp. 133-139) to absorb NO from mixtures. Microporous carriers with dispersed nanoparticles that have affinity towards nitrogen oxides can enhance the capacity for adsorption of such materials. Alkali, alkaline earth, rare earth and transition metal cation exchanged zeolites have also been explored as nitrogen oxide sorbent materials. Other materials that have been evaluated include perovskites ($ABO_3$, where A=Ca, Sr, Ba and B=Sn, Zr, Ti), including $BaSnO_3$.

Absorbent materials can have multi-functional components. For example, several of the mixed metal oxides listed above have components with very specific functions: a component that helps oxidize NO to $NO_2$ and a component that stores the nitrogen oxides either on its surface or in its bulk by reaction to the corresponding metal nitrate. Such absorbent materials can also be used as supports for noble metal catalysts that catalyze the oxidation of NO to $NO_2$ and reduce of absorbed nitrogen oxides to nitrogen. Supporting a noble metal catalyst on the sorbent material can significantly enhance the kinetics and overall conversion of the $NO_x$ reduction reaction.

All of the materials described above expand their volume upon absorption of $NO_x$ during the sorption process. The molar volumes of the nitrates are higher than those of the starting oxides, carbonates, or hydroxides, leading to a weakening of the materials during the sorption process, as they expand. After a few regeneration cycles such materials will become brittle, and, possibly, crumble into finer particles or fall off the support structures. Smaller particles can clog pores, sinter, and/or have significant negative effects on the sorption capacity and kinetics after several cycles. For materials that absorb nitrogen oxides into their molecular structure, as well as for materials that adsorb nitrogen oxide molecules on their surface, it is important to maintain absorbent capacity throughout the use of the sorbent material. Thus, absorbent powders need to be able to maintain their pore structure and surface area even after repeated absorption and desorption cycles.

Certain absorbent materials can also reversibly store $H_2$ (hydrogen). $H_2$ storage materials are normally categorized into three different classes according to their composition and the mechanism for hydrogen storage (e.g., chemisorption or physisorption). Each class of materials has unique properties in terms of the environment in which hydrogen adsorption and desorption occurs, which in turn determines the operating range and possible applications for the hydrogen absorbent.

One type of hydrogen storage material is a metal alloy or intermetallic compound that includes a misch metal, often referred to as a misch metal hydride. Typical misch metal compositions include AB, $AB_2$, $AB_3$, $AB_5$ and $A_2B$, where A can be selected from lanthanide elements (e.g., La, Ce, Pr, Nd, Pm, Sm, Eu, Gd, Tb, Dy, Ho, Er, Th, Yb and Lu) as well as Mg, Ti and Zr, and B can be selected from the transition elements (e.g., Sc, Ti, V, Cr, Mn, Fe, Co, Ni, Cu, Zn, Y, Zr, Nb, Mo, Rh, Ru, Pd, Ag, Cd, La, Ce and the like). See Zuttel, Materials Today, September 2003, pp. 24-33, which is incorporated herein by reference in its entirety. Preferred examples of such materials include $LaNi_5$, $Mg_2Ni$, $Mg_2Fe$, TiFe, and $ZrMn_2$. For example, $LaNi_5$ forms a species with the empirical formula $LaNi_5H_{6.5}$ and is the material of choice for nickel/metal-hydride batteries. Other examples are given in G. Sandrock, Journal of Alloys and Compounds 293-295 (1999) 877-888, which is incorporated herein by reference in its entirety. These materials have very reliable reversible hydrogen uptake and are currently in use in nickel-metal hydride batteries. These materials are also commonly used for hydrogen storage, but have a low gravimetric hydrogen capacity, between 1 and 3 wt. %. In addition, these materials typically decrepitate after the first adsorption/desorption cycle to form a powder that is pyrophoric when exposed to air.

Another class of hydrogen storage material is referred to as chemical hydrides. Chemical hydrides are stoichiometric chemical compounds, typically molecular or oligomeric, but which can stoichiometrically, reversibly react with, or release, $H_2$. In order to achieve a suitable gravimetric $H_2$ storage capacity, these materials usually include hydrides of lighter elements, such as Mg, B, Al, Li, Na, or complexes thereof, including $NaBH_4$, $AlH_3$, $LiAlH_4$, $Mg(AlH_4)_2$. These materials generally have $H_2$ storage capacities of up to 9 wt. %. For example, $NaAlH_4$ reversibly reacts to form 1/3 $NaAlH_6$+2/3 Al+$H_2$, which can further reversibly react to form NaH+Al+3/2$H_2$. The theoretical hydrogen storage capacity for this reaction is about 5.6 wt. %. Another promising material is $LiBH_4$, which has a relatively high gravimetric hydrogen density ($\approx$18 wt. %), as described by Zuttel, supra.

In the same class as chemical hydrides are some specific metal hydride compositions which form a known alloy phase on loss of $H_2$. An example of such as compound is $Mg_2NiH_4$, which forms 2$H_2$ and $Mg_2Ni$ alloy. Another example is $Mg_2FeH_6$, which has the potential for 5.5 wt. % $H_2$ storage.

In general, it is believed that the addition of dopants or catalysts can enhance the storage capacity, kinetics, and regenerability of most chemical hydrides. For example, in the case of complex metal hydrides, the addition of a Ti catalyst to sodium alanate ($NaAlH_4$) as described by Bogdanovic and Sandrock (MRS Bulletin, September 2002, pp. 712-716), leads to an increased reversible capacity at 150° C. In the case of simple metal hydrides, the incorporation of $Nb_2O_5$ and other metal oxides into Mg can have a significant effect on the adsorption and desorption kinetics of $MgH_2$. See Barkhordian et al., (Scripta Materialia, 49, (2003), pp. 213-217).

Other materials that can store hydrogen are alkali metal nitrides and imides, especially lithium-based compounds such as $Li_3N$. See Chen et al. (Nature, 420, (2002), pp. 302-303).

A third class of hydrogen storage materials are those that physisorb hydrogen, which are typically highly microporous nanostructured materials. A range of such materials is described by Nijkamp et al. (Applied Physics A, 72, (2001), pp. 619-623), the contents of which are incorporated herein by reference in their entirety. These materials are usually inorganic carbon, silica or alumina based materials with high pore volumes, such as activated carbons, zeolites and others. Organic/metalorganic materials tailored nanostructures, are also known.

The most promising hydrogen absorbing materials include carbon particles and carbon nanotubes/fullerenes. These materials may also include hetero atoms which enhance the hydrogen uptake. Such carbon-based materials can also have surface functionalization groups that enhance the capacities and kinetics of hydrogen storage. High surface area active carbons are known to physisorb molecular hydrogen, but only at low temperatures due to the weak nature of the physisorption interaction. Conversely, chemical reaction of hydrogen with carbon (chemisorption) in the form of fullerenes to form hydrocarbons, e.g., $C_{60}H_{48}$, results in the formation of covalently bonded hydrogen that requires high temperatures to desorb the hydrogen. To resolve this dichotomy, a number of solutions have been explored. A reduction in the chemical stability of the carbon materials may bring the adsorption/desorption kinetics closer to room temperature. Also, single wall carbon nanotubes have dimensions that are close to that required for capillary condensation of hydrogen molecules and may offer an alternative strategy. Finally, the incorporation of metal particles into the structure of the carbon particles may provide another mechanism to bring the reaction conditions closer to more commercially viable conditions. A recent example of such materials is described in U.S. Patent Application Publication No. 2002/0096048 by Cooper et al., which is incorporated herein by reference in its entirety.

Reversible hydrogen storage materials also include metals, such as Pt, or metal alloys, mixed with or dispersed on the surface of carbon particulates. The carbon particles may also be modified on their surface with organic functional groups to enhance their absorption capability in a number of different ways. Surface. modification helps to selectively bind a catalytically active material, such as a molecular metal-containing complex or a nanometer-sized catalytically active particle, to the surface of the carbon particle. Modified carbon blacks comprising metal particles are described in U.S. Pat. Nos. 6,399,202, 6,280,871, 6,630,268, 6,522,522, U.S. Patent Application Publication No. 2003/0017379 and U.S. Patent Application Publication No. 2003/0022055, each of which is incorporated herein by reference in its entirety. Surface functional groups also affect the uptake of gaseous species, such as hydrogen, by changing the packing characteristics of the carbon particles, as well as the carbon surface characteristics to be, for example, hydrophobic or hydrophilic. Typical surface function groups include carboxylic acids, sulfonyllic acids, amines and the like. A method by which the surface of the carbon particles can be modified is through reactions with diazonium salts of the desired organic functional groups, as described by Belmont et al. in U.S. Pat. Nos. 5,851,280, 6,494,946, 6,042,643, 5,900,029, 5,554,739 and 5,672,198, each of which is incorporated herein by reference in its entirety.

There are also other types of materials, which have been demonstrated to exhibit hydrogen storage properties. These include a number of carboxylate compounds such as zinc acetate.

There are several aspects to the design of hydrogen storage materials which must be successfully addressed in order for such materials to be commercially viable. First, such materials must have a reasonable reversible hydrogen storage capacity. The US DOE target for automotive applications is currently 6.5 wt. % reversible hydrogen storage. Second, the hydrogen storage materials must also exhibit a reproducible capacity over many cycles of hydrogen uptake under conditions of temperature and pressure, which are preferably close to room temperature and pressure. Further, the materials must also have good low-temperature kinetics and equilibrium plateau pressures. They must perform well and be reversible under the highly exothermic charging steps and must be incorporated in systems with good thermal management. In addition, like most sorbents, materials that chemically store hydrogen expand during the adsorption step, and become embrittled. Ideally, the materials should remain intact during the course of the reversible hydrogen uptake and avoid decrepitation, which can have serious operational and safety issues.

It would be advantageous to provide a method for producing particulate absorbent materials or intermediate compounds capable of being converted to absorbent materials that would enable control over the powder characteristics such as particle size, surface area and pore structure, as well as the versatility to accommodate compositions which are either difficult or impossible to produce using existing production methods. It would be particularly advantageous if such powders could be produced in large quantities on a substantially continuous basis. Further value can be derived from these powders if they can be incorporated into structures that can be integrated into reactor beds that enable a suitable combination of high space velocity and high absorption capacity while retaining their performance characteristics. Such structures include coatings such as wash coatings on highly porous monoliths, pellets that have pore structures that retain the performance of the powders, and also coatings or impregnation of the powder particles into other structures, such as metal cloths which provide beneficial heat transfer characteristics.

SUMMARY OF THE INVENTION

The present invention is directed to reversible absorbents that have high absorption capacities and can withstand many regeneration cycles without significant loss of performance.

According to one embodiment of the present invention, a particulate absorbent material for the absorption of a chemical species from a fluid (e.g., a gas or a liquid) is provided. The absorbent material is fabricated by a process including the steps of providing a precursor solution comprising at least a first precursor to an absorbent compound, atomizing the precursor solution to form precursor droplets comprising the first precursor, heating the precursor droplets remove liquid therefrom and form dried precursor droplets and converting the dried precursor droplets to a particulate absorbent material.

According to one aspect of this embodiment of the invention, the heating step and the converting step occur sequentially in a spray pyrolysis. According to another aspect, the heating step forms an intermediate compound capable of being post-processed to form a particulate absorbent material, and the converting step comprises heating the intermediate compound to form the particulate absorbent material. According to another aspect, the first precursor is selected from the group consisting of a metal nitrate, a metal acetate, a metal oxalate and a metal hydroxide. According to another aspect, the first precursor comprises a metal oxalate. According to another aspect, the absorbent material comprises a metal oxide. According to another aspect, the absorbent material comprises a metal oxide selected from Group 1 and Group 2 metal oxides. According to another aspect, the absorbent material comprises a metal oxide selected from the group consisting of magnesium oxide, calcium oxide, strontium oxide and barium oxide. According to another aspect, the absorbent material comprises calcium oxide.

According to another aspect, the absorbent material comprises a metal oxide and the precursor solution comprises a metal salt selected from the group consisting of a metal oxalate salt and a metal hydroxide salt. According to another aspect, the absorbent material comprises a misch metal. According to another aspect, the heating step comprises heating the droplet in the presence of an oxygen-containing gas. According to another aspect, the precursor solution further comprises a morphology-enhancing agent.

According to another aspect, the precursor solution also includes a morphology-enhancing agent selected from the group consisting of lactic acid, glycine, alcohols, ammonium nitrate, polymers and carbohydrazide.

According to another aspect, the precursor solution further comprises a precursor to a compound selected from the group consisting of aluminum oxide, magnesium oxide, silicon oxide and titanium oxide. According to another aspect, the particulate absorbent material comprises CaO:MgO. According to another aspect, the precursor solution further comprises a precursor to magnesium oxide, such as magnesium nitrate.

According to another aspect, the precursor solution further comprises a precursor to alumina, such as particulate alumina.

According to another aspect, the precursor solution further comprises a precursor to a metal selected from the group consisting of Mg, Ni, Zn and Cu.

According to another aspect, the heating step comprises heating the precursor droplets to a temperature of at least about 300° C. According to another aspect, the atomizing step comprises atomizing the precursor solution using a spray nozzle., According to another aspect, the atomizing step comprises atomizing the precursor using ultrasonic transducers. According to another aspect, the particulate absorbent material has an average size of from about 1 µm to about 50 µm.

According to one aspect, the particulate absorbent material is pelletized. According to another aspect, the particulate absorbent material is coated on a support structure.

According to another aspect, the particulate absorbent material has a substantially spherical morphology.

According to another aspect, the particulate absorbent material is further heated in a post-processing step.

According to another aspect, the particulate absorbent material has a pore volume of at least about 0.04 g/cm$^3$, such as at least about 0.15 g/cm$^3$. According to another aspect, the particulate absorbent material has a surface area of at least about 15 m$^2$/g, such as at least about 30 m$^2$/g.

According to another aspect, the absorbent material is adapted to absorb $CO_2$ and has an absorption capacity of at least about 20 grams $CO_2$ per 100 grams of unreacted absorbent material. According to another aspect, the absorbent compound maintains the absorption capacity over at least 100 cycles. According to another aspect, the absorbent material is adapted to absorb $CO_2$ and has an absorption capacity of at least about 30 grams $CO_2$ per 100 grams of unreacted absorbent material. According to another aspect, the absorbent material comprises an absorbent compound having an absorption capacity of at least about 70 mol. %. According to another aspect, the absorbent material comprises an absorbent compound having an absorption capacity of at least about 90 mol. %. The absorbent compound can maintain the absorption capacity over at least 100 cycles.

According to one aspect, the heating step comprises heating the droplets in a spray dryer, such as to form an intermediate compound that can be converted to an absorbent material.

According to another embodiment, particulate absorbent material adapted for the absorption of a chemical species from a fluid, the particulate absorbent material comprises an intimate mixture of at least a first absorbent compound and a metal oxide that is different than the first absorbent compound, and the particulate absorbent material has a surface area of at least about 5 $m^2/g$.

According to another aspect, the absorbent compound is selected from Group 1 and Group 2 metal oxides. According to another aspect, the absorbent compound is a calcium compound, such as CaO. According to another aspect, the metal oxide is selected from the group consisting of $Al_2O_3$, MgO, $SiO_2$ and $TiO_2$. According to another aspect, the particulate absorbent material is in the form of substantially spherical particles.

According to another aspect, the surface area is at least about 10 $m^2/g$, such as at least about 15 $m^2/g$ or at least about 30 $m^2/g$.

According to another aspect, the particulate absorbent material has a pore volume of at least about 0.01 $cm^3/g$, such as at least about 0.04 $cm^3/g$ or at least about 0.15 $cm^3/g$.

According to another aspect, the metal oxide comprises from about 1 wt. % to 50 wt. % of the particulate absorbent material.

According to another aspect, where the metal oxide comprises from about 5 wt. % to about 25 wt. % of the particulate absorbent material.

According to another aspect, the particulate absorbent compound has an absorption capacity of at least about 50 mol. % for at least one selected chemical species. According to another aspect, the particulate absorbent compound has an absorption capacity of at least about 70 mol. % for at least one selected chemical species. According to another aspect, the particulate absorbent compound has an absorption capacity of at least about 90 mol. % for at least one selected chemical species.

According to another aspect, the absorbent compound has an absorption capacity of at least about 50 mol. % for at least one selected chemical-species after at least 100. cycles. According to another aspect, the absorbent compound has an absorption capacity of at least about 70 mol. % for at least one selected chemical species after at least 100 cycles. According to another aspect, the absorbent compound has an absorption capacity of at least about 90 mol. % for at least one selected chemical species after at least 100 cycles.

According to another embodiment of the present invention, a method for the fabrication of a particulate absorbent material is provided. The method can include the steps of atomizing a liquid-containing precursor solution to form precursor droplets, the precursor solution comprising at least a first precursor to an absorbent compound, heating the precursor droplets to form dried precursor droplets, and converting the dried precursor droplets to an absorbent material comprising an absorbent compound.

According to one aspect, the heating step and the converting step occur sequentially in a spray pyrolysis operation. According to another aspect, the heating step forms an intermediate compound capable of being post-processed to form a particulate absorbent material, and the converting step comprises heating the intermediate compound to form the particulate absorbent material.

According to another aspect, the first precursor is at least partially soluble in the precursor solution. According to another aspect, the first precursor is selected from the group consisting of metal oxalates and metal hydroxides. According to another aspect, the first precursor is selected from the group consisting of calcium nitrate, calcium acetate, calcium oxalate and calcium hydroxide. According to another aspect, the first precursor comprises calcium oxalate.

According to another aspect, the heating step comprises heating the droplets in the presence of an oxygen-containing gas.

According to another aspect, the precursor solution further comprises a morphology-enhancing agent, such as a morphology-enhancing agent selected from the group consisting of lactic acid, glycine, alcohols, ammonium nitrate, polymers and carbohydrazide.

According to another aspect, the precursor solution further comprises a second precursor, the second precursor being selected to form a compound selected from the group consisting of aluminum oxides, magnesium oxides, silicon oxides and titanium oxides. According to another aspect, the precursor solution further comprises a second precursor, the second precursor being selected to form magnesium oxide. According to another aspect, the precursor solution further comprises a second precursor comprising magnesium nitrate. According to another aspect, the precursor solution further comprises a second precursor, the second precursor being selected to form alumina. According to another aspect, the precursor solution further comprises a second precursor comprising particulate alumina.

According to another aspect, the precursor solution further comprises a second precursor, the second precursor being selected to form a metal selected from the group consisting of Mg, Ni, Zn and Cu.

According to another aspect, the heating step comprises heating the precursor droplets to a temperature of at least about 300° C. According to another aspect, the converting step comprised heating the intermediate compound.

According to another aspect, the atomizing step comprises atomizing the precursor solution using a spray nozzle. According to another aspect, the atomizing step comprises atomizing the precursor solution using ultrasonic transducers.

According to another aspect, the particles have an average size of from about 1 µm to about 50 µm. According to another aspect, the particulates have substantially spherical morphology.

According to one aspect, the absorbent material comprises CaO. According to another aspect, the absorbent material comprises ZnO. According to another aspect, the absorbent material comprises $Li_2O$.

According to another embodiment of the present invention, a method for the fabrication of a particulate $NO_x$ absorbent material is provided. The method includes the steps of providing a precursor solution comprising at least a first precursor to a $NO_x$ absorbent compound, atomizing the precursor solution to form precursor droplets, heating the precursor droplets to form dried precursor droplets, and converting the dried precursor droplets to an absorbent material comprising an absorbent compound for $NO_x$.

According to one aspect, the heating step and the converting step occur sequentially in a spray pyrolysis process. According to another aspect, the heating step forms an intermediate compound capable of being post-processed to form a particulate absorbent material, and the converting step comprises heating the intermediate compound to form the particulate absorbent material.

According to one aspect, the $NO_x$ absorbent compound comprises a compound selected from the group consisting of the oxides, hydroxides or carbonates of the alkali metals, alkaline earth metals and lanthanide metals.

According to one aspect, the $NO_x$ absorbent compound comprises an oxide, hydroxide or carbonate of a metal selected from Na, K, Ca or Ba. According to another aspect, the $NO_x$ absorbent compound comprises $MnO:ZrO_2$. According to another aspect, the $NO_x$ absorbent compound comprises $CeO_2$. According to one aspect, the $NO_x$ absorbent compound comprises a Y—Ba—Cu—O compound.

According to another embodiment, a method for the fabrication of a particulate $H_2S$ absorbent material is provided. The method includes the steps of providing a precursor solution comprising at least a first precursor to a $H_2S$ absorbent compound, atomizing the precursor solution to form precursor droplets, heating the precursor droplets to form a particulate $NO_x$ absorbent compound and converting the dried precursor droplets to an absorbent material comprising an absorbent compound.

According to one aspect, the heating step and the converting step occur sequentially in a spray pyrolysis process. According to another aspect, the heating step forms an intermediate compound capable of being post-processed to form a particulate absorbent material, and the converting step comprises heating the intermediate compound to form the particulate absorbent material.

According to one aspect, the $H_2S$ absorbent compound comprises CaO. According to another aspect, the $H_2S$ absorbent compound comprises ZnO.

According to another embodiment of the present invention, a method for the fabrication of a reversible hydrogen storage material is provided. The method includes the steps of providing a precursor solution comprising at least a first precursor to a hydrogen storage compound, atomizing the precursor solution to form precursor droplets, heating the precursor droplets to form dried precursor droplets, and converting the dried precursor droplets to an absorbent material comprising an absorbent compound.

According to one aspect, the heating step and the converting step occur sequentially in a spray pyrolysis process. According to another aspect, the heating step forms an intermediate compound capable of being post-processed to form a particulate absorbent material, and the converting step comprises heating the intermediate compound to form the particulate absorbent material.

According to another aspect, the hydrogen storage compound comprises a misch metal, such as one selected from the group consisting of $LaNi_5$, $Mg_2Ni$, $Mg_2Fe$, TiFe, and $ZrMn_2$. According to another aspect, the hydrogen storage compound comprises a metal hydride, such as one selected from the group consisting of $NaBH_4$, $AlH_3$, $LiAlH_4$ and $Mg(AlH_4)_2$.

According to another embodiment, the hydrogen storage compound comprises an alkali metal nitride.

DESCRIPTION OF THE INVENTION

Figure 1:
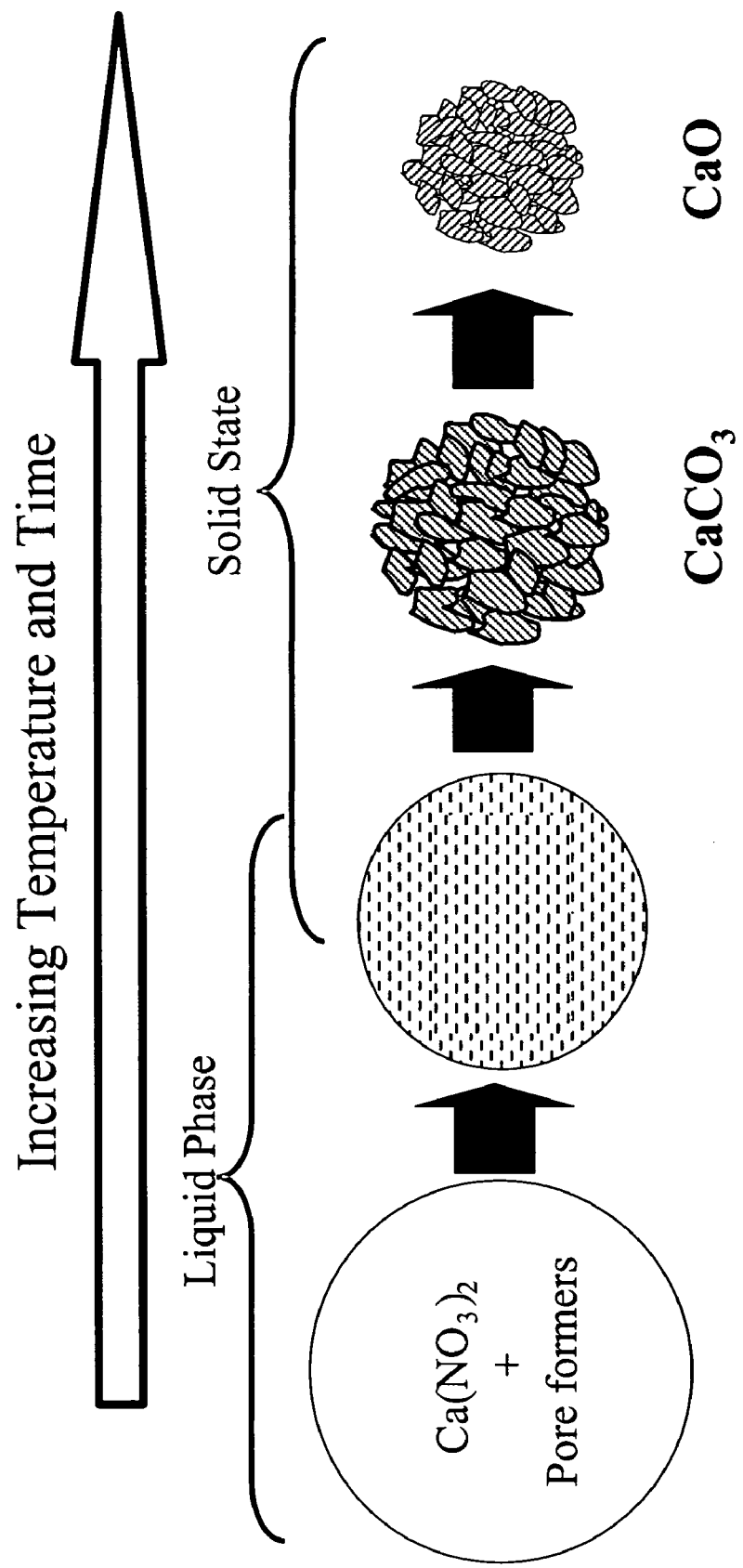
FIG. 1 schematically illustrates a spray pyrolysis method for the fabrication of Ca-based particles according to an embodiment of the present invention.

The present invention is directed to improved materials and methods for making the materials that are particularly useful for the absorption of a chemical species such as $H_2S$, $CO_2$, $NO_x$, $H_2$ and others from a fluid stream such as a liquid or gaseous stream. The materials can include, but are not limited to, metal oxides such as Group 1 and Group 2 metal oxides, metals, metal mixtures, metal alloys, metal hydrides, molecular compounds, carbon materials, lithium silicates, lithium zirconates and others.

The "absorption" of one species by an absorbent material can occur by a variety of different mechanisms and is often described using a number of different terms which can often lead to confusion. In the present application, the word absorption and the process of absorption is used in the broadest sense to include at least physisorption, chemical absorption and absorption with chemical reaction.

Physisorption of a molecular species on the surface of a solid includes an interaction that is primarily a physical interaction and is largely a result of Van der Waals interactions. An example of this type of interaction is the physorption of $H_2$ molecules on a carbon surface or the intercalation of a molecular species in a porous solid such as a molecular sieve. Chemical adsorption of a molecular species on a surface, typically includes dissociative adsorption where the adsorbed species is chemically bonded to the surface of the adsorbent. An example of this type of chemical adsorption is the dissociation of a molecular species on the surface of a metal, or water on the surface of silica to form surface hydroxyl groups. Absorption and chemical reaction of a molecular species can occur with the bulk of the absorbent to form a new, typically stoichiometric compound. An example of this kind of process is the reaction of ZnO with $H_2S$ to form ZnS and $H_2O$. This kind of bulk absorption typically occurs via the first two processes described above, physiorption on the surface followed by chemical reaction with the surface and/or diffusion into the bulk of the material until the reaction is complete. As used herein, the term absorption, absorbent or similar terms refer generally to all of the foregoing mechanisms.

Overview of Spray Processing

The absorbent materials of the present invention are preferably fabricated by spray drying, spray conversion or spray pyrolysis methods, which are collectively referred to herein as spray processing methods. The spray processing methods of the present invention are capable of producing a wide variety of absorbent materials and desired microstructures. The major attribute of this approach is the ability to fabricate compositions and microstructures that cannot be fabricated by other powder manufacturing methods, combined with the ability to economically produce high volumes of absorbent material. The flexibility to fabricate unique combinations of compositions and microstructures comes from the fact that spray processing combines aspects of both liquid phase and solid state processing.

Spray processing generally includes the steps of providing a precursor composition, typically in a flowable liquid form. The precursor composition typically includes at least a precursor to the absorbent material. In the case of supported absorbent materials, the precursor composition can also include a precursor to or a suspension of the support phase. The precursor composition is atomized to form a suspension of liquid precursor droplets and the liquid is removed from the liquid precursor droplets, such as by heating, to form the powder. Typically, at least one component of the liquid precursor is chemically converted into a desired component of the powder. In spray pyrolysis, the chemical conversion occurs within the reactor into which the solution is sprayed. In spray conversion, the precursor is partially converted to form an intermediate compound, and the intermediate compound is converted to the final material in a post-processing step.

According to one embodiment of the present invention, the absorbent compound can be selected from metal oxides, and in particular can be selected from Group 1 and Group 2 metal oxides. Examples of Group I metal oxides include lithium oxide, sodium oxide and potassium oxide. Examples of Group 2 metal oxides include magnesium oxide, calcium oxide, strontium oxide and barium oxide. Particularly preferred among these for $CO_2$ absorption are the Group 2 metal oxides, particularly calcium oxide. Lithium oxide is also preferred for some applications. It will be appreciated that other metal oxide compounds may be useful for the absorption of a particular chemical species (e.g., silver oxide), and such metal oxide compounds are also within the scope of the present invention. The preferred absorbent compound will depend upon a number of factors, particularly the absorption temperature that is utilized for a given absorption process.

Accordingly, CaO is a preferred absorbent compound for $CO_2$ absorption at temperatures in the range of 500° C. to about 900° C. Lithium oxide and magnesium oxide can be preferred for use at lower temperatures. These temperature ranges can change if the absorbent compound is mixed with an inert material. For example, CaO can be mixed with $TiO_2$ to increase the useful absorption temperature to about 1100° C.

Another factor governing the selection of an absorbent compound is the theoretical absorption capacity of the absorbent compound. It is preferred to use an absorbent compound having the highest absorption capacity whenever possible.

It will also be appreciated that a physical mixture of two or more absorbent compounds can be utilized provide an absorbent mixture that has desirable absorption properties over a wide range of absorption conditions, such as temperature, or to absorb more than one chemical species in a single reactor space.

Spray processing precursors for such metal oxide compounds can include metal salts, such as metal nitrates, oxalates, acetates and hydroxides. Thus, particularly preferred precursors include Group 2 metal nitrates, Group 2 metal oxalates, Group 2 metal acetates and Group 2 metal hydroxides. For some applications, Group 2 metal oxalates are particularly preferred.

CaO is one preferred absorbent compound according to the present invention. Preferred spray processing precursors for CaO can be selected from calcium metal salts such as calcium nitrate $Ca(NO_3)_2$, calcium oxalate $CaC_2O_4$, calcium acetate $Ca(C_2H_3O_2)_2$ and calcium hydroxide $Ca(OH)_2$.

Another preferred absorbent compound according to one embodiment of the present invention is zinc oxide (ZnO), which is particularly useful for the absorption of $H_2S$. Preferred spray processing precursors for ZnO can be selected from zinc metal salts such as zinc nitrate, zinc oxalate, zinc acetate and zinc hydroxide.

Other preferred absorbent compounds include, for example, copper oxide, silver oxide, barium oxide, barium carbonate, nickel oxide, iron oxide and lithium oxide. Preferred spray processing precursors for these materials can include metal organic compounds (e.g., metal carboxylates), inorganic compounds (e.g., metal nitrates) and organometallic compounds (e.g., olefin complexes and metal acetates).

It is often desirable to form the absorbent material with a high level of porosity or crystallinity, and, therefore, it may be advantageous to include a morphology enhancing agent in the precursor composition to enhance the porosity or crystallinity of the powder. Preferred morphology enhancing agents can be selected from lactic acid, glycine, alcohols, ammonium nitrate, polymers and carbohydrazide. The amount of morphology enhancing agent in the precursor solution, if used, can preferably be varied from about 0.05 vol. % to about 20 vol. %, expressed as a percentage of the total volume of the precursor solution.

Other compounds can be included in the absorbent materials according to the present invention, as is discussed in more detail below. Included among these are aluminum oxides, magnesium oxides, silicon oxides or titanium oxides. Precursors for such materials can include nitrate salts, such as aluminum, nitrate $Al(NO_3)_3$ or magnesium nitrate $Mg(NO_3)_2$, as well as particulate dispersions of the metal oxides (e.g., fumed metal oxides) or precursors to the metal oxides (e.g., boehmite). In addition, the absorbent material can include other metals such as iron, magnesium, zinc, manganese, cobalt and copper. Precursors for these metals can be selected from the metal nitrates, sulfates, carbonates, acetates, oxalates, hydroxides and metal oxide nanoparticles, including fumed metal oxides.

Although the following description refers primarily to the production of CaO by spray processing, it will be appreciated that the process is generally applicable to other absorbent materials.

Figure 2:
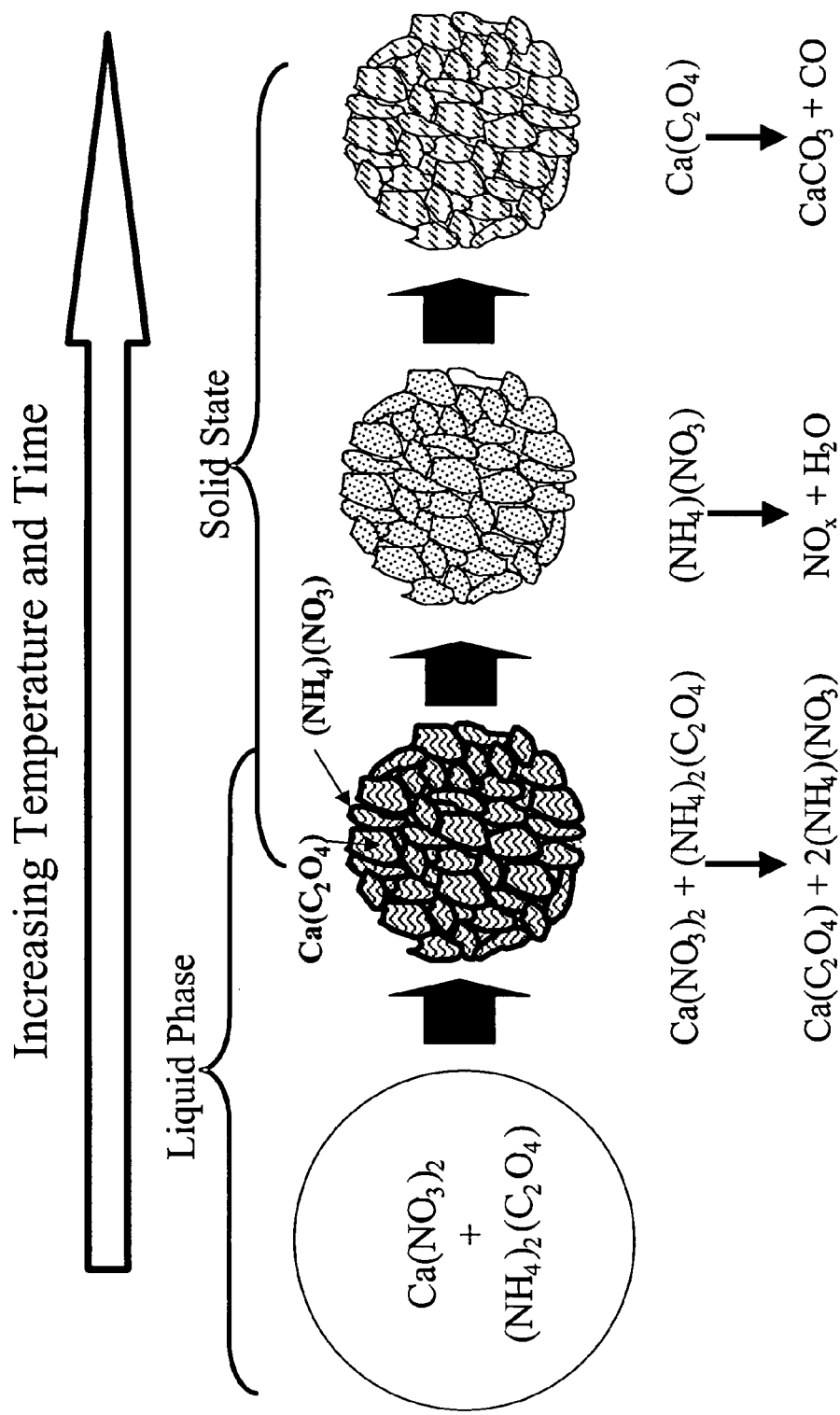
FIG. 2 schematically illustrates a spray conversion method for the fabrication of Ca-based particles according to an embodiment of the present invention.
Figure 3:
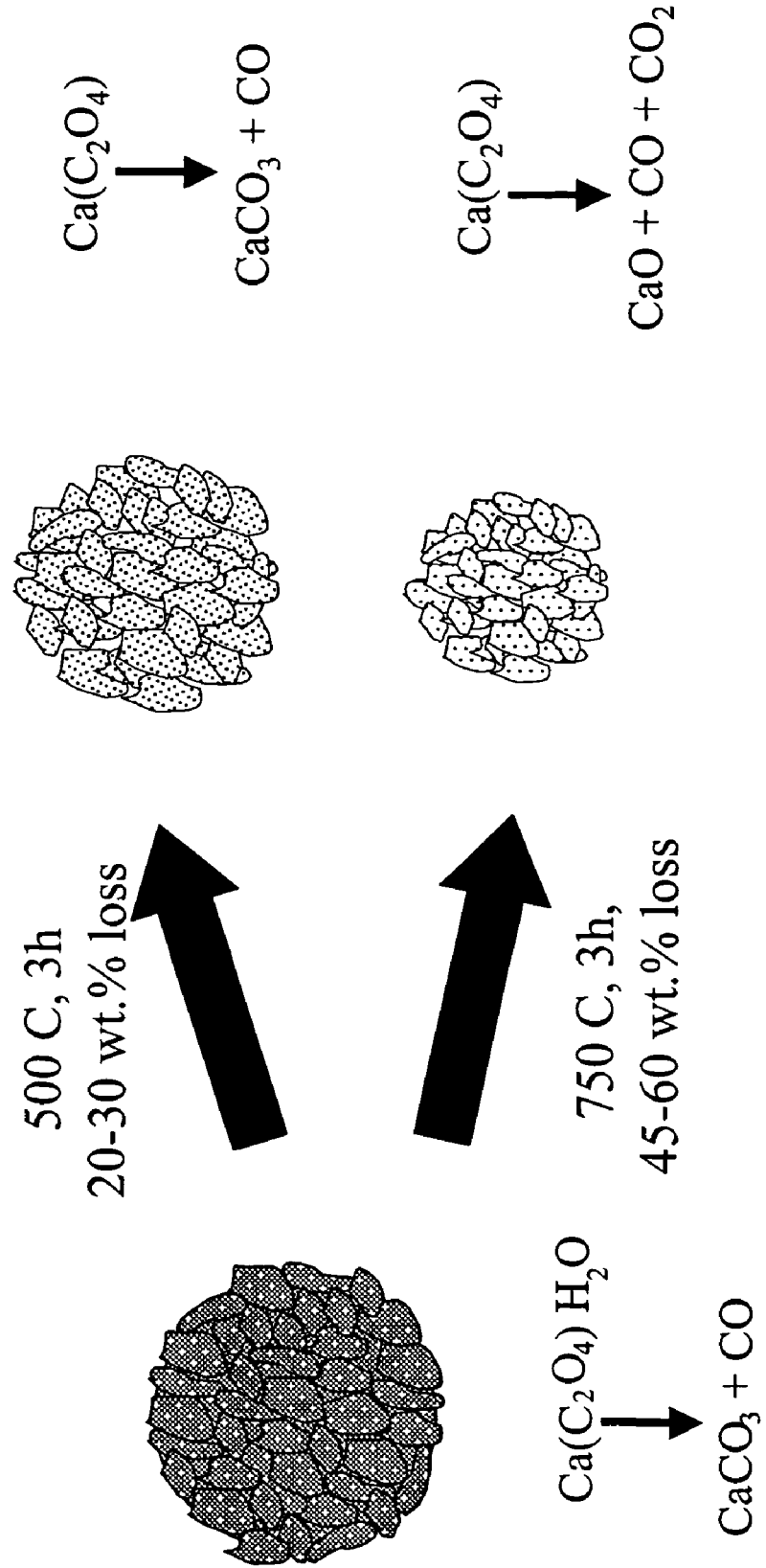
FIG. 3 schematically illustrates a post-processing method for the fabrication of Ca-based particles according to an embodiment of the present invention.

The spray processing methods can combine the drying of the precursors and the conversion to the absorbent material in one step, where both the removal of the solvent and the conversion of a precursor occur essentially simultaneously. This method is referred to as spray pyrolysis, and is schematically illustrated in FIG. 1 for the fabrication of CaO. In another embodiment, the spray processing method achieves the drying of the precursors and a partial conversion of the precursors to an intermediate compound. This method is schematically illustrated in FIG. 2 for the fabrication of an intermediate compound to CaO. The complete conversion to the absorbent compound and/or the crystallization of the material can occur in a second step, such as the step that is schematically illustrated in FIG. 3 for CaO. This second step is referred to herein as post-processing, and typically includes heating the particles that include the intermediate compound.

Figure 4:
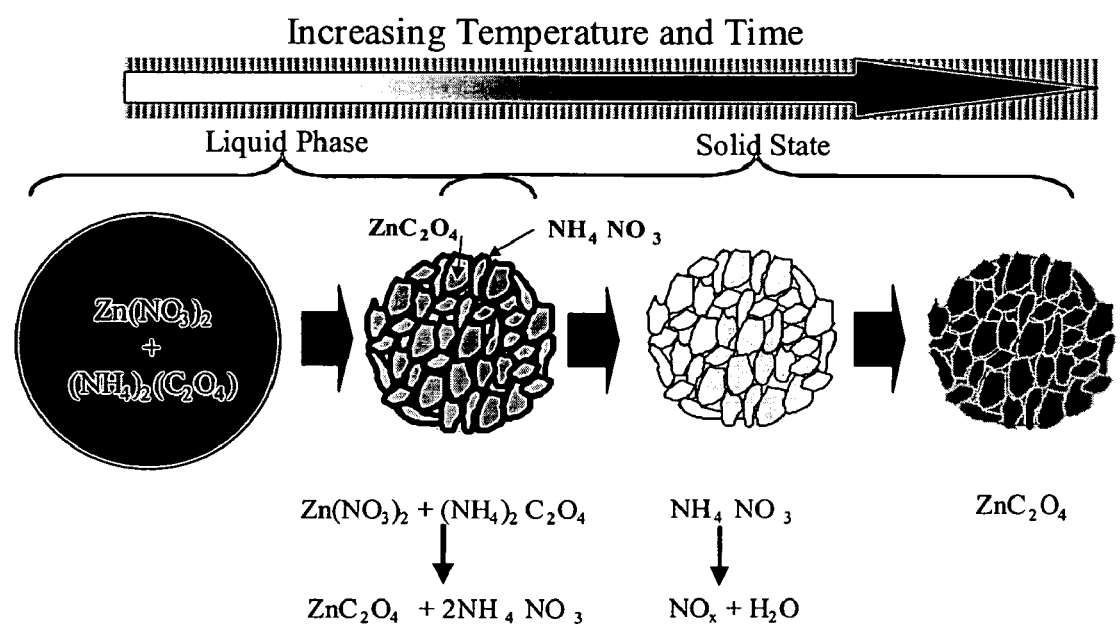
FIG. 4 schematically illustrates a spray conversion method for the fabrication of Zn-based particles according to an embodiment of the present invention.

A spray processing method to achieve drying of the precursors and a partial conversion of the precursors to an intermediate compound for the fabrication of ZnO from Zn-nitrate is schematically illustrated in FIG. 4. The post-processing of the intermediate compound to form ZnO is illustrated in FIG. 5.

Figure 5:
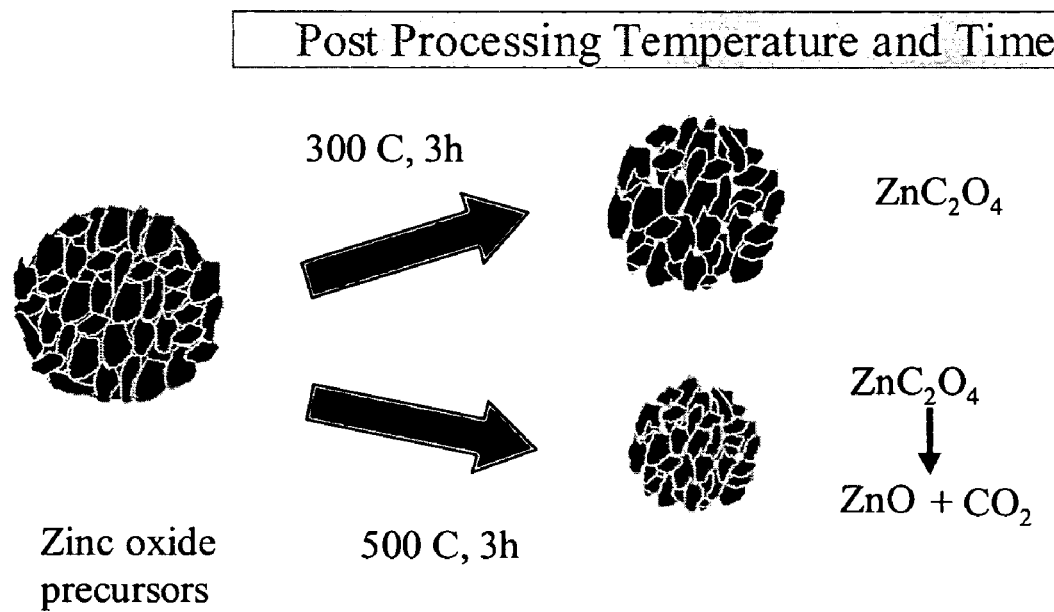
FIG. 5 schematically illustrates a post-processing method for the fabrication of Zn-based particles according to an embodiment of the present invention.

Thus, spray drying or spray conversion can be followed by conventional heating or calcination, e.g., a method illustrated in FIGS. 2 and 4 followed by a method such as that illustrated in FIGS. 3 and 5. By varying reaction time, temperature and type of precursors, the spray processing methods can produce powder morphologies and absorbent material structures that yield improved performance.

When the absorbent compound is dispersed on an inert support in the form of absorbent material clusters, the precursor composition can include particulates that form the inert support phase. According to the present invention, such particulates can include particulate carbon or particulate metal oxides, such as aluminum oxide (e.g., boehmite) fumed metal oxides and aerogels. Preferably, such particulates have an average size of at least about 50 nm and not greater than about 200 nm.

Preferably, the supported absorbent material phase is formed while the precursor to the absorbent material phase is in intimate contact with the surface of the support phase particles and the absorbent material precursor is rapidly reacted on the surface of the support phase particles. The reaction and formation of the supported absorbent material preferably occurs over a very short period of time such that the growth of large active material clusters is limited. Preferably, the absorbent material precursor is exposed to the elevated reaction temperature to form the absorbent material for not more than about 600 seconds, more preferably not more than about 100 seconds and even more preferably not more than about 10 seconds. The means by which the absorbent material precursor is reacted is discussed in detail below.

Preferably, the spray processing methods are capable of forming a spherical particle structure. The spherical particles form as a result of the formation and drying of the precursor droplets during spray processing. Spherical particles can advantageously enhance the particle packing characteristics in a packed powder bed, and can be advantageous in the formation of extrudates, pellets or monoliths.

Spray processing methods for the production of the absorbent compounds and other components of the absorbent material can be grouped by reference to several different attributes of the apparatus used to carry out the method. These attributes include: the main gas flow direction (vertical or horizontal); the type of atomizer (submerged ultrasonic, ultrasonic nozzle, two-fluid nozzle, single nozzle pressurized fluid); the type of gas flow (e.g., laminar with no mixing, turbulent with no mixing, co-current of droplets and hot gas, countercurrent of droplets and gas or mixed flow); the type of heating (e.g., hot wall system, hot gas introduction, combined hot gas and hot wall, plasma or flame); and the type of powder collection system (e.g., cyclone, bag house, electrostatic or settling).

For example, the absorbent material powders of the present invention can be prepared by starting with a precursor liquid, such as an aqueous-based liquid, including a dissolved, metal salt and/or a dispersion of particulates that are either inert materials or intermediate compounds to the absorbent compounds. The processing temperature of the precursor droplets can be controlled so the metal salt precursor decomposes to form the absorbent material, a solid precursor (intermediate compound) to the absorbent material, or a combination of the intermediate compound and the absorbent material.

The first step in the process is the evaporation of the solvent as the droplet is heated resulting in a particle of dried solids and/or metal salts. A number of methods to deliver heat to the particle are possible: horizontal hot-wall tubular reactors, spray dryer and vertical tubular reactors can be used, as well as plasma, flame and laser reactors. Horizontal hot-wall tubular reactors are disclosed in U.S. Pat. No. 6,103,393 by Kodas et al. and are referred to herein as spray pyrolysis reactors. Spray dryers are disclosed, for example, in U.S. Pat. No. 5,615,493 by Funder and U.S. Pat. No. 5,100,509 by Pisecky et al. A plasma reactor is disclosed in U.S. Pat. No. 6,689,192 by Phillips et al. and a flame reactor is disclosed in U.S. Pat. No. 5,958,361 by Laine et al. Laser reactors are disclosed in U.S. Pat. No. 6,248,216 by Bi et al. Each of the foregoing U.S. Patents is incorporated herein by reference in its entirety.

As the particles experience either higher temperature or longer time at a specific temperature, the precursors decompose. Preferably, the time that the droplets/particles experience a given temperature can be controlled and therefore the degree of porosity, crystallinity, the microstructure and other properties can also be controlled.

The atomization technique for generating the precursor droplets has a significant influence over the characteristics of the final absorbent material powder, such as the particle surface area, porosity, size, the spread of the particle size distribution (PSD), as well as the production rate of the powder. In extreme cases, some techniques cannot atomize fluids with even moderate particle loadings or high viscosities. Several methods exist for the atomization of precursor compositions, including those that contain suspended particulates. These methods include but are not limited to: ultrasonic transducers (usually at a frequency of 1-3 MHz); ultrasonic nozzles (usually at a frequency of 10-150 KHz); rotary atomizers; two-fluid nozzles; and pressure atomizers.

Ultrasonic transducers are generally submerged in a liquid and the ultrasonic energy produces atomized droplets on the surface of the liquid. Two basic ultrasonic transducer disc configurations, planar and point source can be used. Deeper fluid levels can be atomized using a point source configuration since the energy is focused at a point that is some distance above the surface of the transducer. The scale-up of submerged ultrasonic transducers can be accomplished by placing a large number of ultrasonic transducers in an array. Such a system is illustrated in U.S. Pat. No. 6,103,393 by Kodas et al. and U.S. Pat. No. 6,338,809 by Hampden-Smith et al., and the disclosure of each of these U.S. Patents is incorporated herein by reference in its entirety.

Scale-up of nozzle systems can be accomplished by either selecting a nozzle with a larger capacity or by increasing the number of nozzles used in parallel. Typically, the droplets produced by nozzles are larger than those produced by ultrasonic transducers. Particle size is also dependent on the gas flow rate. For a fixed liquid flow rate, an increased airflow decreases the average droplet size and a decreased airflow increases the average droplet size. It is difficult to change droplet size without varying the liquid or airflow rates. However, two-fluid nozzles have the ability to process larger volumes of liquid per time than ultrasonic transducers.

Ultrasonic spray nozzles also use high frequency energy to atomize a fluid. Ultrasonic spray nozzles have some advantages over single or two-fluid nozzles such as the low velocity of the spray leaving the nozzle and lack of associated gas flow. The nozzles are available with various orifice sizes and orifice diameters that allow the system to be scaled for the desired production capacity. In general, higher frequency nozzles are physically smaller, produce smaller droplets, and have a lower flow capacity than nozzles that operate at lower frequencies. A drawback of ultrasonic nozzle systems is that scaling up the process by increasing the nozzle size increases the average particle size. If a particular particle size is required, then the maximum production rate per nozzle is set. If the desired production rate exceeds the maximum production rate of the nozzle, additional nozzles or additional production units are required to achieve the desired production rate.

The shape of the atomizing surface determines the shape and spread of the spray pattern. Conical, microspray and flat atomizing surface shapes are available. The conical atomizing surface provides the greatest atomizing capability and has a large spray envelope. The flat atomizing surface provides almost as much flow as the conical surface but limits the overall diameter of the spray. The microspray atomizing surface is for very low flow rates where narrow spray patterns are needed. These nozzles are preferred for configurations where minimal gas flow is required in association with the droplets.

Particulate suspensions in the precursor solution (e.g., for the production of a supported active material) may present several problems with respect to atomization. For example, submerged ultrasonic atomizers re-circulate the suspension through the generation chamber and the suspension concentrates over time. Further, some fraction of the liquid atomizes without carrying the suspended particulates. Other problems encountered when using submerged ultrasonic transducers is that the transducer discs can become coated with the particles and or precursor over time. Further, the generation rate of particulate suspensions can be very low using submerged ultrasonic transducer discs. This is due in part to energy being absorbed or reflected by the suspended particles.

For spray drying, the aerosol can be generated using three basic methods. These methods differ in the type of energy used to break the liquid masses into small droplets. Rotary atomizers (utilization of centrifugal energy) make use of spinning liquid droplets off of a rotating wheel or disc. Rotary atomizers are useful for co-current production of droplets in the range of 20 µm to 150 µm in diameter. Pressure nozzles (utilization of pressure energy) generate droplets by passing a fluid under high pressure through an orifice. These can be used for both co-current and -mixed-flow reactor configurations and typically produce droplets in the size range of 50 µm to 300 µm. Multiple fluid nozzles such as a two-fluid nozzle produce droplets by passing a relatively slow moving fluid through an orifice while shearing the fluid stream with a relatively fast moving gas stream. As with pressure nozzles, multiple fluid nozzles can be used with both co-current and mixed-flow spray dryer configurations. This type of nozzle can typically produce droplets in the size range of 5 µm to 200 µm.

For example, two-fluid nozzles are used to produce aerosol sprays in many commercial applications, typically in conjunction with spray drying processes. In a two-fluid nozzle, a low-velocity liquid stream encounters a high-velocity gas stream that generates high shear forces to accomplish atomization of the liquid. A direct result of this interaction is that the droplet size characteristics of the aerosol are dependent on the relative mass flow rates of the liquid precursor and nozzle gas stream. The velocity of the droplets as they leave the generation zone can be quite large which may lead to unacceptable losses due to impaction. The aerosol also leaves the nozzle in a characteristic pattern, typically a flat fan, and this may require that the dimensions of the reactor be sufficiently large to prevent unwanted losses on the walls of the system.

Thus, numerous atomization techniques for spray processing are possible for the production of absorbent material powders and different versions are preferred for different feed streams and products.

The atomized precursor composition must be heated to remove solvents and react precursor components. For example, a horizontal, tubular hot-wall reactor can be used to heat a gas stream to a desired temperature. Energy is delivered to the system by maintaining a fixed boundary temperature at the wall of the reactor and the maximum temperature of the gas is the wall temperature. Heat transfer within a hot wall reactor occurs through the bulk of the gas. Buoyant forces that occur naturally in horizontal hot wall reactors aid this transfer. The mixing also helps to improve the radial homogeneity of the gas stream. Passive or active mixing of the gas can also increase the heat transfer rate. The maximum temperature and the heating rate can be controlled independent of the inlet stream with small changes in residence time. The heating rate of the inlet stream can also be controlled using a multi-zone furnace.

The use of a horizontal hot-wall reactor according to the present invention is generally preferred to produce particles with a size of not greater than about 5 µm. Above about 5 µm, settling of particles can cause significant material losses. One disadvantage of such reactors is the poor ability to atomize particulates when using submerged ultrasonics for atomization.

Alternatively, the horizontal hot-wall reactor can be used with a two-fluid nozzle to atomize the droplets. This approach is preferred for precursor feed streams containing higher levels of particulate materials, such as a particulate support precursor. A horizontal hot-wall reactor can also be used with ultrasonic nozzle atomization techniques. This allows atomization of a precursor containing particulates, however the large droplet size leads to losses of materials on reactor walls and other surfaces making this an expensive method for powder production.

While horizontal hot-wall reactors are specifically useful for some particle morphologies and compositions according to the present invention, particularly for the spray pyrolysis method illustrated in FIG. 1, spray processing systems in the configuration of a spray dryer are the preferred production method for large quantities of absorbent powders in accordance with some applications of the present invention. Such spray processing systems are particularly useful for the spray conversion method schematically illustrated in FIGS. 2 and 4.

Spray drying is a process wherein powders are produced by atomizing a precursor to produce droplets and evaporating the liquid to produce a dry aerosol, wherein thermal decomposition of one or more precursors may take place to produce the powder. The residence time in the spray dryer is the average time the process gas spends in the drying vessel as calculated by the vessel volume divided by the process gas flow using the outlet gas conditions. The peak excursion temperature (i.e., the reaction temperature) in the spray dryer is the maximum temperature of a particle, averaged throughout its diameter, while the particle is being processed and/or dried. The droplets are heated by supplying a pre-heated carrier gas.

Three types of spray dryer systems are useful for the spray drying of the absorbent material powders according to the present invention. An open system is useful for spray drying of powders using air as an aerosol carrier gas and an aqueous feed solution as a precursor. A closed system is useful for spray drying of powders using an aerosol carrier gas other than air. A closed system is also useful when using a non-aqueous or a semi-non-aqueous solution as a precursor. A semi-closed system, including a self-inertizing system, is useful for spray drying of powders that require an inert atmosphere and/or precursors that are potentially flammable.

Two spray dryer designs are, particularly useful for the production of the absorbent material powders of the present invention. A co-current spray dryer is useful for the production of materials that are sensitive to high temperature excursions (e.g., greater-than about 350° C.) or that require a rotary atomizer to generate the aerosol. Mixed-flow spray dryers are useful for producing materials that require relatively high temperature excursions (e.g., greater than about 350° C.) or require turbulent mixing forces.

In a co-current spray dryer, the hot gas is introduced at the top of the unit where the droplets are generated with any of the atomization techniques mentioned above. The maximum temperature that a droplet/particle is exposed to in a co-current spray dryer is the temperature of the outlet. Typically, the outlet temperature is limited to about 200° C., although some designs allow for higher temperatures. In addition, since the particles experience the lowest temperature in the beginning of the time-temperature curve and the highest temperature at the end, the possibility of precursor surface diffusion and agglomeration is high.

A preferred spray processing system according to the present invention is based on a mixed-flow spray dryer. A mixed-flow spray dryer introduces the hot gas at the top of the unit and the precursor droplets are generated near the bottom and are directed upwardly. The droplets/particles are forced towards the top of the unit then fall and flow back down with the gas, increasing the residence time in the spray dryer. The temperature the particles experience is also higher as compared to a co-current spray dryer. This is important, as most spray dryers are not capable of reaching the higher temperatures that are required for the conversion of some precursor salts.

For mixed flow spray dryers the reaction temperatures can be high enough for the decomposition of metal precursors. The highest temperature in these spray dryers is the inlet-temperature (e.g., 600° C. and higher), and the outlet temperature can be as low as 90° C. Therefore, the particles: reach the highest temperature for a relatively short time, which advantageously reduces precursor migration or surface diffusion, such as for supported absorbent compounds. This spike of high temperature quickly converts the precursor and is followed by a mild quench since the spray dryer temperature quickly decreases after the maximum temperature is achieved. The spike-like temperature profile is advantageous for the generation of highly dispersed metal or metal oxide absorbent material clusters on the surface of a support phase.

The range of useful residence times for producing the absorbent material powders depends on the spray dryer design type, atmosphere used, nozzle configuration, feed liquid inlet temperature and the residual moisture content. In general, residence times for the production of the absorbent material powders can range from 5 seconds up to 5 minutes. According to one embodiment, the residence time is from about 15 seconds to about 45 seconds.

The range of inlet temperatures for producing the absorbent material powders depends on the spray dryer design type, atmosphere used, nozzle configuration, feed liquid, and energy required to perform drying and/or decomposition functions.

In general, the outlet temperature of the spray dryer determines the residual moisture content of the powder. For the production of the absorbent powders according to the present invention, the range of useful outlet temperatures depends on the spray dryer design type, atmosphere used, nozzle configuration, feed liquid, inlet temperature, and residual moisture content. For example, a useful outlet temperature according to one embodiment of the present invention is at least about 200° C., such as at least about 300° C., such as from about 200° C. to about 350° C. According to one embodiment, the temperature is at least about 600° C.

Other equipment that is desirable for producing the absorbent material powders using a spray dryer includes a heater for the gas and a collection system. Either direct heating or indirect heating, including burning fuel, heating electrically, liquid-phase heating or steam heating, can accomplish heating of the gas. The most useful type of heating for the production of powders processed with an inlet temperature greater than 350° C. is direct fuel burning.

Many collection methods are useful for collecting powders produced on a spray dryer. These methods include, but are not limited to those using cyclone, bag/cartridge filter, electrostatic precipitator, and various wet collection techniques.

The powders may also be post-processed by conventional calcination methods to convert them into another chemical composition and/or to crystallize the material. For example, it may be advantageous to convert a metal oxalate with a particular structure into a metal carbonate and/or further to a metal oxide through a thermal post-processing step (FIG. 3). Likewise, it may be advantageous to convert a metal carbonate to a metal oxide while retaining the beneficial attributes of the pore structure. The post process ideally needs to be carried out under conditions that are not detrimental to the structure and performance of the absorbent material. Where the post processing is a thermally-induced transformation, the temperature needs to be carefully chosen to effect the chemical change, without inducing significant sintering or significantly altering the performance of the material. A number of methods can be used to effect this thermal transformation including heat treatment in a static bed or a moving bed.

One preferred embodiment of the post-processing in a moving bed is the use of a rotary calciner in which the powder is delivered to a furnace which contains a rotating reactor tube such that the bed of particles is constantly moving to avoid particle to particle agglomeration and also provide a fresh exposure of the surface of the particle bed to allow out gassing of the material. This continual "agitation" of the powder bed avoids depth-dependant variations in the sample that can occur with a fixed bed reactor.

Figure 6:
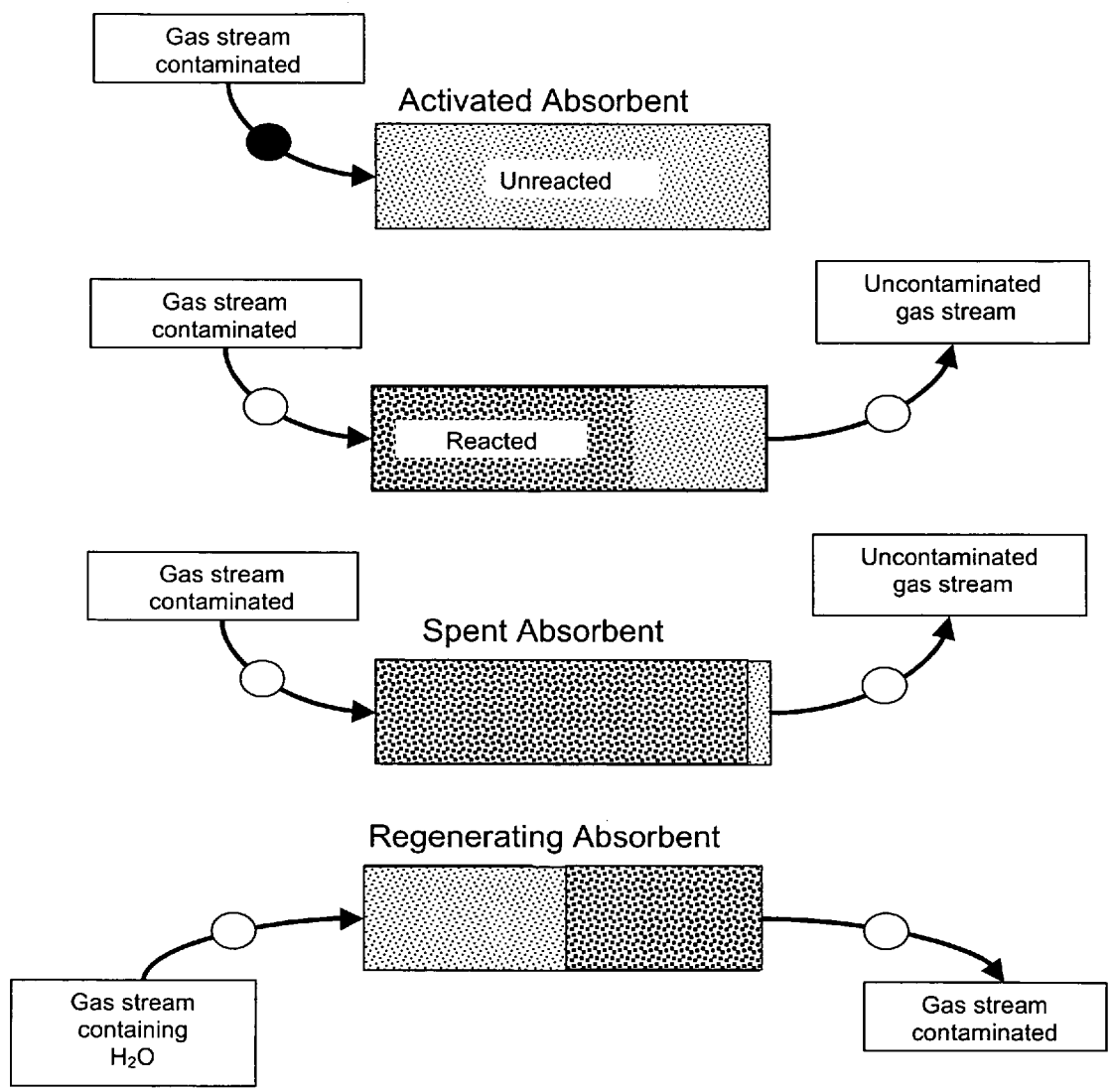
FIG. 6 illustrates a process of the absorption of a contaminant from a gas stream with a regenerating step.

A simple illustration of one cycle of the reaction and regeneration of an absorbent powder is illustrated in FIG. 6. Referring to FIG. 6, an activated absorbent bed comprising the absorbent powder is packed into a reactor. The absorbent bed can include loose absorbent powder, pelletized absorbent powder or a surface coated with absorbent powder. A gas stream is admitted to the reactor and the absorbent powder reacts selectively with a component of the gas stream, such as $H_2S$. Further reaction between the absorbent powder and the gas stream eventually consumes substantially all of the available absorbent compound. Further use of this reactor under these conditions will not remove additional components from the gas stream and the contaminated gas will pass through the reactor. The feed is then stopped and a regeneration gas, for example air and water, is passed through the reactor, which is heated to an elevated temperature, to reverse the reaction, desorb the captured chemical species and thereby regenerate the active absorbent bed.

The primary issue affecting recyclability is that, generally, the reacted absorbent has a much lower density than the active absorbent. Therefore, for a fixed mass of absorbent in a reactor bed, there is a large volume increase as the absorbent is converted to the reacted absorbent. Due to the high temperature typically required for cycling the reacted absorbent back to the active absorbent, particle sintering and reduction of porosity occurs, leading to a reduced absorption capacity on subsequent cycles. Therefore, a high initial absorption capacity through the production of a high surface area absorbent powder will not, by itself, lead to retention of a high capacity during subsequent cycles. Decrepitation is also common and leads to plugging of the bed.

In the context of the cyclic nature of the absorption/desorption process, both the kinetics and the mechanism of the reactions are important. In order to achieve a high absorption capacity, it is necessary to use a material having a high content of active absorbent compound, such as CaO. However, a number of design criteria need to be taken into account involving the chemical, physical and system aspects of the reversible reaction bed. These aspects include the careful design of the microstructure of the material to decrease diffusion-based limitations associated with gas transport and surface diffusion through the substantially impervious surface layer formed by reaction of the absorbent, the chemical composition and microstructure to adjust the rate constants of the reactions and the strength of the material in pelletized and/or coated form. As is discussed above, one of the critical issues to overcome is the change in density and therefore microstructure and porosity on cycling between the active absorbent and the reacted absorbent.

Current reactive absorbents suffer from a rapid loss of porosity from sintering during multiple temperature swing operations. The materials prepared by conventional methods, such as precipitation or solid-state processing, either lack the desired porosity or the desired crystal size, which are two critical parameters to material performance. An absorbent lacking adequate porosity will result in slow kinetics for both absorption and desorption of the target chemical species. Some research suggests that an average pore size in the range of 5 to 20 nm is less susceptible to pore plugging. (Ghosh-Dastidar, A.; Mahuli, S. K.; Agnihotri, R.; Fan, L.-S. Investigation of High Reactivity Calcium Carbonate Sorbent for Enhanced $SO_2$ Removal. *Ind. Eng. Chem. Res.*, 1996, 35 (2), 598). Also, the chemical species gas can only penetrate a thin (about 0.1 µm) shell of the solid absorbent particle during repeated absorption and desorption cycles, which is less than one-tenth of the normal particle size. Reactive absorbents present in natural and conventional materials generally have a large particle size, low porosity and do not have a three-dimensional pore network structure.

According to one embodiment of the present invention, the microstructure of the absorbent particles is controlled to enable mass transport of the reactants and products to and from the surface of the powder during contaminant removal and regeneration and to retain the beneficial microstructure throughout multiple cycles. The absorbent particles according to this embodiment are produced by spray processing, which enables tight control over the chemical composition and microstructure of the materials.

Figure 7:
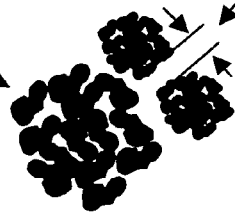
FIG. 7 illustrates the aggregate particle morphology of a particulate absorbent material according to an embodiment of the present invention.

The powder batch produced by spray processing according to one embodiment of the invention includes substantially spherical aggregates of smaller primary particles. This particle structure is illustrated in FIG. 7. The spherical aggregates may have different sizes and spread of size distribution that can be controlled by spray processing. The microstructure of the aggregates can also be controlled by the spray processing to control the surface area, crystallinity, size and porosity within each aggregate. The aggregate microstructure, average size and spread of the size distribution can be controlled to provide the optimum performance in a given application depending on the operating and regeneration parameters.

Figure 8:
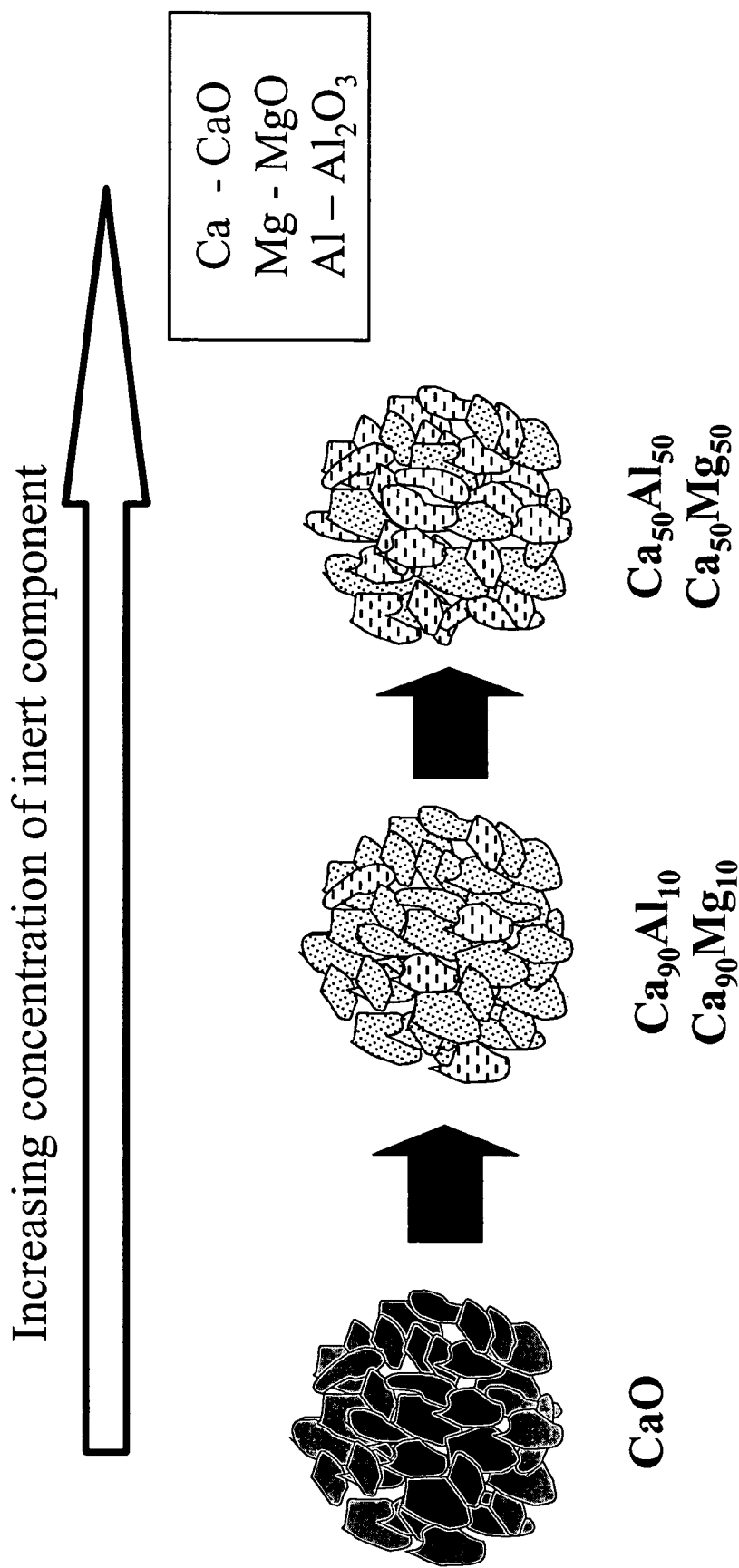
FIG. 8 illustrates the aggregate particle morphology of a particulate absorbent material according to an embodiment of the present invention.

In another embodiment of the invention, the substantially spherical particles are composite particles that have controlled composition and morphology (FIG. 8). For example, the particles can include various ratios of CaO and MgO or $Al_2O_3$ as is illustrated in FIG. 8, with other metals or metal oxides present to achieve desired absorption properties, such as enhanced absorption kinetics at various temperature ranges. The role of inert additives (e.g., inert at the temperature(s) at which the absorption occurs), such as MgO or $Al_2O_3$, is to aid the recyclability of the absorbent containing powders by minimizing the sintering and loss of surface area and pore volume. The sintering inhibition characteristics of these additives may be derived from the composite nature of the microstructure and/or from the use of dopant ions in the absorbent material lattice. The $d_{50}$ average particle size of the powders generated by spray conversion methods (the intermediate compounds, or the final absorbent material) is preferably not greater than about 150 µm, more preferably not greater than about 100 µm, more preferably not greater than about 50 µm, not greater than about 20 µm, more preferably not greater than about 10 µm and even more preferably not greater than about 5 µm. Further, the average particle size is preferably at least about 0.1 µm and more preferably is at least about 0.3 µm.

The surface area of the absorbent material powders will depend on the composition of the absorbent material. However, the surface area is preferably greater than 5 m²/g, more preferably greater than 10 m²/g, even more preferably greater than 15 m²/g and most preferably greater than 30 m²/g.

The pore volume of the powders generated by spray processing methods according to the present invention (the intermediate compounds, or the final absorbent compositions such as calcium carbonate or calcium oxide) is preferably greater than about 0.01 cm³/g, more preferably greater than about 0.04 cm³/g and even more preferably greater than about 0.15 cm³/g. In one embodiment, the pore volume is from about 0.05 cm³/g to about 0.30 cm³/g. As is discussed above, the pore volume of the absorbent material powder can be increased by including a pore enhancing agent in the precursor composition. Further, the absorbent compound can preferably absorb a chemical species to form a reacted absorbent compound where the pore volume of the reacted compound is not less than 70% of the pore volume of the absorbent compound, more preferably is not less than 80% of the pore volume of the absorbent compound and even more preferably is not less than 90% of the pore volume of the absorbent compound.

Spray processing enables control over the powder batch characteristics in the following manner. The particle size and spread of the particle size distribution is controlled by controlling the size and size distribution of the droplets produced by the droplet generator because each individual droplet becomes an individual particle. The size and size distribution of the particles in the powder batch is controlled independent of the chemical composition of the powder. Furthermore, the microstructure, composition and crystallinity of the particles and the sub-particles that comprise the primary particles are controlled by the nature of the precursors that are used to produce the droplets and the processing parameters (especially the temperature/time history) of the particles in the gas phase during spray processing. As a result, the powder batch produced by spray processing, whether directly used to produce pellets or powder coatings, or used after post processing subsequent to the spray processing step, can have a controlled microstructure at a number of different length scales. The size and size distribution of the particles produced by spray processing can be varied to control the pore size and size distribution between the aggregates (inter-aggregate porosity, FIG. 7).

The pore sizes of the inter-aggregate pores will typically be in the micron size range and therefore classified as macroporosity. In one embodiment of the present invention, the aggregates are composed of finer sub-particles of the absorbent material that have been aggregated through the spray processing method. The finer sub-particles are derived either from soluble precursors or suspensions of particulate precursors. The preferred size of the smaller primary particles is not greater than about 500 nm, more preferably not greater than about 300 nm and even more preferably not greater than about 100 nm. The primary particles are preferably at least about 10 nm, such as at least about 30 nm in size. As a result, the size of the pores formed between the primary particles in the aggregate are in a similar size range (about 30 nm to 1000 nm) and are classified as mesoporosity. Finally, the primary particles can range from being fully crystalline (i.e., single crystal) to being amorphous. Single crystal sub-particles are likely to be fully dense and exhibit no further porosity, but amorphous particles can include pores that are classified as microporosity. In another embodiment of the present invention, the absorbent particles are composite particles of various amorphous or crystalline metal oxides.

The correct combination of macroporosity, mesoporosity and microporosity will depend on the composition of the material, the conditions under which it is used to react with the species to be absorbed and the conditions under which the de-activated absorbent is re-activated. The importance of this aspect of the invention can be clarified further by reference to specific materials. Table 2 lists the density of a number of relevant Ca-based compositions and the calculated volume per mol of fully dense material.

TABLE 2

| Compound | Density (g/cc) | Volume (cc/mol) |
|---|---|---|
| CaO | 3.25 | 17 |
| $CaCO_3$ | 2.71 | 37 |
| CaS | 2.5 | 29 |
| $CaC_2O_4$ | 2.2 | 67 |

The density of the CaS and $CaCO_3$ is lower than that of CaO. As a result, given that the molar mass of calcium is constant through the removal of $H_2S$ and $CO_2$ and the reactivation of the CaS and/or $CaCO_3$ (Equations 1-4 and 5-9, respectively), the volume will increase on conversion of the CaO to CaS and/or $CaCO_3$. Therefore, this volume increase is likely to remove some of the porosity imparted to the original CaO powder. Regeneration of CaO from CaS and/or $CaCO_3$ will result in a decrease in volume of the absorbent, but the pore structure formed as a result of the regeneration of CaO could be significantly different relative to the starting CaO. This is typically the problem with existing CaO powder made by conventional routes because the majority of the reactivity is derived from the high surface area of small particles and/or the presence of a roughened surface. After several regeneration cycles, the surfaces become smooth and/or the small particles tend to sinter, leading to a reduction in surface area and pore volume, and a reduction in reactivity.

Table 3 lists the density of a number of relevant barium compounds and the calculated density and volume of a fully dense material.

TABLE 3

| Compound | Density (g/cc) | Volume (cc/mol) |
|---|---|---|
| BaO | 5.72 | 27 |
| $BaCO_3$ | 4.43 | 44 |
| $Ba(NO_3)_2$ | 3.24 | 81 |
| $BaC_2O_4$ | 2.66 | 85 |

According to one embodiment of the present invention, the porosity of the absorbent powder batch is controlled at the microporosity, mesoporosity and macroporosity scales to reduce the loss of surface area and pore volume and maintain a high activity over a large number of regeneration cycles. In one embodiment of the present invention, the aggregate particles formed by the spray processing method have a controlled inter-aggregate porosity (i.e., porosity between the aggregates) as well as intra-aggregate porosity (i.e., porosity within the aggregates). It would normally be expected that the inter-aggregate pores (micron size) are larger than the intra-aggregate pores (nanometer size).

Figure 9:
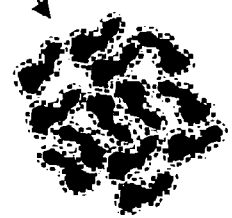
FIG. 9 illustrates the aggregate particle morphology of a supported absorbent material according to an embodiment of the present invention.

In some cases, the absorbent compound reacts with the chemical species to be removed on the surface of the absorbent compounds and forms a passivating layer, which limits the further reaction of underlying absorbent. As a result, the mass activity of the absorbent is relatively low and once the surface of the absorbent has reacted with the chemical species, no further reaction can occur. One way to improve the mass activity according to the present invention is to disperse the absorbent on, or form a composite with, a relatively high surface area support, which is passive or inert (i.e., does not substantially react) with the chemical species at the reaction temperature. A representation of this embodiment is illustrated in FIG. 9, where the spray-processed spherical agglomerates include sub-particles of support material with an absorbent supported/dispersed over the surface of the sub-particles. The methods for controlling the microstructure and morphology of the absorbent powder, as described above, can also be applied to the supported absorbent. The structure of the supported absorbent material can be in the form of a coating around the support particles or as a composite with interpenetrating support and absorbent material networks.

There are a number of advantages in accordance with this embodiment of the invention. The mass activity of the absorbent is significantly higher compared to the situation where an unsupported absorbent is used, assuming that the surface of the unsupported absorbent passivates. This can enable the use of more exotic or expensive absorbent materials, because a relatively small mass of absorbent can be dispersed over the surface of or inter-mixed with a relatively inexpensive support such as silica ($SiO_2$) or alumina ($Al_2O_3$). The presence of inert support materials can also isolate and prevent sintering of the absorbent compound, particularly during multiple temperature swings and cycles. A further advantage is that the support does not substantially react with the chemical species and there is no change in the volume or density of the support framework. As a result, the microstructure of the powder does not change significantly and a relatively high surface area can be preserved over a large number of regeneration cycles. The specific microstructure of the supported or composite absorbent will depend upon the specific reaction needs. For example, a relatively thin coating of a highly reactive supported absorbent may have extremely good selectivity and reactivity to remove low levels of gas species at a relatively high space velocity. However, the capacity of the absorbent bed will be relatively low due to the relatively low mass of absorbent present compared to a thicker coating. As a result, a larger bed may be required to increase the total capacity of the absorbent. Alternatively, a thicker absorbent coating on an inert support or a composite particle with interpenetrating networks of absorbent and inert materials may require lower space velocities, but the capacity of the bed will be higher. However, there may also be situations in which nano-composite structures comprise relatively thick absorbent layers that enable high space velocities.

According to another embodiment of the present invention, the spherical aggregate particles consist of a mixture of two types of sub-particles; nanosized reactive absorbent materials such as Group 1 or Group 2 metal oxides and sub-particles of inert additives such as nanosized alumina particles. When spherical aggregate particles are mixed with a binder and other reagents in the process of formation of extrudates, pellets or monoliths, the spherical aggregate structure is destroyed, leaving the nanosized reactive sub-particles uniformly distributed throughout the structure within the core structure of the binder network. The binder network insures that the formed structure has the necessary strength, while the reactive absorbent particulates are combined within the porosity of the formed material. The porosity of the formed material is such that when the reactive absorbent particulates convert to the lower density reactive compound (such as carbonates or sulfites) their volume does not exceed the core volume of the pores that they are located within. This insures that the formed structures that reactive absorbent particulates can undergo multiple cycles of carbonation/decarbonation (for the case of CaO and $CO_2$ absorption for example) without destroying the structure of the binding network of the formed structure and insuring that the formed structure will remain substantially intact throughout multiple cycles.

According to another embodiment of the present invention, the absorbent materials (e.g., CaO) are fabricated from an intermediate compound having a lower density, such as $CaC_2O_4$ and $CaCO_3$. Decomposition of these intermediate compounds into the absorbent compound will alter the microstructure of the intermediate compound, but in a controlled way, and will therefore lead to an increased surface area in the absorbent compound as compared to conventional preparation methods. In addition, the spray processing method for making either the intermediate compound or the final absorbent compound introduces additional levels of meso- and micro-porosity and therefore a specific microstructure which is unattainable with conventional preparation methods.

According to this embodiment, the microstructural changes to the absorbent that occur during regeneration cycles is reduced by starting with a powder batch that includes an intermediate compound that has a density similar to or less than that of the reacted absorbent, but which itself is a precursor to form the absorbent compound. The goal is to establish the microstructure of the powder using a low density intermediate compound to avoid sintering of the particles and a reduction in surface area and porosity. One approach is to produce the reacted material as the intermediate powder batch, for example a powder batch including CaS and/or $CaCO_3$, rather than only CaO. After the powder batch including CaS and/or $CaCO_3$ is pelletized or coated onto a surface, the CaS and/or $CaCO_3$ is treated to form CaO having a high level of porosity. Controlling the microstructure of the CaS and/or $CaCO_3$ powder batch establishes the specific microstructure, surface area and porosity in the system with a combination of composition (addition of inert additives) and processing conditions (choosing correct spray conversion and post processing conditions) for the absorbent material. When CaO is formed from CaS and/or $CaCO_3$ in the first step, because CaS and $CaCO_3$ have a lower density than CaO, the surface area and porosity of the CaO batch will decrease to a lesser extent relative to the CaS and/or $CaCO_3$ batch from which it is derived if a beneficial starting porosity structure is achieved in the initial intermediate compound.

Other materials with a low density can be selected as the intermediate compound. Referring to Table 2, $CaC_2O_4$ has a lower density than CaS and $CaCO_3$. Therefore $CaC_2O_4$ can be used as an intermediate material to establish the microstructure, porosity, aggregate size and size distribution of the powder batch. A wide variety of other materials can also be used, in particular inorganic and metal-organic compounds which are soluble in water or other solvents such that they can be employed in spray processing.

Figure 10:
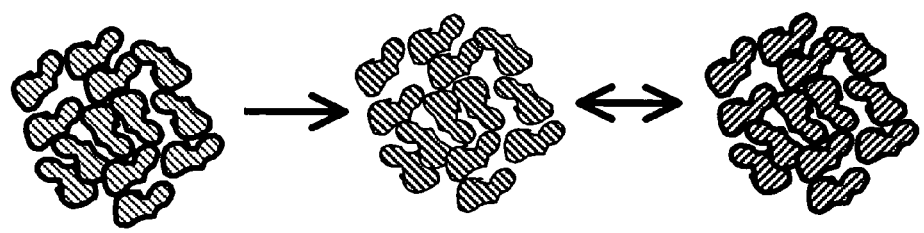
FIG. 10 illustrates the aggregate particle morphology of an absorbent material according to an embodiment of the present invention.

This embodiment of the present invention is illustrated in FIG. 10. In the first step, after forming the pellet or depositing the powder coating including the low density material, the powder batch is heated to form the activated absorbent in a form that has a higher surface area and porosity compared to the starting material. The powder batch can be heated either before pelletizing, extruding or coating by post-processing of the intermediate compound powder, and/or after pelletizing, extruding or coating the intermediate powder onto a support. The absorbent material is then used to remove the chemical species and is eventually saturated by the chemical species and can no longer absorb appreciable amounts of the chemical species. The saturated absorbent will have the pore distribution and microstructure capable of sustaining multiple generation cycles without significant loss of surface area, porosity or structural integrity.

The reversible reaction with a chemical species such as $H_2S$, $CO_2$ or $NO_x$ is less likely to close porosity and reduce the surface area of an absorbent powder obtained by direct spray processing or spray processing followed by post-processing through the sequential decomposition of a lower density material as compared to designing the microstructure around the absorbent compound. Another aspect of this embodiment of the present invention involves the execution of sequential chemical reactions involving specific reagents and pore forming chemicals performed by spray processing to produce discrete particles comprising specific compositions and microstructures that are constructed in a logical design sequence. This aspect of the present invention is illustrated in FIGS. 2 and 4.

Specifically, FIG. 2 illustrates a case where the chemical reactions in the individual particles occur in the following sequence:

$$Ca(NO_3)_{2(l)} + (NH_4)_2C_2O_{4(l)} \rightarrow CaC_2O_{4(s)} + 2NH_4(NO_3)_{(s)} \quad (14)$$

$$2NH_4(NO_3)_{(s)} \rightarrow 4NO_{x(g)} + 4H_2O_{(g)} \quad (15)$$

$$CaC_2O_{4(s)} \rightarrow CaCO_{3(s)} + CO_{(g)} \quad (16)$$

$$CaCO_{3(s)} \rightarrow CaO_{(s)} + CO_{2(g)} \quad (17)$$

Leading to the overall chemical reaction:

$$Ca(NO_3)_{2(s)} + (NH_4)_2C_2O_{4(s)} \rightarrow CaO + CO_{(g)} + CO_{2(g)} + 4NO_{x(g)} + 4H_2O_{(g)} \quad (18)$$

By carrying out this reaction in a stepwise fashion in the gas phase, the microstructure can be fabricated in a stepwise fashion. This ability does not exist in a single solid-state or liquid phase powder manufacturing step.

The precursors and reagents are preferably selected to achieve the foregoing reaction sequence. Calcium nitrate, $Ca(NO_3)_2$, is one preferred precursor for CaO in spray processing methods such as spray pyrolysis and spray conversion. In this reaction sequence the evaporation of water occurs quickly, on the order of milliseconds, while the whole gas phase material processing sequence takes place on the order of seconds. Therefore, the majority of the reactions in this sequence are solid-state reactions. $Ca(NO_3)_2$ reacts with $(NH_4)_2(C_2O_4)$ according to the reaction of Equation 13 to form $CaC_2O_4$. The reaction rate can be suppressed at room temperature using a correctly formulated (pH adjusted) solution.

According to another embodiment, the reaction can be controlled in a way that a colloidal dispersion of $CaC_2O_4$ particulates is formed where the size of the $CaC_2O_4$ particles is from about 50 nanometers to 500 nanometers, more preferably from about 30 nanometers to about 300 nanometers and even more preferably from about 30 nanometers to about 100 nanometers. The colloidal suspension of $CaC_2O_4$ particulates can then be spray processed to form aggregate particles of the particulates.

$CaC_2O_4$ has a low solubility in water and thermally decomposes before it melts, so the reaction can occur in the solution phase as the droplets enter the reactor and the microstructure of the resulting $CaC_2O_4$ product is preserved. The $NH_4NO_3$ that is formed acts as a pore forming reagent and thermally decomposes at a temperature higher than the temperature at which $CaC_2O_4$ is formed, but lower than the decomposition temperature of $CaC_2O_4$, thus introducing porosity. $CaC_2O_4$ is known to thermally decompose first to $CaCO_3$ (at about 500° C.) and then to CaO (at about 750° C.). Therefore, in this sequence, the microstructure and porosity designed into the solid-state product is first constructed around $CaC_2O_4$, the material with the highest molar volume, and then transferred to $CaCO_3$ and ultimately to CaO through post-processing steps. The crucial aspect of this reaction scheme is that the reactions occur sequentially, separated by both time in the reactor as well as the temperature at different locations in the reactor while substantially retaining the microstructure at both the nanometer scale and micrometer scale. If the same reagents are processed by conventional solution and/or solid-state processing, the microstructure cannot be tailored across this wide variety of length scales in discrete particles.

It is worth noting that the foregoing embodiments can be employed in any variation or combination to achieve excellent reactivity and the ability to go through multiple regeneration cycles (recyclability). For example, the ability to control the microstructure, morphology, aggregate size and aggregate size distribution within an absorbent powder batch can be combined with a supported absorbent or with a supported low density precursor to an absorbent. For example, in the case where the powder batch is pelletized, one of the phases can be selected to create a structural support such that during active use and regeneration, the pellets retain their structural integrity. For example, the support on which the intermediate compound or the absorbent compound is dispersed can be an active material with respect to peptization during pellet formation to form a three-dimensional support network. In addition, one or more catalytically active materials may be incorporated into the structure to achieve a catalytic function in addition to a gas absorption function.

According to one embodiment of the present invention, the absorbent material, which includes the absorbent compound, can include a second component that does not undergo a reaction with the absorbed species, such as MgO, $Al_2O_3$ or $SiO_2$. Dolomite is a naturally existing material comprised of $CaCO_3$ and $MgCO_3$. However, natural dolomite has fairly low initial surface area and comprises only about 50 wt. % $CaCO_3$ and therefore the initial absorption capacity is significantly reduced and the change in microstructure on carbonation/decarbonation cycles leads to rapid loss of surface area and porosity. The presence of MgO in processed natural dolomite does introduce some advantageous water gas shift capability to the material, which may be advantageous for some applications.

According to one embodiment of the present invention, the recyclability of the absorbent compound, such as CaO, can be improved by integrating the absorbent with additional materials such as $Al_2O_3$, MgO, $TiO_2$ or $SiO_2$ to form composite particles. For some applications, aluminum oxides and magnesium oxides are particularly preferred. For example, the introduction of soluble reagents such as $Mg(NO_3)_2$ in the starting precursor solution will result in the formation of a tailored dolomite-like composition. Introduction of nanophase particulate $Al_2O_3$ will result in the formation of a $CaO/Al_2O_3$ composite. The composition of the intermediate compound, as well as for the final absorbent powder, is important since it determines the absorption capacity and recyclability of the absorbent. For example, low amounts of an inert additive (alumina, titania, silica or MgO) may lead to absorbent materials that have high sorption capacity since the amount of CaO will be high. However, these high sorption capacity materials may not have enough resistance to sintering and may be susceptible to rapid decrease of surface area and porosity, and, therefore, have low activity after multiple cycles. The amount of inert additive, therefore, is generally not greater than 50 wt. % of the total absorbent powder, such as from about 1 wt. % to about 50 wt. %. Preferably, the inert additive is present at a level of not greater than 25 wt. % of the total absorbent powder, such as from about 5 wt. % to about 25 wt. % and even more preferably not greater than 15 wt. % of the total absorbent powder.

The composite absorbent material, such as one which includes an absorbent compound and an inert compound, has a high absorption capacity. In one embodiment, the absorbent compound contained within the absorbent material preferably has an absorption capacity of at least about 30 mol. %, more preferably at least about 40 mol. %, even more preferably at least about 60 mol. % and even more preferably at least about 90 mol. %. In another embodiment, the absorption capacity of a $CO_2$ absorbent is at least about 10 grams $CO_2$/100 grams of unreacted absorbent material, more preferably at least about 20 grams $CO_2$, and even more preferably, at least about 30 grams $CO_2$ per 100 grams of unreacted absorbent material. The absorption capacity can be maintained over many cycles, such as at least 10 cycles, more preferably at least 50 cycles, even more preferably at least 100 cycles and even more preferably at least about 200 cycles and even more preferably at least about 500 cycles.

Reaction Rate Enhancement

The reactivity of the individual active sites in the absorbent compound is dictated by the chemical composition and crystalline structure of the absorbent compound as well as by the reaction conditions during manufacture of the absorbent compound. The chemical composition can influence the activity for a specific reaction with a gas species by adjusting the electronic and steric nature of the activity of the surface reaction sites. For example, the presence of a dopant can enhance the reactivity compared to the material without a dopant. Steric effects may enhance the reactivity by having atoms present which distort the surface structure to make the active sites more sterically accessible for reaction with the compound species. The reactivity of the absorbent is also strongly influenced by its crystalline structure, and surface defects are also known to enhance the reactivity of the surfaces. Different crystal faces of a crystalline material also have different reactivities and crystalline materials with more reactive crystallographic planes exposed on the surface will result in a higher overall activity of the absorbent. In some cases amorphous (non-crystalline) materials are more reactive than crystalline materials. Amorphous materials can also have greater capacities for absorption than crystalline materials because they can more easily accommodate the absorbed species in their disordered structure. The size of the individual amorphous or crystalline particles can also be important due to the strain when very small particles or crystallites are present, especially below about 50 nm in size.

The number of active sites is also important to the overall activity of the absorbent compound. The total number of active sites normally correlates with the content of the absorbent compound and the surface area of the absorbent material. An absorbent that has a higher surface area will have a higher number of active sites. The total activity of the material, often defined by its mass activity or specific activity, is the product of the number of active sites and their individual activity. Therefore, the surface area of two samples of the same material may be similar, but because the reactivity of the respective active sites in each material is different, the total reactivity is different. Also, some active sites may be disposed in pore channels that are too small to be reached by the contaminant species. Indeed, it is possible to have an absorbent compound that has a lower surface area relative to another sample of the same material, but that has a higher overall activity. This is why in the design of absorbent materials, other factors such as pore volume and pore size distribution, surface composition and crystallinity of the phases are as important as the surface area with respect to achieving high overall absorption capacity. In addition, the ability of the absorbent structure to retain its pore structure and surface composition after multiple cycles is critical to its use as a reversible absorbent.

The recycle time is dictated by the size of the absorbent bed, the number of beds present and the rate at which the chemical species is absorbed and desorbed. Based on the initial studies of Ca-based materials and the thermodynamics among CaO, $CO_2$ and $CaCO_3$, it has been determined that $CO_2$ absorption has a relatively high rate at a lower temperature compared to $CO_2$ desorption, as expected. Through the formation of an optimum microstructure, the formation of an impervious layer on the active absorbent can be reduced, which is known to limit the absorption rate after all exposed surfaces of the active absorbent have reacted.

The more difficult problem to solve is achieving desorption kinetics that are sufficiently rapid that the desorption step does not limit the recycle time. Increasing the temperature can increase the rate constant for the desorption reaction, but this may lead to some sintering of the material and reduce the cycle life. Therefore, alternative strategies need to be employed to minimize the time required for desorption.

The microstructure of the absorbent bed can affect the rate of desorption. An increase in the rate of desorption has been observed as the particle size of absorbent material powders is decreased. Since the size of the absorbent particles is not small enough to introduce changes in the strength of the chemical bonds (i.e., the particles are preferably not below a quantum confinement limit of about 30 nm), these observations most probably reflect a change in the powder microstructure leading to an improvement in the diffusion transport characteristics of the material. However, the microstructure according to the present invention can be further optimized to improve the kinetics of the reaction provided the feature size of the changes are at or below a crystallographic length scale of 30 nm (i.e., to create surface tension and surface pressure effects).

According to one embodiment of the present invention, a metal oxide absorbent compound lattice structure can be doped with elements that lead to an enhancement of the kinetics of the desorption reaction. The dopants can be selected from divalent ions, preferably from the group consisting of Mg, Ni, Fe, Zn, Co and Cu. Preferably, the dopants are present at a level of at least about 0.1 at. % and not greater than about 10 at. %, such as from about 1 at. % to about 5 at. % expressed as a percentage of the total absorbent compound. These dopants can also lead to an enhancement of the rate of absorption by the absorbent. Therefore, it is preferred that the changes in the absorbent composition do not lead to an increase in the rate of desorption at the expense of significantly decreasing the rate of absorption and therefore to change the rate-limiting step, such as being limited by the fuel feed rate of the surface reaction.

Accordingly, high performance absorbents can be fabricated by spray processing to form alkali metal oxide (e.g., Group 1 metal oxides), alkaline earth metal oxide (e.g., Group 2 metal oxides), ZnO-based absorbents and others that have varying amounts of divalent ions, have a smaller ionic radius compared to the metal element (e.g., $Ca^{2+}$) and are electropositive so that the presence of such a hetero atom in the compound structure will change the physiochemical properties of crystal structure by altering the bond distance and electronic structure owing to the difference of ion potential (Z/r) between the metal ion and the dopant ion(s). Accordingly, Mg, Ni, Fe, Zn, Co and Cu cations are preferred, provided that the doped absorbent materials have a crystal structure similar to the metal oxide (e.g., an isometric-hexoctahedra structure for CaO and/or a trigonal-rhombohedral structure, for dolomite, akimotoite and ankerite with a composition of $(M_xN_yP_z)CO_3$, where M, N and P are the divalent or higher valency metal cations other than Ca, such as Mg, Fe or Si and where x, y, z are the molar fraction of total metal ions).

Regeneration of Sample Performance during System Operation

During reversible absorption of a chemical species, the microstructure of the absorbent material particles can change over long periods of time at elevated temperature and/or after a large number of cycles. This can lead to a decrease in the absorption capacity of the material. The absorption capacity can be restored by the treatment of the material with reagents that re-establish the pore structure of the material. One such reagent that can increase the capacity of the absorbent material after it has been reduced is water. Treatment of the absorbent with water above room temperature increases the capacity of the material for future cycles. This treatment can be applied multiple times to prolong the material lifetime (i.e., the capacity and number of cycles of the material). While not wishing to be bound by any theory, it is believed that the performance improvement is likely due to a sintering of the material at the nanosize level. In the case of CaO, it is likely that the surface area is reduced over time through chemical rearrangement and formation of Ca—O—Ca bonds, possibly via formation of Ca—OH intermediates, removing previously accessible pores. The reaction of the strained Ca—O—Ca bonds with water or a similar reagent, regenerates Ca—OH bonds which on absorption re-establishes the previous structure.

Other reagents that may be suitable to regenerate the surface area and recyclability of these materials, including protic reagents such as methanol, organic acids and inorganic acids. It will be appreciated that the absorbent materials of the present invention can be implemented in a variety of systems. For example, the materials can be used in a fluidized bed, fixed bed, moving bed or variations thereof, or similar reactor configuration. The following described several preferred modes of implementation.

Formation of Reactor Bed: Pelletization

Extrusion is the most economic and commonly applied shaping technique for the formation of absorbent pellets according to the present invention. For extrusion, the absorbent material powder is generally in the form of a wet paste or a powder that is converted to a wet paste within the extrusion machine. The extrusion machine forces the paste through a die and cuts the extruded material at the desired length. The detailed process is described below.

A slurry of absorbent powder is fed from a hopper into a screw drive. Peptizing agents, such as nitric acid or other organic acids such as acetic acid, may be added to deagglomerate the primary particles by lowering the zeta potential, improving the extrusion process. The screw forces the slurry through holes in the end plate. Usually circular in cross section, these holes can also be made in the shape of cogs or rings, ovals, stars, three-lobed joined rings, or hollow rings similar to macaroni. As the ribbon of slurry emerges from the hole, it begins to dry and harden sufficiently to maintain its shape. The extruder can be equipped with a slicing device, so that the ribbon is either cut into prescribed lengths by the knife rotating outside the end plate or simply allowed to break up as it falls onto a moving belt on its way to the dryer.

Extruding equipment can be classed in one of two categories: press extruders and screw extruders. Press extruders are used principally for pastes that are viscous, whereas screw extruders are preferred for thixotropic products. The ease of extrusion and quality of the product depend on the following properties of the paste:

1. Viscosity (adhesivity): A non-thixotropic product that is too viscous will block the extruder. A product that lacks in viscosity cannot be extruded with a screw and will give extrudates without mechanical resistance when extruded by a press.
2. Thixotropy (fluidity): Certain substances become less viscous under shearing forces, and then recover their initial state after the forces have been released for a time called the relaxation time. The existence of such thixotropic properties is eminently favorable for the flow of a paste and formation of a solid granule at the exit of a die, providing the relaxation time is short enough.
3. Stability: Under extrusion conditions, there should be no dynamic sedimentation of the product through exuding water and forming a paste that is too viscous.
4. Homogeneity: The paste must be homogeneous to assure that the quality of the product is constant. When necessary, the paste is homogenized in a mixer-kneader under controlled conditions of temperature, time, and pH. An excess of kneading can in fact compact the material and suppress potential macropores. Screw extruders partially knead the paste as it travels along the screw.

Even for a given charge with specific properties, the operating variables are rather poorly defined and are closely related to the type of equipment. Generally they include: mixing time, water content, adhesives content, paste aging and extrusion temperature. In the case that a powder does not have certain level of fluidity or plasticity, various additives can be used to aid the pre-forming of pastes or microgranules, such as:

1. Lubricants for improving the rheological behavior, such as liquid (water, mineral oil) or solid (starch or clays like montmorillonite, stearic acid, and various stearates);
2. Binders (aluminas or clays). Binders are added to also increase the post-compression adhesion, as for example starch is added for palletizing/extrusion of active carbon;
3. Peptizing agents to deagglomerate the particles, such as dilute acetic or nitric acid. By peptizing, an increase in the adhesive forces due to chemical bonds resulting from contact between the pastes can be achieved, meanwhile the particle surfaces are made more chemically reactive; and
4. Combustible materials to increase the porosity (the so-called pore-formers like carbon black, graphite, talc, starch, etc.).

If the extrusion is performed well, the particles (extrudates or pellets) formed are very regular, hard, and uniform. However, if the extrusion is uneven and the rate of extrusion from one section of the dies is different from that of another section, the particle length can be quite variable and the hardness and sharpness of the ends can also be variable. The extruder, however, can rapidly produce great quantities of product of various shapes and as a consequence is relatively inexpensive in comparison with pilling or pelletizing.

In practice, the particulate absorbents have to be pelletized to meet certain crush strength. Pelletization of powders typically involves reaction of the powders to be pelletized with a binder and extrusion of the paste through a die to give the desired pellet geometries. In the case of catalysts and gas absorbent materials, the binder system is typically $Al_2O_3$ combined with a peptizing agent such as an organic acid. On reaction, these materials yield a metal-organic compound that penetrates the entire structure and on subsequent thermal decomposition yields a continuous $Al_2O_3$ skeleton that provides mechanical support. Ideally, the extrudates will maintain the high reactivity and high cycle ability of the original powder after pelletizing.

There are a number of approaches to pelletization. One is directly pelletizing the original absorbent powders (e.g., CaO) that show high reactivity to the chemical species to be absorbed (e.g., $CO_2$). Another is pelletizing an intermediate powder precursor (e.g., $CaC_2O_4$) with a certain amount of binder. After post-processing the decomposition of the absorbent material will facilitate the formation of the microstructure and porosity of the extrudates, and the obtained pellets will maintain or even improve the absorbent performance during absorption/desorption cycles. In this approach, however, the amount of binder used for extrusion should be carefully considered to achieve maximum capacity for removal of the chemical species being absorbed.

According to one embodiment, a pellet is formed that includes at least about 5 wt. % of a particulate intermediate compound to an absorbent compound, more preferably at least about 35 wt. % and even more preferably at least about 75 wt. %, where the particulate intermediate compound has a theoretical density that is not greater than the theoretical density of the absorbent compound and wherein the particulates are substantially spherical. The pellet can have a crush strength of at least about 1 N/mn. The pellet can include, for example, alumina as a binder.

Formation of Reactor Bed: Coated Structures

The pelletization of the materials described above is only one of a number of methods to create a reactor bed for absorption of a chemical species from a fluid stream. The advantages of a pelletized bed are that the capacity of the bed is relatively high. However, under some circumstances, the operating space velocity of such a pelletized reactor bed can limit the performance of the overall system. Therefore, according to another embodiment of the present invention, the materials can be coated onto a surface that provides a high available surface area for the powder. The structures that are typically coated are high surface area structures such as porous monoliths, porous membranes, honeycomb structure monoliths or corrugated support structures. These support structures are typically comprised of metals or metal oxides to aid in thermal stability and in some cases to improve thermal conductivity.

In order to coat the support structures, the powders can be formed into a slurry, paste or ink that is applied to the support surface. Methods to coat the powders described in this invention onto the surface of the support structures may include wash-coating, dipping, screen printing, ink-jet printing, spraying or any other printing or coating, digital or analog technologies known to those skilled in the art.

Formation of Reactor Bed: Textile, Cloth or Paper Support

While the advantage of the coated structures is that the space velocity of the system can be increased, one potential limitation of the coated structures is a reduction in capacity. In order to achieve a better compromise between the capacity and space velocity characteristics of coated structures and pellets, the absorbent materials described herein can be incorporated into porous cloths. The cloths may be comprised of woven or non-woven fibers of a variety of different materials including various metals (for example, copper, nickel or stainless steel), metal oxides or carbon fibers. In a preferred embodiment, the powders are incorporated into a metal-based cloth to improve the thermal characteristics of the powder bed.

In order to coat the cloth structures, the powders are often formed into a slurry, paste or ink that is then applied to the cloth surface. Methods to coat the powders onto the surface of the cloth structures may include wash-coating, dipping, screen printing, ink-jet printing, spraying or any other printing or coating, digital or analog technologies known to those skilled in the art.

In another embodiment, the powders may be incorporated into the bulk of the textile, cloth or paper at the time of manufacture of the textile, cloth or paper support. In the typical paper or non-woven cloth manufacturing process, the powders are mixed with the fibers in the original slurry and as the suspended materials are removed from the slurry, the powders are trapped inside the structure of the material. Post-processing may be necessary to achieve some chemical attachment between the particles and the support to compliment the mechanical entrapment within the pore structure created by the fibers.

It will also be appreciated that the absorbent materials can be formed into monoliths, such as by extruding the materials.

Absorbent materials as part of membrane separation devices

The reversible gas absorbent materials according to the present invention can also be integrated into structures that allow for separation of a chemical species from a mixture of gases through the selective absorption of the chemical species with an absorbent material as part of a separation device. In one embodiment, the gas separation can be achieved by forming a dense structure comprised of the absorbent material, possibly combined with an inert phase, that on one side of its structure is exposed to a reagent stream that contains the target species (e.g., $H_2$, $NO_x$, $CO_2$, $H_2S$) that is to be separated. The target chemical species are absorbed by the active material and are transported through the body of the separation device driven by a gradient (typically in concentration or pressure) to another region of the separation device where the target species is released. As an example, the separation device may take the form of a thin disk comprising the absorbent material mixed with an inert species such as alumina in a way that the disk is not permeable to all gases. One face of the disk or membrane is exposed to a gas stream that contains $CO_2$ as the target species to be removed. The active absorbent (which may need to be heated to an appropriate temperature) selectively absorbs the $CO_2$ to form $CaCO_3$. On the opposite face of the membrane, a vacuum can be applied to remove the $CO_2$ as it desorbs from the surface of the $CaCO_3$ and reforms CaO. The membrane may also be comprised of the active absorbent embedded into an organic membrane material such as an organic polymer. These membranes can be used under different conditions to remove target molecules from liquid or gaseous fluids.

The absorbent materials of the present invention can be regenerated by desorption of the absorbent to complete the cycle. Regeneration of the absorbent can include heating the absorbent to an elevated temperature. The preferred regeneration temperature depends upon the absorbent compound and the chemical species that is absorbed. For example, for the regeneration of CaO from $CaCO_3$, a preferred temperature is at least about 700° C. and preferably does not exceed about 900° C., at ambient pressure. It will be appreciated that the regeneration temperature and/or regeneration time for some absorbent materials can be decreased in many applications by reducing the pressure over the material.

According to the present invention, the absorbent material can be cycled (i.e., absorbing the chemical species to a minimum capacity and then regenerating to remove substantially all of the chemically bound absorbed species) at least ten times, wherein the absorbent compound retains at least about 40 mol. % of its theoretical absorption capacity based on the quantity of absorbent compound present in the absorbent material for every cycle through at least ten cycles. Further, the absorbent compound can preferably retain at least about 50 mol. % of its theoretical absorption capacity for every cycle up to ten cycles and more preferably at least about 60 mol. % of its theoretical absorption capacity for every cycle up to ten cycles. According to certain preferred embodiments of this aspect of the present invention, the absorbent can retain at least about 30 mol. % of its theoretical absorption capacity for every cycle up to 100 cycles, more preferably up to 200 cycles and even more preferably up to 500 cycles. In one embodiment, the absorbent is cycled at least 200 times and the absorbent retains at least about 10% of its theoretical absorption capacity, more preferably at least about 25% of its theoretical absorption capacity and even more preferably at least about 50% of its theoretical absorption capacity after 200 cycles.

The absorbent materials according to the present invention also have a high initial absorption capacity for the chemical species. According to one embodiment, the initial absorption capacity (expressed as a mole fraction of the absorbent compound present in the absorbent material) is at least about 60 mol. %, and even more preferably is at least about 90 mol. %.

High absorption capacity can be achieved over 50 cycles, over 100 cycles, over 200 cycles and even over 500 cycles. According to one embodiment, the absorbent material retains at least about 10 grams of $CO_2$ per 100 grams unreacted absorbent compound after each of the cycles. More preferably, the absorbent material retains at least 20 grams $CO_2$ per 100 grams unreacted absorbent compound after each of the cycles, even more preferably at least about 30 grams $CO_2$ per 100 grams unreacted absorbent compound after each of the cycles, even more preferably at least about 40 grams $CO_2$ per 100 grams unreacted absorbent compound after each of the cycles and even more preferably at least 50 grams $CO_2$ per 100 grams unreacted absorbent compound after each of the cycles. According to one embodiment, the absorbent material can be cycled at least 50 times wherein the absorbent material retains at least about 20 mol. % of its theoretical absorption capacity after each cycle. More preferably, the absorbent material retains at least about 30 mol. % of its theoretical absorption capacity, even more preferably at least about 50 mol. % and even more preferably at least about 70 mol. %.

According to one embodiment, the absorbent material can preferably retain at least about 15 grams $CO_2$ per 100 grams unreacted absorbent material after each of 50 cycles, even more preferably at least about 25 grams $CO_2$ per 100 grams unreacted absorbent material after each of 50 cycles, even more preferably -at least about 35 grams $CO_2$ per 100 grams unreacted absorbent material after each of 50 cycles, and even more preferably at least about 50 grams $CO_2$ per 100 grams of unreacted absorbent material after each 50 cycles. Further, the absorbent material can be cycled at least 100 times when the absorbent material retains at least about 20 mol. % of its theoretical $CO_2$ absorption capacity.

According to one embodiment, the absorbent material includes composite particles that includes an absorbent compound and an inert compound such as a metal oxide. The absorbent material preferably has a high absorption. The absorbent compound contained within the composite absorbent material preferably has an absorption capacity of at least about 30 mol. % after 100 cycles, more preferably at least about 50 mol. % and even more preferably at least about 70 mol. %. According to one embodiment, the absorbent material has an absorption capacity of at least about 10 grams $CO_2$ per 100 grams of absorbent material after 100 cycles, preferably at least about 20 grams $CO_2$ and more preferably at least about 30 grams $CO_2$ per 100 grams of absorbent material.

It is also an advantage of the present invention that the absorbent does not undergo large fluctuations in bulk density over numerous cycles. The bulk density of the materials described in the present specification is defined as the mass of the particles divided by the volume they occupy, including the pore spaces between the particles. This volume includes the solid material volume, the open and closed pore volume within the particles, as well as the interparticle void volume. The bulk density of the material is typically derived from a mercury porosimetry measurement. For example, according to one embodiment, the absorbent material is formed into a pellet having a first bulk density. The pellet can then be used substantially as described above and the pelletized absorbent will react upon absorption of the chemical species to form a reacted absorbent pellet having a second bulk density. After the pellet is regenerated back to the absorbent material, it will have a third bulk density. Using commercially available absorbent materials, the second bulk density is much lower than the first bulk density and the third bulk density would be similar to the first bulk density. According to the present invention, however, the second bulk density is not significantly different than the first bulk density and the third bulk density is much higher than the first bulk density. According to one embodiment, the third bulk density is preferably greater than 100% of the first bulk density, such as up to about 140% of the first bulk density.

$H_2S$ Absorption

The present invention can be applied to absorbent materials for the absorption of $H_2S$, such as from a gas stream resulting from coal combustion. Useful absorbent compounds for absorption of $H_2S$ according to the present invention include CaO and ZnO.

According to one embodiment of the present invention, a metal sulfide may be formed directly—that is, the microstructure of the absorbent material can be designed around the absorbent in its "sulfur-absorbed form" and prior to being used for sulfur absorption, it is activated. The activation step is a step that converts the metal sulfide to a metal oxide, for example by reaction of the meal sulfide with water at elevated temperature to liberate $H_2S$. The advantage of producing the metal sulfide is that the microstructure is fixed around the sulfur-absorbing material in its lowest density form or highest molar volume form. In this situation the porosity and surface area of the active sulfur absorbent is likely to be higher than the metal sulfide around which the microstructure is determined which aids in the reproducible uptake of $H_2S$. In this embodiment, the metal sulfide can be produced directly by the spray-based processing method through use of reagents that employ sulfur-containing reagents such as soluble or colloidal inorganic (e.g., metal nitrate) metal-organic (e.g., metal carboxylate) or organometallic (e.g., metal alkyl) compounds with sulfur-containing reagents such as $H_2S$, $R_2S$ (R=alkyl group) or thiocarboxylates. Alternatively, the metal sulfides may also be produced by reacting intermediate metal precursors or metal oxides with sulfur containing reagents in a post-processing step that follows the spray processing step.

In each of the cases described above, the materials produced might also contain inert material (that is material that does not substantially react with $H_2S$) that is present to act as a dispersant or support of the active sulfur absorbent to help maintain the microstructure and therefore the absorption capacity of the sulfur absorbent on repeated sulfur absorbent cycles.

$CO_2$ Abatement

The $CO_2$ absorbent materials according to the present invention are useful in a number of applications. Some applications will require the regeneration (decarbonation) of the carbonated compound, whereas others will not require this cycling step.

Specifically, the absorbent materials of the present invention can be used in anesthesiology applications and applications that require the removal of carbon dioxide from an enclosed space, such as space vehicles and submarines. The absorbent materials can also be used in the food industry such as the packaging of foods including respiring fruits and vegetables. The absorbent materials can also be used in breathing apparatus such as a diving re-breather. The materials can also be used to remove carbon dioxide from a gas stream such as those resulting from the combustion of fossil fuels. The materials can also be used to remove $CO_2$ from $H_2$-containing gas (e.g., syngas) from a reforming process. See, for example, U.S. Pat. No. 6,280,503 by Mayorga et al., which is incorporated herein by reference in its entirety.

$NO_x$ Abatement

The present invention can be applied to the absorption of nitrogen oxides ($NO_x$), such as from a gas stream. Materials that are useful for absorption of $NO_x$ according to the present invention include the oxides, hydroxides or carbonates of alkali metals, alkaline earth metals and lanthanide metals. Preferred among these are the oxides, hydroxides or carbonates of sodium (Na), potassium (K), calcium (Ca) or barium (Ba) that are either unsupported or supported by porous inert substrates, such as $Al_2O_3$. Mixed oxides, such as $MnO_x:ZrO_2$ or BaO:CuO are also useful. Other useful materials include Y—Ba—Cu—O oxides and $CeO_2$, such as $CeO_2:ZrO_2$ composites and perovskites such as $BaSnO_3$. Other materials can include $Fe_2O_3$ dispersed on microporous carbon.

$NO_x$ absorption materials are particularly useful for treating a gas stream, such as from coal combustion, to remove nitrogen oxides. The spray processing method of the present invention enables the fabrication of the foregoing $NO_x$ absorption materials with controlled porosity characteristics and controlled chemistry and morphological characteristics to enable high storage capacity (close to theoretical) and good absorption/desorption properties, and controlled reduction to $N_2$ with the incorporation of the appropriate catalyst in the multi-functional sorbent.

These metal oxides can be produced using spray processing routes from a variety of different precursors. In one embodiment of this invention, a solution comprising soluble precursors such as metal nitrates can be used. In another embodiment, a colloidal dispersion can be used. Such a colloidal dispersion is typically comprised of suspended particles of either the metal oxide or a precursor to the metal oxide such as a metal organic compound, including but not limited to a metal carboxylate or oxalate. The colloidal dispersion can be formed by dispersion of pre-formed particles or by generating the particles in-situ by for example reacting one or more soluble precursors to form an insoluble, colloidal precursor. An example of the latter route is the reaction between calcium nitrate and ammonium oxalate to form a colloidal suspension of calcium oxalate. In another embodiment of this invention, a precursor may be produced by a spray-based route and subsequently converted to the final material in a separate processing step such as thermal reaction of an intermediate.

In yet another embodiment of the present invention, the metal nitrate may be formed directly—that is, the microstructure of the material is designed around the absorbent in its "$NO_x$-absorbed form" and prior to being used for $NO_x$ absorption, it is activated. The activation step is a step that converts the metal nitrate to a metal oxide or carbonate, for example by reaction of the metal nitrate with air at elevated temperature to form either the metal oxide or the metal carbonate. The advantage of producing the metal nitrate is that the microstructure is fixed around the sulfur-absorbing material in its lowest density or highest molar volume form. In this situation, the porosity and surface area of the active $NO_x$ absorbent is likely to be higher than the metal nitrate around which the microstructure is determined which aids in the reproducible uptake of $NO_x$. In this embodiment, the metal nitrate can be produced directly by the spray processing method through use of reagents that employ metal nitrate reagents such as soluble or colloidal inorganic species. Alternatively, the metal nitrates may also be produced by reacting intermediate metal precursors or metal oxides with $NO_x$ containing reagents in a post-processing step that follows the spray manufacturing step.

It should be realized that in each of the cases described above, the materials produced might also contain inert material (that is material that does not substantially react with $NO_x$) that is present to act as a dispersant or support of the active $NO_x$ absorbent to help maintain the microstructure and therefore the absorption capacity of the $NO_x$ absorbent on repeated $NO_x$ absorption cycles.

Reversible Hydrogen Storage

The present invention can also be applied to fabricate materials for the storage of hydrogen ($H_2$). Safe and economical means for hydrogen storage and delivery a key component for the widespread application of electrochemical devices using hydrogen as a reactant, such as fuel cells. Hydrogen storage materials are described, for example, in U.S. Patent Application Publication No. 2002/0096048 by Cooper et al., which is incorporated herein by reference in its entirety. However, current $H_2$ storage materials have a low absorption and desorption rate and the particles have a tendency to break down after multiple cycles.

According to the present invention, hydrogen can be reversibly stored in an absorption material that is fabricated by spray processing. According to one embodiment, the absorption material can include a misch metal, preferably selected from the group consisting of $LaNi_5$, $Mg_2Ni$, $Mg_2Fe$, TiFe, and $ZrMn_2$. Such materials form metal hydrides upon reaction with $H_2$, such as $LaNi_5H_{6.5}$. These materials are particularly preferred for use in Ni-metal hydride batteries.

These misch metal hydrides can be produced using spray processing routes from a variety of different precursors in a number of different strategies. In one strategy the misch metal hydride can be produced directly using spray-based processing in a reducing atmosphere to form the final product. In another strategy, a precursor to the misch metal hydride can be produced, e.g., in an oxidized form, which is converted to the final misch metal hydride or alloy in a second processing step. In this case, a metal oxide may be formed as an intermediate, which on subsequent thermal reduction forms the misch metal alloy or hydride.

In one embodiment of the present invention, a solution comprising precursors that are soluble in the precursor solution such as metal hydrates can be used. In another embodiment, a colloidal dispersion of metal hydrates can be used. The colloidal dispersion can be formed by dispersion of pre-formed particles or by generating the particles in-situ by for example reacting one or more soluble precursors to form an insoluble, colloidal precursor. An example of the latter route is the reaction between calcium nitrate and ammonium oxalate to form a colloidal suspension of calcium oxalate. In another embodiment of the present invention, a precursor may be produced by a spray-based route and subsequently converted to the final material in a separate processing step such as the thermal reaction of an intermediate.

It should be realized that in each of the cases described above, the materials produced might also include an inert material (a material that does not substantially react with $H_2$) that acts as a dispersant or support for the active $H_2$ absorbent to help maintain the microstructure and therefore the absorption capacity of the $H_2$ absorbent on repeated cycles.

Other $H_2$ absorption materials that are useful for hydrogen storage include metal hydrides, such as hydrides of Mg, B, Al, Li, Na, or complexes thereof, including $NaAlH_4$, $MgH_2$, LiH, $Mg(BH_4)_2$, $Al(BH_4)_3$, $H_3BNH_3$, $NaBH_4$, $AlH_3$, $LiAlH_4$, $LiBH_4$ and $Mg(AlH_4)_2$. Also useful is $Mg_2NiH_4$, which forms $2H_2$ and a $Mg_2Ni$ alloy. Compared to the lower $H_2$ storage capacity (<2 wt. %) of misch metal hydrides like $LaNi_5$, $Mg_2Ni$, $Mg_2Fe$ and TiFe, the complex metal hydrides generally have a large $H_2$ storage capacity because of their light formula weight and a higher number of hydrogen atoms surrounding the metal atom. For examples, $LiBH_4$ has a theorectical hydrogen mass of 18.3 wt. %, and it is reported that the reversible hydrogen mass is 13.4 wt. %. LiH has a reversible hydrogen mass of about 9.0 wt. % and $NaAlH_4$ has a reversible hydrogen mass of about 5.5 wt. %. Even with the addition of a heavy element into the metal hydride, the hydrogen mass is still acceptable. One example is $Mg_2FeH_6$, which has the potential for 5.5 wt. % hydrogen storage.

Although the foregoing metal hydrides show a high capacity for hydrogen storage, there are a lot of challenges in practical use; the rates of hydrogen absorption and desorption are slow; the temperature for hydrogen desorption is high and the material breaks down into small particles after multiple cycling. The shortcomings of current available metal hydrides as hydrogen storage materials could come from lack of either technologies or strategies that enable the selective tailoring of material composition and microstructure. For example, the low porosity and large particle size like $NaBH_4$ are responsible for slow $H_2$ absorption and desorption. The strong binding between hydrogen atom and metal hydride results in the higher temperature for desorption.

In one embodiment of the present invention, the aforementioned chemical hydrides can be formed by spray processing of soluble precursors, such as organic solvent soluble $NaBH_4$, with or without an inert filler to help control the pore structure of the material on reversible absorption of $H_2$. A catalytic component such as Ti, Cr, V, Mn, Fe can also be included in the metal hydride solution to improve the kinetics of hydrogen absorption and desorption. These materials may also be formed in-situ by the reaction of different reagents that are either dissolved or suspended in the precursor solution and converted to a chemical hydride on spray processing.

In another embodiment of the present invention, an intermediate compound to the final chemical hydride may be produced by spray processing, such as a metal alloy, a molecular metal-containing compound, a metal-containing complex or a metal-containing material (metal oxide, nitride, halide, sulfide or the like) which can be converted to the chemical hydride on subsequent processing by either thermal or reducing treatments.

It should be realized that in each of the cases described above, the materials produced can also include an inert material (that is material that does not substantially react with $H_2$) that is present to act as a dispersant or support of the active $H_2$ absorbent to help maintain the microstructure, and therefore the absorption capacity of the $H_2$ absorbent on repeated $H_2$ absorbent cycles.

Alkali metal nitrides are also useful as hydrogen storage materials and can be fabricated in accordance with the present invention. Microporous carbon-based materials that contain metal catalyst nanoparticles can also have enhanced hydrogen storage characteristics.

Another material that is useful for the reversible absorption of $H_2$ is a carbon-based material, including carbon powders, carbon fibers, graphite, vitreous carbon, carbon aerogels and surface modified carbon materials that typically also comprise other materials such as catalysts for the oxidation and reduction of $H_2$. Spray-based routes to the these materials can be used to disperse the catalytically active phase over the surface of the carbon. The use of spray processing for this purpose has been described in U.S. Pat. No. 6,103,393, which is incorporated herein by reference in its entirety. In each of the cases described above, the materials produced can also include an inert material that is present to act as a dispersant or support of the active $H_2$ absorbent to help maintain the microstructure and therefore the absorption capacity of the $H_2$ absorbent on repeated $H_2$ absorbent cycles.

The spray processing method of the present invention enables the fabrication of the foregoing hydrogen storage materials with controlled porosity characteristics and controlled chemistry and morphological characteristics to enable high storage capacity (close to theoretical) and good absorption/desorption properties. The particles can be formed with a controlled particle size and high porosity, which will enable hydrogen storage materials to show higher storage capacity and faster adsorption kinetics. Controlled doping of a component into the structure of the metal hydride can lower the affinity of the metal to the hydrogen atom, decreasing their binding energy. A catalytic component can also be added on the surface of the metal hydride, which will more readily dissociate the hydrogen molecules into hydrogen atom during absorption. The hydrogen storage materials manufactured through the spray processing method of the present invention can have a high storage capacity, faster kinetics, physical strength, and durable recycle ability.

EXAMPLES

The following examples illustrate the production and application of absorbent materials according to the present invention.

The absorbent materials according to the present invention can be fabricated by spray pyrolysis or spray drying, and either fabrication method can be followed by post-processing. The following specific examples illustrate some of these non-limiting embodiments.

Examples L-1 to L-4 illustrate the fabrication of lithium-based absorbent materials.

Example L-1

This example illustrates the production of a 50 g batch of $Li_2O$ absorbent according to the present invention by spray pyrolysis. 114 g of Li-nitrate $(LiNO_3)_2)$ is dissolved in 447 g of de-ionized water. 1 g of lactic acid and 1 g of $NH_4$-nitrate $(NH_4NO_3)$ is added while stirring and the solution is stirred for 10 minutes. Spray pyrolysis is conducted on an ultrasonic transducer system at a furnace temperature of 1100° C., with air as both the carrier gas and the quench gas at 60 SLPM and 5 SCFM, respectively. The reaction residence time of the system is 1.5 seconds, as calculated by the quotient of the system volume and the carrier gas flow rate corrected for temperature expansion. The collected powder batch consists essentially of $Li_2O$ Example L-2

This example illustrates the fabrication of a 500 g batch of 10% $Al_2O_3/Li_2O$ according to the present invention in a spray dryer. 1.03 kg of Li-nitrate is dissolved in 5.8 kg of de-ionized water and 2.23 kg of $NH_4$-oxalate $((NH_4)_2C_2O_4)$ is dissolved in 5.8 kg of de-ionized water. The two solutions are individually mixed on shear mixers for 30 minutes. The Li-nitrate solution is slowly added to the $NH_4$-oxalate solution while shearing to precipitate $Li_2C_2O_4$. The resulting 10 wt. % solids dispersion of precipitated $Li_2C_2O_4$ is sheared for an additional hour. 0.25 kg of DISPAL 23N4-20 (a 20% boehmite alumina dispersion in water, available from Sasol, North America) is added, followed by 15 minutes of shear mixing. The precursor dispersion is fed into a mixed-flow spray dryer at a liquid feed rate to maintain inlet/outlet temperatures of 975° F./580° F., using a two-fluid nozzle with an air pressure of 65 psig. The residence time of the system is 10 seconds, as calculated above. The powder is collected using a cyclone.

Example L-3

This example illustrates the fabrication of a $Li_2CO_3/Al_2O_3$ composite by spray drying and post-processing according to the present invention. 140 g of a powder consisting of 10% $Al_2O_3$ is put into 2 quartz boats, which are then loaded into a tube furnace. Under flowing air, the furnace is ramped 10° C./min to 500° C., held for 3 hours and is then cooled to room temperature. The resulting powder consists essentially of $Li_2CO_3$ and $Al_2O_3$.

Example L-4

This example illustrates the fabrication of a powder batch consisting essentially of $Li_2CO_3$ and $Li_2O$ with $Al_2O_3$ by spray drying and post-processing according to the present invention. 140 g of a powder consisting 10% $Al_2O_3$ made by spray drying (Example L-3) is put into 2 quartz boats, which are then loaded into a tube furnace. Under flowing air, the furnace is ramped 10° C./min to 800° C., held for 3 hrs and is then cooled to room temperature. The resulting powder consists essentially of a mixture of $Li_2CO_3$, $Li_2O$ and $Al_2O_3$.

Examples H-5 to H-7 illustrate the fabrication of hydrogen storage materials according to the present invention.

Example H-5

This example illustrates the production of a 5 g batch of $LiAlH_4$ absorbent according to the present invention by spray processing. 5 g of commercially available $LiAlH_4$ (around 10~40 mesh) is dissolved in 50 g of diethyl ether and the solution is stirred for 1 hr under an $N_2$ atmosphere. Spray processing is conducted on an ultrasonic transducer system at a furnace temperature of 150° C., with pure $N_2$ as both the carrier gas and the quench gas at 60 SLPM and 5 SCFM, respectively. The reaction residence time of the system is 1.5 seconds, as calculated by the quotient of the system volume and the carrier gas flow rate corrected for temperature expansion. The collected powder batch consists essentially of fine powder

Example H-6

This example illustrates the production of a log batch of $LiH/AlH_3$ absorbent according to the present invention by spray processing. 7.8 g of commercially available $AlH_3$ (around 10~40 mesh) and 2.2 g of commercially available LiH (10~40mesh) is dissolved in 100 g of diethyl ether solution and the solution is stirred for 1hr under an $N_2$ atmosphere. 1 g of $MCl_x$ (where M=Ti, Cr, V, Mn, Fe) is added into the solution, followed by 30min of shear mixing. Spray pyrolysis is conducted on an ultrasonic transducer system at a furnace temperature of 150° C., with pure $N_2$ as both the carrier gas and the quench gas at 60 SLPM and 5 SCFM, respectively. The reaction residence time of the system is 1.5 seconds, as calculated by the quotient of the system volume and the carrier gas flow rate corrected for temperature expansion. The collected powder batch consists essentially of fine powder

Example H-7

This example illustrates the production of a 10 g batch of $NaAlH_4$ absorbent according to the present invention by spray processing. 10 g of commercially available $NaAlH_4$ (around 10~40 mesh) is dissolved in 100 g of diethyl ether solution and the solution is stirred for 1 hr under an $N_2$ atmosphere. 2 g of $MCl_x$ (where M=Ti, Cr, V, Mn, Fe) is added into the solution, followed by 30min of shear mixing. Spray pyrolysis is conducted on an ultrasonic transducer system at a furnace temperature of 150° C., with pure $N_2$ as both the carrier gas and the quench gas at 60 SLPM and 5 SCFM, respectively. The reaction residence time of the system is 1.5 seconds, as calculated by the quotient of the system volume and the carrier gas flow rate corrected for temperature expansion. The collected powder batch consists essentially of fine powder

Example A-1

This example illustrates the production of a 5 g batch of Ca-oxide (CaO) absorbent according to the present invention by spray pyrolysis. 21 g of Ca-nitrate $(Ca(NO_3)_2)$ is dissolved in 178 g of de-ionized water. 1 g of lactic acid and 1 g of $NH_4$-nitrate $(NH_4NO_3)$ is added while stirring and the solution is stirred for 10 minutes. Spray pyrolysis is conducted on an ultrasonic transducer system at a furnace temperature of 900° C., with air as both the carrier gas and the quench gas at 60 SLPM and 5 SCFM, respectively. The reaction residence time of the system is 1.5 seconds, as calculated by the quotient of the system volume and the carrier gas flow rate corrected for temperature expansion. The collected powder batch consists essentially of CaO.

Example A-2

This example illustrates the fabrication of a 1 kg batch of Ca-oxalate $(CaC_2O_4)$ according to the present invention using a spray dryer. 1.84 kg of Ca-nitrate is dissolved in 2 kg of de-ionized water and 1.11 kg of $NH_4$-oxalate is dissolved in 4.5 kg of de-ionized water. The two solutions are individually mixed on shear mixers for 30 minutes. The Ca-nitrate solution is slowly added to the $NH_4$-oxalate solution while shearing. The resulting 10 wt. % solids dispersion of precipitated Ca-oxalate is sheared for an additional hour. The precursor dispersion is fed into a mixed-flow spray dryer at a liquid feed rate to maintain inlet/outlet temperatures of 975° F./580° F. (524° C./304° C.), using a two-fluid nozzle with an air pressure of 65 psig. The residence time of the system is 10 seconds as calculated by the quotient of the system volume and the gas flow rate corrected for expansion using the outlet temperature. The powder is collected using a cyclone. The powder batch consists essentially of $CaC_2O_4$.

Example A-3

This example illustrates the fabrication of a 1 kg batch of $CaC_2O_4$ and 5% $Al_2O_3$ according to the present invention in a spray dryer. 1.74 kg of Ca-nitrate is dissolved in 2 kg of de-ionized water and 1.06 kg of $NH_4$-oxalate $((NH_4)_2C_2O_4)$ is dissolved in 5 kg of de-ionized water. The two solutions are individually mixed on shear mixers for 30 minutes. The Ca-nitrate solution is slowly added to the $NH_4$-oxalate solution while shearing to precipitate $CaC_2O_4$. The resulting 10 wt. % solids dispersion of precipitated $CaC_2O_4$ is sheared for an additional hour. 0.25 kg of DISPAL 23N4-20 (a 20% boehmite alumina dispersion in water, available from Sasol, North America) is added, followed by 15 minutes of shear mixing. The precursor dispersion is fed into a mixed-flow spray dryer at a liquid feed rate to maintain inlet/outlet temperatures of 975° F./580° F., using a two-fluid nozzle with an air pressure of 65 psig. The residence time of the system is 10 seconds, as calculated above. The powder is collected using a cyclone. The powder batch consists essentially of 5 wt. % $Al_2O_3$ and 95 wt. % $CaC_2O_4$.

Example A-3A

This example illustrates the fabrication of a powder batch consisting essentially of $CaC_2O_4$ with 25% $Al_2O_3$. 1.38 kg of Ca-nitrate is dissolved in 2 kg of de-ionized water. 0.84 kg of $NH_4$-oxalate is dissolved in 5 kg of de-ionized water. The two solutions are mixed on shear mixers individually for 30 minutes. The Ca-nitrate solution is slowly added to the $NH_4$-oxalate solution while shearing. The resulting 10 wt. % solids dispersion of precipitated Ca-oxalate is sheared for an additional hour. 1.25 kg of DISPAL 23N4-20 is added, followed by 15 minutes of shear mixing. The precursor dispersion is fed into a mixed flow spray dryer at a liquid feed rate to maintain inlet/outlet temperatures of 975/580° F., using a two-fluid nozzle with an air pressure of 65 psig. The residence time of the system is 10 seconds, s defined above. The powder is collected using a cyclone and consists essentially of $CaC_2O_4$ and $Al_2O_3$.

Example A-4

This example illustrates the fabrication of a $CaCO_3/Al_2O_3$ composite by spray drying and post-processing according to the present invention. 140 g of a powder consisting essentially of $CaC_2O_4$ and 5% $Al_2O_3$ (Example A-3) is put into 2 quartz boats, which are then loaded into a tube furnace. Under flowing air, the furnace is ramped 10° C./min to 500° C., held for 3 hours and is then cooled to room temperature. The resulting powder consists essentially of $CaCO_3$ and $Al_2O_3$.

Example A-5

This example illustrates the fabrication of a powder batch consisting essentially of $CaCO_3$ and CaO with $Al_2O_3$ by spray drying and post-processing according to the present invention. 140 g of a powder consisting essentially of $CaC_2O_4$ and 5% $Al_2O_3$ made by spray drying (Example A-3) is put into 2 quartz boats, which are then loaded into a tube furnace. Under flowing air, the furnace is ramped 10° C./min to 750° C., held for 3 hrs and is then cooled to room temperature. The resulting powder consists essentially of a mixture of $CaCO_3$, CaO and $Al_2O_3$.

Example A-6

This example illustrates the fabrication of a 500 g batch of a powder consisting essentially of $CaC_2O_4$:$MgC_2O_4$ with a calculated CaO:MgO wt. ratio of 50:50 according to the present invention. Individually, 0.92 kg of Ca-nitrate is dissolved in 1.0 kg of de-ionized water, 0.54 kg of $NH_4$-oxalate is dissolved in 2.5 kg of de-ionized water, 1.0 kg of Mg-nitrate $(Mg(NO_3)_2)$ is dissolved in 1.0 kg of de-ionized water, and 0.56 kg of $NH_4$-oxalate is dissolved in 1.8 kg of de-ionized water. These solutions are shear mixed for 30 minutes. Separately, the nitrate solutions are added to the oxalate solutions. The two resulting dispersions of Ca-oxalate and Mg-oxalate are sheared separately for 1 hour and are then combined. The resulting 10 wt. % solids dispersion of precipitated Ca-oxalates and Mg-oxalates is sheared for an additional hour. The precursor dispersion is fed into a mixed-flow spray dryer at a liquid feed rate to maintain inlet/outlet temperatures of 975° F./580° F., using a two-fluid nozzle with an air pressure of 65 psig. The residence time of the system used is 10 seconds, as defined above. The powder is collected using a cyclone and consists essentially of $CaC_2O_4$:$MgC_2O_4$.

Example A-7

This example illustrates the fabrication of a powder batch consisting of a mixture of $CaCO_3$ and CaO:MgO by spray drying and post-processing according to the present invention. 320 g of a $CaC_2O_4$:$MgC_2O_4$ powder made on a spray dryer and with a calculated CaO:MgO wt. ratio of 50:50 (Example A-6) is put into shallow pans, which are then loaded into a convection oven. Under flowing air, the furnace is ramped 10° C./min to 500° C., held for 3 hours, and is then cooled to room temperature. The resulting powder batch consists essentially of $CaCO_3$ and CaO:MgO.

Example A-8

This example illustrates the fabrication of a powder batch consisting essentially of 95 wt. % $CaCO_3$ and CaO with 5 wt. % $Al_2O_3$ by spray drying and post-processing according to the present invention. A powder batch consisting essentially of $CaC_2O_4$ and 5% $Al_2O_3$, (which is made the same method as Example A-3), is put into a screw feeder and delivered to a rotary calciner comprising an elongated tube at a rate of 1 kg/hr. The tube includes three equal-length heating zones that are set to 450° C., 750° C. and 750° C. respectively. Air is delivered in a counter-current configuration at a rate of 112 SCFH. The elongated tube is set with an angle and rotational rate in order to yield a residence time of 24 minutes.

Example A-9

This example illustrates the fabrication of a 3 kg powder batch consisting essentially of $CaC_2O_4$:$MgC_2O_4$ (with a calculated CaO:MgO wt. ratio of 80:20). Individually, 4.24 kg of Ca-nitrate is dissolved in 5 kg of de-ionized water, 4.11 kg of $NH_4$-oxalate is dissolved in 6 kg of de-ionized water, 1.6 kg of Mg-nitrate is dissolved in 2 kg of de-ionized water and 1.43 kg of $NH_4$-oxalate is dissolved in 5 kg of de-ionized water. These solutions are shear mixed for 30 minutes. Separately, the nitrate solutions are added to the oxalate solutions. The two resulting dispersions of Ca-oxalate and Mg-oxalate are sheared separately for 1 hour then combined. The resulting 10 wt. % solids dispersion of precipitated Ca-oxalate and Mg-oxalate is sheared for an additional hour. The precursor dispersion is fed into a mixed-flow spray dryer at a liquid feed rate to maintain inlet/outlet temperatures of 975° F./580° F., using a two-fluid nozzle with an air pressure of 65 psig. The residence time of the system used is 10 seconds, as calculated above. The powder is collected using a cyclone and consists essentially of $CaC_2O_4$:$MgC_2O_4$.

Example A-10

This example illustrates the fabrication of a powder batch consisting essentially of a mixture of $CaCO_3$ and CaO:MgO by spray drying and post-processing according to the present invention. 200 g of a powder consisting essentially of $CaC_2O_4$:$MgC_2O_4$ (calculated CaO:MgO wt. ratio of 80:20, Example A-9) is put into shallow pans, which are then loaded into a convection oven. Under flowing air, the furnace is ramped 10° C./min to 500° C., held for 3 hrs and is then cooled to room temperature. The resulting powder batch consists of a mixture of $CaCO_3$ and CaO:MgO.

Example A-11

This example illustrates the fabrication of a mixture of $CaCO_3$ and CaO:MgO by spray drying and post-processing according to the present invention. 200 g of $CaC_2O_4$:$MgC_2O_4$ (80:20 ratio, Example A-9) is put into shallow pans, which are then loaded into a convection oven. Under flowing air, the furnace is ramped 10° C./min to 750° C., held for 3 hrs and is then cooled to room temperature.

Table 4 lists the particle size distribution (PSD), BET surface area, average pore diameter and pore volume for select absorbent examples listed above. For the examples in Table 4 and the following examples herein, the PSD is measured by laser light scattering, such as in a MICROTRAC instrument (Microtrac, Inc., Montgomeryville, Pa.). The BET surface area is measured by nitrogen adsorption and the average pore diameter is measured by BJH adsorption. The pore volume is measured by nitrogen adsorption and is the pore volume only of pores having a diameter of not greater than about 100 nanometers.

TABLE 4

| Example | PSD d10, d50, d90 (μm) | BET Surface Area (m²/g) | Average Pore Diameter (nm) | Pore Volume (cm³/g) |
|---|---|---|---|---|
| A-2 | 2.0, 5.0, 13.0 | 19.6 | 10.6 | 0.0517 |
| A-3 | 2.3, 5.7, 16.0 | 24.5 | 16.5 | 0.101 |
| A-4 | 1.7, 4.4, 11.7 | 17.7 | 13.1 | 0.058 |
| A-5 | 3.7, 10.3, 25.0 | 18.9 | 12.5 | 0.059 |
| A-6 | 1.3, 3.0, 6.0 | 24.2 | 13.9 | 0.084 |
| A-7 | 3.1, 6.7, 14.3 | 60.1 | 16.1 | 0.242 |
| A-8 | 5.5, 14.8, 26.8 | N/A | N/A | N/A |
| A-10 | N/A | 27.8 | 13.4 | 0.093 |

The foregoing examples illustrate several different fabrication methods for absorbent materials according to the present invention. A number of additional examples are prepared in a similar fashion and these additional examples are summarized in Table 5. Table 5 lists absorbent materials that are obtained by different spray processing methods, including spray pyrolysis (SP), and spray drying (SD) with post-processing (PP). Examples A-12 and A-13 are post-processed powders from the foregoing Example A-2. Sample CaO1 is a commercial grade CaO (available from J.T. Baker, Phillipsburg, N.J., USA) that is also listed for comparison.

TABLE 5

| Example | Final Composition | Precursor | Method |
|---|---|---|---|
| A-12 | CaO, $CaCO_3$ | Example A-2 | PP at 500° C. for 3 hrs |
| A-13 | CaO, $CaCO_3$ | Example A-2 | PP at 750° C. for 3 hrs |
| A-14 | CaO | Ca-nitrate $NH_4$-nitrate Lactic acid | SP at 900° C. |
| A-15 | CaO | Ca-nitrate $NH_4$-nitrate | SP at 900° C. |
| A-16 | CaO | Ca-nitrate 20% $NH_4$-nitrate 2.5% PVP (10 k) | SP at 1000° C. |
| CaO1 | CaO | Commercial Grade | N/A |

Table 6 summarizes additional absorbent examples including CaO with MgO and/or $Al_2O_3$ that are prepared by various spray processing methods according to the present invention.

TABLE 6

| Example | Composition (nominal, expressed as oxides) | Precursor | Method |
|---|---|---|---|
| A-17 | CaO:MgO (50:50 by wt.) 5% $Al_2O_3$ | Ca-nitrate/$NH_4$-oxalate Mg-nitrate/$NH_4$-oxalate DISPAL 23N4-20 | SD |
| A-18 | CaO:MgO (50:50 by wt.) 5% $Al_2O_3$ | Example A-17 | PP at 500° C. for 3 hrs |
| A-19 | CaO:MgO (90:10 by wt.) | Ca-nitrate/$NH_4$-oxalate Mg-nitrate/$NH_4$-oxalate | SD |
| A-20 | CaO:MgO (90:10 by wt.) | Example A-19 | PP at 500° C. for 3 hrs |
| A-21 | CaO:MgO (90:10 by wt.) 5% $Al_2O_3$ | Ca-nitrate/$NH_4$-oxalate Mg-nitrate/$NH_4$-oxalate DISPAL 23N4-20 | SD |
| A-22 | CaO:MgO (90:10 by wt.) 5% $Al_2O_3$ | Example A-21 | PP at 500° C. for 3 hrs |
| A-23 | CaO:MgO (50:50 by at. %) | Ca-nitrate/Mg-nitrate glycine lactic acid | SP |
| A-24 | CaO:MgO (50:50 by at. %) | Ca-nitrate/Mg-nitrate urea ethanol | SP |
| A-25 | CaO:MgO (50:50 by at. %) | Ca-nitrate/Mg-nitrate glycine ethanol | SP |
| A-26 | CaO:MgO (50:50 by at. %) | Ca-nitrate/Mg-nitrate | SP |
| A-27 | CaO 43 wt. % $Al_2O_3$ | Ca-nitrate $NH_4$-oxalate $Al_2O_3$ | SD |
| A-28 | CaO 43 wt. % $Al_2O_3$ | Example A-27 | PP at 500° C. for 3 hrs |

The additives to the precursor compositions in Examples A-23, A-24 and A-25 (namely glycine, lactic acid, urea and ethanol) are porosity-enhancing agents for the purpose of introducing additional porosity into the absorbent materials.

Figure 11:
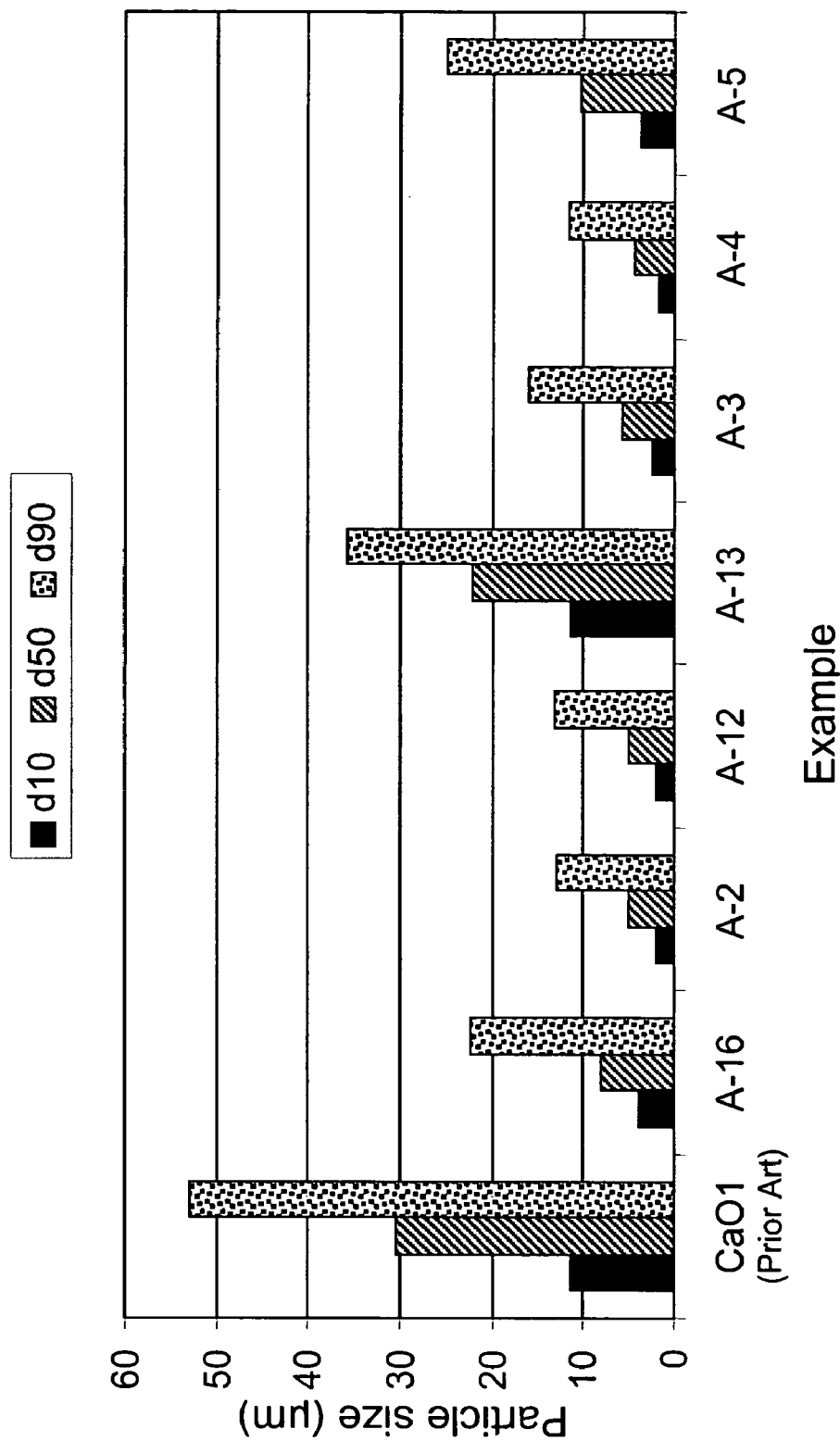
FIG. 11 illustrates the particle size distribution of absorbent powders according to the present invention compared to the prior art.

FIG. 11 compares the particle size distribution ($d_{10}$, $d_{50}$ and $d_{90}$) of commercial grade CaO, CaO prepared by spray pyrolysis and CaO/$Al_2O_3$ powders prepared by spray conversion of oxalate precursors in a spray dryer and post-processing of the intermediate compound. While the $d_{50}$ of the commercial CaO powder (CaO1) is approximately 30 μm, the $d_{50}$ of CaO powder made by spray pyrolysis (Example A-16) is less than 10 μm and for the Ca-oxalate intermediate compound (Example A-2) is about 5 μm.

Post-processing of Example A-2 at 750° C. to convert it to CaO (Example A-13) increases the $d_{50}$ from about 5 μm to about 20 μm, while the addition of $Al_2O_3$ as an additive and post-processing at 750° C. (Example A-5) reduces the sintering and $d_{50}$ increases to only about 10 μm. The addition of other inert additives such as MgO has a similar effect.

Figure 12:
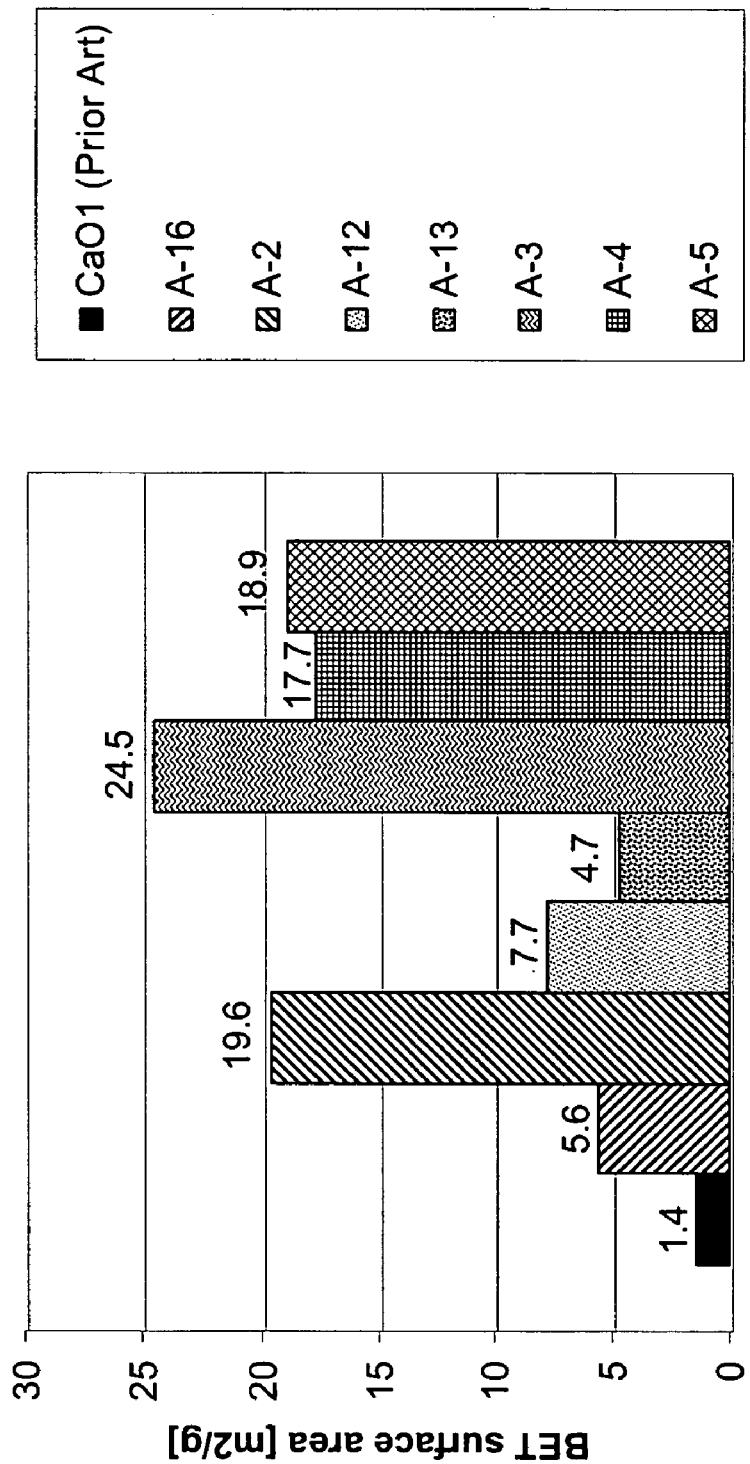
FIG. 12 illustrates the BET surface area of absorbent powders according to the present invention compared to the prior art.

FIG. 12 compares the BET surface area of the examples illustrated in FIG. 11. While the BET surface area of the commercial CaO powder is less than 2 m²/g, the surface area of the absorbent materials prepared by spray processing according to the present invention is significantly higher.

Figure 13:
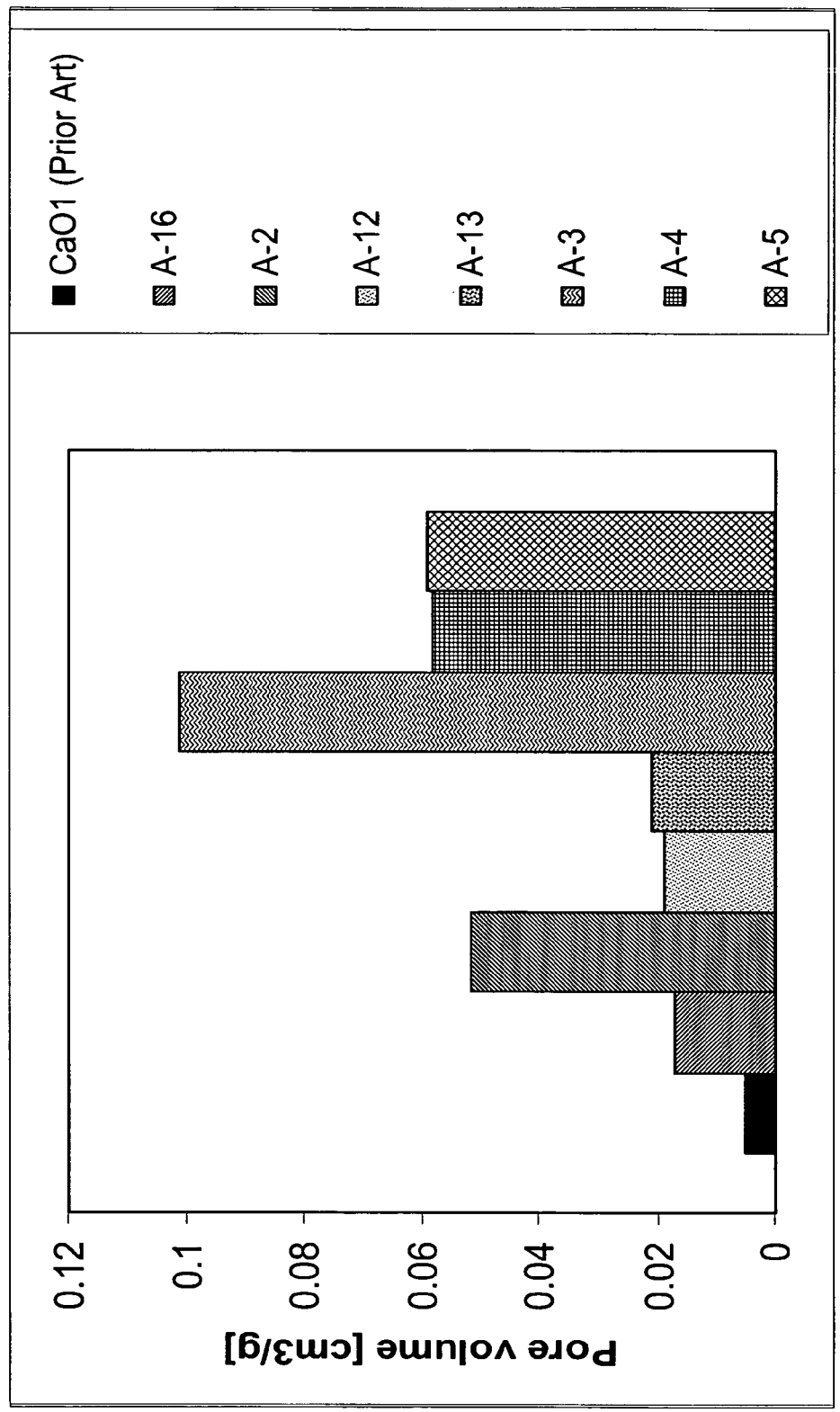
FIG. 13 illustrates the pore volume of absorbent powders according to the present invention compared to the prior art.

FIG. 13 compares the measured pore volume (for pores ≦100 nanometers) of the examples illustrated in FIGS.

11 and 12. The pore volume is less than 0.01 cm³/g for the conventional CaO powder and at least two times higher for the absorbent powders prepared by spray processing methods according to the present invention. The addition of inert additive such as alumina (e.g., Example A-3) can lead to an even higher increase of the pore volume (e.g., up to 0.1 cm³/g).

Synthesis of ZnO-Based Absorbents

The following Examples illustrate the fabrication of ZnO-based materials according to the present invention by spray drying, either with or without post-processing.

Example Z-1

ZnO; 1 kg Batch 3.7 kg of $Zn(NO_3)_2 \cdot 4H_2O$ (Zn-nitrate) is dissolved in 6.4 kg de-ionized water. The resulting 10 wt. % solids solution is fed into a mixed flow spray dryer at a liquid feed rate to maintain inlet/outlet temperatures of 975/580° F., using a two-fluid nozzle with an air pressure of 65 psig. The residence time of the system is 10 seconds as calculated by the quotient of the system volume and the gas flow rate corrected for expansion using the outlet temperature. The powder is collected using a cyclone.

Example Z-2

ZnO via Post-Processing 600 g of ZnO is put into aluminum trays, which is then loaded into a convection oven. Under flowing air, the furnace is ramped 10° C./min to 300° C., held for 3 hrs, then cooled to room temperature.

Example Z-3

ZnO, 20% $NH_4NO_3$; 1 kg Batch 3.6 kg of $Zn(NO_3)_2 \cdot 4H_2O$ is dissolved in 3 kg de-ionized water, and 200 g $NH_4NO_3$ ($NH_4$-nitrate) is dissolved in 1 kg of de-ionized water. The $NH_4NO_3$ solution is added to the $Zn(NO_3)_2 \cdot 4H_2O$ solution with rapid stirring. 2.2 kg of de-ionized water is added to form a 10 wt. % solids solution. The precursor solution is fed into a mixed flow spray dryer at a liquid feed rate to maintain inlet/outlet temperatures of 975/580° F., using a two-fluid nozzle with an air pressure of 65 psig. The residence time of the system is 10 seconds, as defined above. The powder is collected using a cyclone.

Example Z-4

ZnO via Post-Processing 600 g of ZnO is put into aluminum trays, which is then loaded into a convection oven. Under flowing air, the furnace is ramped 10° C./min to 300° C., held for 3 hrs, then cooled to room temperature.

Example Z-5

$ZnC_2O_4$; 1 kg Batch 1.9 kg of $Zn(NO_3)_2 \cdot 4H_2O$ is dissolved in 3.5 kg de-ionized water, and 930 g $(NH_4)_2C_2O_4$ ($NH_4$-oxalate) is dissolved in 3.6 kg of de-ionized water. The $(NH_4)_2C_2O_4$ solution is slowly added to the $Zn(NO_3)_2 \cdot 4H_2O$ solution while shearing. The resulting 10 wt. % solids dispersion of precipitated Zn-oxalate is sheared for an additional half hour. The precursor dispersion is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-6

ZnO via Post-Processing 600 g of $ZnC_2O_4$ (PZL952602G) is put into aluminum trays, which is then loaded into a convection oven. Under flowing air, the furnace is ramped 10° C./min to 300° C., held for 3 hrs, then cooled to room temperature.

Example Z-7

$ZnC_2O_4$; 1 kg Batch 2.4 kg of $Zn(NO_3)_2 \cdot 4H_2O$ is dissolved in 3.5 kg de-ionized water, and 620 g $(NH_4)_2C_2O_4$ is dissolved in 3.5 kg of de-ionized water. The $(NH_4)_2C_2O_4$ solution is slowly added to the $Zn(NO_3)_2 \cdot 4H_2O$ solution while shearing. The resulting 10 wt. % solids dispersion of precipitated Zn-oxalate is sheared for an additional half hour. The precursor dispersion is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-8

ZnO via Post-Processing 600 g of $ZnC_2O_4$ is put into aluminum trays, which is then loaded into a convection oven. Under flowing air, the furnace is ramped 10° C./min to 300° C., held for 3 hrs, then cooled to room temperature.

Example Z-9

ZnO; 500 g Batch 1.3 kg of $Zn(C_2H_3O_2)_2$ (Zn-acetate) is dissolved in 3.6 kg de-ionized water. 50 g of lactic acid is added with rapid stirring. The resulting 10 wt. % solids solution is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-10

ZnO via Post-Processing 200 g of $ZnC_2O_4$ is put into aluminum trays, which are then loaded into a convection oven. Under flowing air, the furnace is ramped 10° C./min to 300° C., held for 3 hrs, then cooled to room temperature.

Example Z-11

ZnO via Post-Processing 200 g of $ZnC_2O_4$ is put into aluminum trays, which are then loaded into a convection oven. Under flowing air, the furnace is ramped 10° C./min to 500° C., held for 3 hrs, then cooled to room temperature.

Example Z-12

ZnC$_2$O$_4$; 500 g Batch 720 g of Zn(C$_2$H$_3$O$_2$)$_2$ is dissolved in 2 kg de-ionized water, and 460 g (NH$_4$)$_2$C$_2$O$_4$ is dissolved in 1.8 kg of de-ionized water. The (NH$_4$)$_2$C$_2$O$_4$ solution is slowly added to the Zn(C$_2$H$_3$O$_2$)$_2$ solution while shearing. The resulting 10 wt. % solids dispersion of precipitated Zn-oxalate is sheared for an additional half hour. The precursor dispersion is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-13

ZnO via Post-Processing 200 g of ZnC$_2$O$_4$ is put into aluminum trays, which are then loaded into a convection oven. Under flowing air, the furnace is ramped 10° C./min to 300° C., held for 3 hrs, then cooled to room temperature.

Example Z-14

ZnO via Post-Processing 200 g of ZnC$_2$O$_4$ is put into aluminum trays, which are then loaded into a convection oven. Under flowing air, the furnace is ramped 10° C./min to 500° C., held for 3 hrs, then cooled to room temperature.

Example Z-15

ZnO, 15% Al$_2$O$_3$; 500 g Batch 1.5 kg of Zn(NO$_3$)$_2$.4H$_2$O is dissolved in 2 kg de-ionized water, and 550 g of Al(NO$_3$)$_3$.9H$_2$O into 0.9 kg of water. The Al(NO$_3$)$_3$ solution is added to the Zn(NO$_3$)$_2$.4H$_2$O solution while shearing. The resulting 10 wt. % solids precursor solution is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-16

ZnO, 15% Al$_2$O$_3$ via Post-Processing 500 g of ZnO, 15% Al$_2$O$_3$ is put into aluminum trays, which are then loaded into a convection oven. Under flowing air, the furnace is ramped 10° C./min to 300° C., held for 3 hrs, then cooled to room temperature.

Example Z-17

ZnO, 15% Al$_2$O$_3$; 500 g Batch 1.5 kg of Zn(NO$_3$)$_2$.4H$_2$O is dissolved in 3 kg de-ionized water. 375 g of an alumina dispersion (DISPAL 23N4-20, a 20% boehmite alumina dispersion in water available from Sasol, North America) is sheared into the Zn(NO$_3$)$_2$.4H$_2$O solution. The resulting 10 wt. % solids precursor solution is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-18

ZnO, 15% Al$_2$O$_3$ via Post-Processing 400 g of ZnO, 15% Al$_2$O$_3$ is put into aluminum trays, which are then loaded into a convection oven. Under flowing air, the furnace is ramped 10° C./min to 300° C., held for 3 hrs, then cooled to room temperature.

Example Z-19

ZnO, 15% Al$_2$O$_3$; 500 g Batch 1.1 kg of Zn(C$_2$H$_3$O$_2$)$_2$ is dissolved in 3.5 kg de-ionized water. 375 g of DISPAL 23N4-20 is sheared into the Zn(C$_2$H$_3$O$_2$)$_2$ solution. The resulting 10 wt. % solids precursor solution is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-20

ZnO, 15% Al$_2$O$_3$, 20% NH$_4$NO$_3$; 500 g Batch 1.1 kg of Zn(C$_2$H$_3$O$_2$)$_2$ is dissolved in 3 kg de-ionized water and 10 g of NH$_4$NO$_3$ in 400 g of water. The NH$_4$NO$_3$ solution is added to the Zn(C$_2$H$_3$O$_2$)$_2$ solution, then 375 g of DISPAL 23N4-20 is sheared in. The resulting 10 wt. % solids precursor solution is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-21

ZnO, 5% SiO$_2$; 500 g Batch 1.7 kg of Zn(NO$_3$)$_2$.4H$_2$O is dissolved in 3.1 kg de-ionized water. 145 g of a silica dispersion (CABOSPERSE A2095, a fumed SiO$_2$ available from Cabot Corp., Boston, Mass.) is sheared into the Zn(NO$_3$)$_2$.4H$_2$O solution. The resulting 10 wt. % solids precursor solution is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-22

ZnO, 5% SiO$_2$ via Post-Processing 400 g of ZnO, 5% SiO$_2$ is put into aluminum trays, which are then loaded into a convection oven. Under flowing air, the furnace is ramped 10° C./min to 300° C., held for 3 hrs, then cooled to room temperature.

Example Z-23

ZnO, 10% Al$_2$O$_3$, 5% SiO$_2$; 500 g Batch 1.5 kg of Zn(NO$_3$)$_2$.4H$_2$O is dissolved in 3.1 kg de-ionized water. 145 g of CABOSPERSE A2095 and 250 g of DISPAL 23N4-20 is sheared into the Zn(NO$_3$)$_2$.4H$_2$O solution. The resulting 10 wt. % solids precursor solution is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-24

ZnO, 10% $Al_2O_3$, 5% $SiO_2$ via Post-Processing 400 g of ZnO, 5% $SiO_2$ is put into aluminum trays, which are then loaded into a convection oven. Under flowing air, the furnace is ramped 10° C./min to 300° C., held for 3 hrs, then cooled to room temperature.

Example Z-25

ZnO:$Al_2O_3$:MgO (80:10:10); 500 g Batch 1.1 kg of $Zn(C_2H_3O_2)_2$ is dissolved in 1 kg de-ionized water, 370 g of $Al(NO_3)_3 \cdot 9H_2O$ in 1 kg of water, and 320 g of $Mg(NO_3)_2 \cdot 6H_2O$ in 1 kg of water. The $Al(NO_3)_3$ solution is added to the $Zn(C_2H_3O_2)_2$ solution while shearing, followed by adding the $Mg(NO_3)_2$ solution. The resulting 10 wt. % solids precursor solution is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-26

ZnO:$Al_2O_3$:MgO (80:10:10) via Post-Processing 200 g of ZnO:$Al_2O_3$:MgO is put into aluminum trays, which are then loaded into a convection oven. Under flowing air, the furnace is ramped 10° C./min to 300° C., held for 3 hrs, then cooled to room temperature.

Example Z-27

ZnO:$Al_2O_3$:MgO (80:10:10) via Post-Processing 200 g of ZnO:$Al_2O_3$:MgO is put into aluminum trays, which are then loaded into a convection oven. Under flowing air, the furnace is ramped 10° C./min to 300° C., held for 3 hrs, then cooled to room temperature.

Example Z-28

ZnO:CaO:MgO (90:5:5); 500 g Batch 1.2 kg of $Zn(C_2H_3O_2)_2$ is dissolved in 1 kg de-ionized water, 105 g of $Ca(NO_3)_3 4H_2O$ in 1 kg of water, and 160 g of $Mg(NO_3)_2 \cdot 6H_2O$ in 1 kg of water. The $Ca(NO_3)_3$ solution is added to the $Zn(C_2H_3O_2)_2$ solution while shearing, followed by the $Mg(NO_3)_2$. The resulting 10 wt. % solids precursor solution is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-29

ZnO:CaO:MgO (90:5:5) via Post-Processing 175 g of ZnO:CaO:MgO is put into aluminum trays, which are then loaded into a convection oven. Under flowing air, the furnace is ramped 10° C./min to 300° C., held for 3 hrs, then cooled to room temperature.

Example Z-30

ZnO:CaO:MgO (90:5:5) via Post-Processing 175 g of ZnO:CaO:MgO is put into aluminum trays, which are then loaded into a convection oven. Under flowing air, the furnace is ramped 10° C./min to 500° C., held for 3 hrs, then cooled to room temperature.

Example Z-31

ZnO:NiO (92.5:7.5); 500 g Batch 1.2 kg of $Zn(C_2H_3O_2)_2$ is dissolved in 2.6 kg de-ionized water and 145 g of $Ni(NO_3)_2$ (Ni-nitrate) in 1 kg of water. The $Ni(NO_3)_2$ solution is added to the $Zn(C_2H_3O_2)_2$ solution while shearing. The resulting 10 wt. % solids precursor solution is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-32

ZnO:NiO (92.5:7.5) via Post-Processing 200 g of ZnO:NiO is put into aluminum trays, which are then loaded into a convection oven. Under flowing air, the furnace is ramped 10° C./min to 300° C., held for 3 hrs, then cooled to room temperature.

Example Z-33

ZnO:MgO:NiO (82.5:10:7.5); 500 g Batch 1.1 kg of $Zn(C_2H_3O_2)_2$ is dissolved in 1.4 kg de-ionized water, 145 g of $Ni(NO_3)_2$ in 1 kg of water, and 315 g $Mg(NO_3)_2$ in 1 kg water. The $Mg(NO_3)_2$ solution is added to the $Zn(C_2H_3O_2)_2$ solution while shearing followed by the $Ni(NO_3)_2$ solution. The resulting 10 wt. % solids precursor solution is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-34

ZnO:MgO:NiO (82.5:10:7.5); 500 g Batch 1.1 kg of $Zn(C_2H_3O_2)_2$ is dissolved in 1.4 kg de-ionized water, 125 g of $Ni(C_2H_3O_2)_2$ (Ni-acetate) in 1 kg of water, and 315 g $Mg(NO_3)_2$ in 1 kg water. The $Mg(NO_3)_2$ solution is added to the $Zn(C_2H_3O_2)_2$ solution while shearing followed by the $Ni(C_2H_3O_2)_2$ solution. The resulting 10 wt. % solids precursor solution is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-35

ZnO:CuO (92.5:7.5); 500 g Batch 1.2 kg of $Zn(C_2H_3O_2)_2$ is dissolved in 2.6 kg de-ionized water and 110 g of $Cu(NO_3)_2$ in 1 kg of water. The $Cu(NO_3)_2$ solution is added to the $Zn(C_2H_3O_2)_2$ solution while shearing. The resulting 10 wt. % solids precursor solution is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Example Z-36

ZnO:MgO:CuO (82.5:10:7.5); 500 g Batch 1.1 kg of $Zn(C_2H_3O_2)_2$ is dissolved in 1.4 kg de-ionized water, 125 g of $Cu(NO_3)_2$ in 1 kg of water, and 315 g $Mg(NO_3)_2$ in 1 kg water. The $Mg(NO_3)_2$ solution is added to the $Zn(C_2H_3O_2)_2$ solution while shearing followed by the $Cu(NO_3)_2$ solution. The resulting 10 wt. % solids precursor solution is fed into a mixed flow spray dryer at a liquid feed rate to maintain inlet/outlet temperatures of 975/580° F., using a two-fluid nozzle with an air pressure of 65 psig. The residence time of the system is 10 seconds as defined above. The powder is collected using a cyclone.

Zn-Based Examples—Characterization

Table 7 summarizes various ZnO examples fabricated by spray drying Zn-nitrate precursors under different processing conditions, as shown in Table 8. The details for the preparation of Examples Z-1 and Z-2 are given above.

TABLE 7

| Example | Composition | Precursor | Inlet Temp (° F.) | Post-Processing Conditions |
|---|---|---|---|---|
| Z-1 | ZnO | Zn-nitrate | 975 | N/A |
| Z-2 | ZnO | Z-1 | | 300° C., 3 h |
| Z-37 | ZnO | Zn-nitrate | 975 | N/A |
| Z-38 | ZnO | Z-37 | | 300° C., 3 h |
| Z-39 | ZnO | Zn-nitrate | 975 | N/A |
| Z-40 | ZnO | Z-39 | | 300° C., 3 h |
| Z-41 | ZnO | Zn-nitrate | 975 | N/A |
| Z-42 | ZnO | Z-41 | | 300° C., 3 h |

TABLE 8

| Example | N Pressure (psig/CFM) | Fan Speed (Hz/amp) | Solid Weight (%) | Running Time |
|---|---|---|---|---|
| Z-37 | 80 | 60 | 5 | 38:50:00 |
| Z-39 | 80 | 45 | 5 | 53:20:00 |
| Z-41 | 45 | 60 | 10 | 34:00:00 |
| Z-2 | 65/5.9 | 60/3.00 | 10 | 2 |

Figure 14:
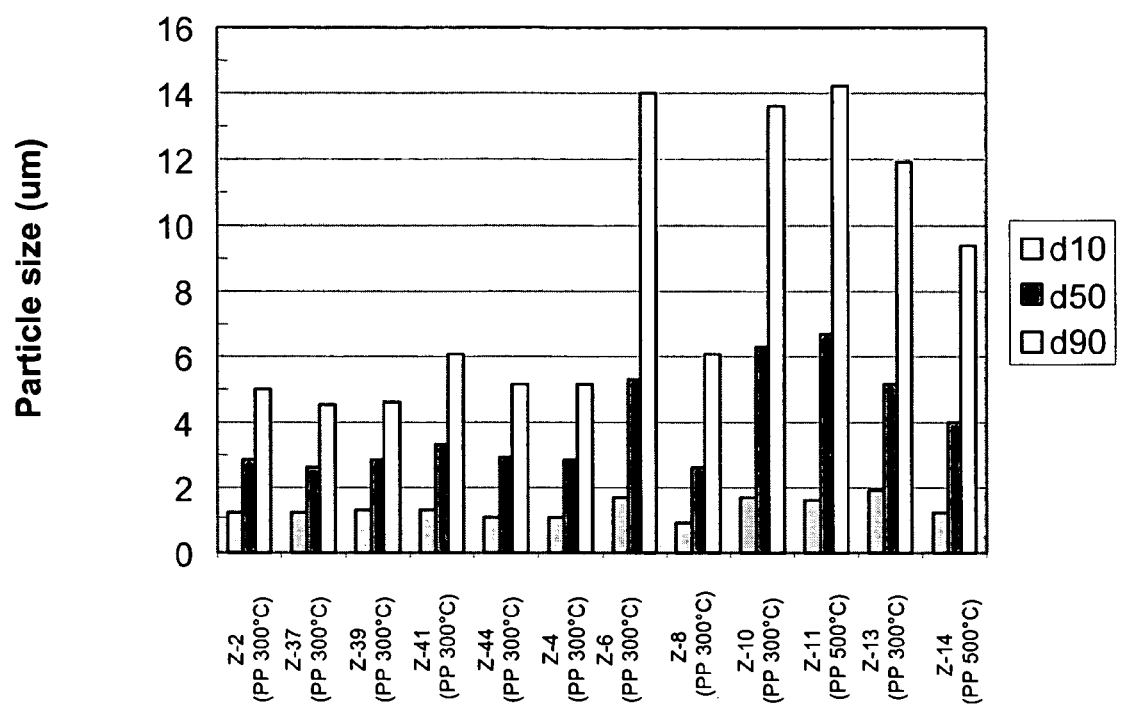
FIG. 14 illustrates the particle size distribution of Zn-based absorbent powders according to the present invention.

FIG. 14 illustrates the particle size distribution (PSD) for the Examples listed in Table 6. The PSDs are similar and the average particle size ($d_{50}$) for the spray dried samples is around 3 μm and the $d_{50}$ for the post-processed samples is around 6 μm.

Figure 15:
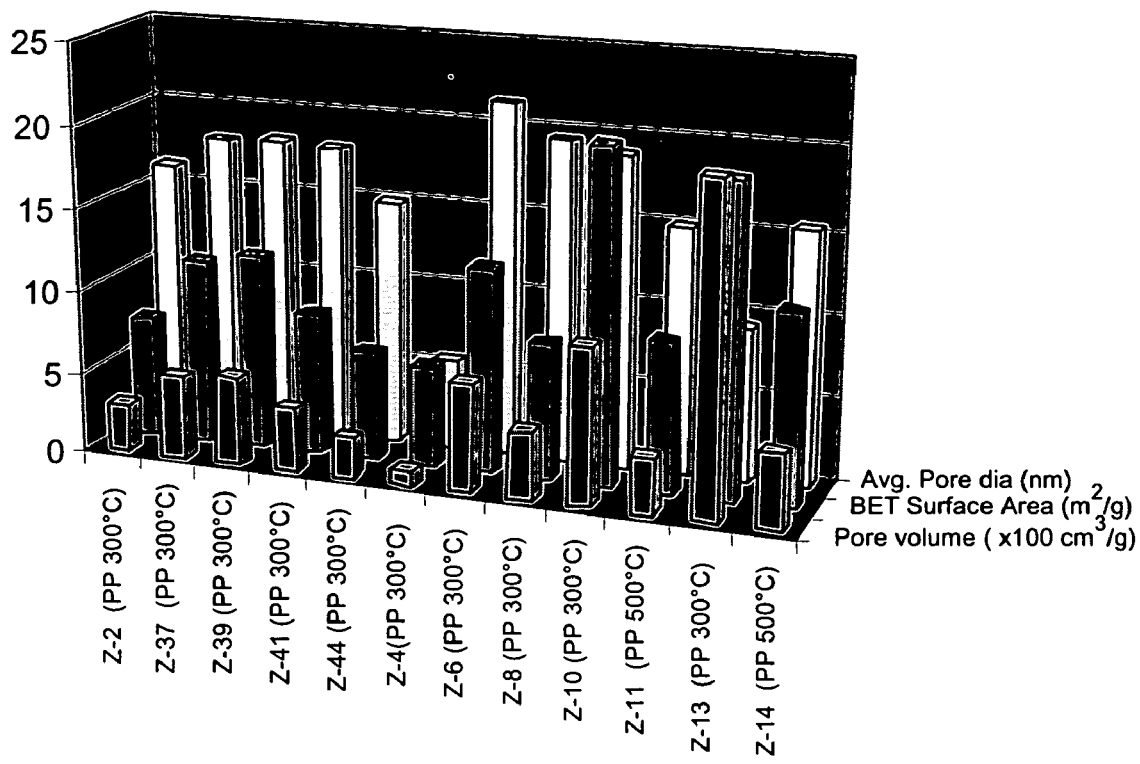
FIG. 15 illustrates the pore volume, BET surface area and pore diameter of Zn-based absorbent powders according to the present invention.

FIG. 15 illustrates a comparison of average pore diameter (nm) for pores less than 100 nm in diameter, BET surface area ($m^2/g$) and pore volume ($cm^3/g$). It can be seen that Z-37 and Z-39 have higher surface area, higher porosity and larger pore diameter than other samples.

Figure 16:
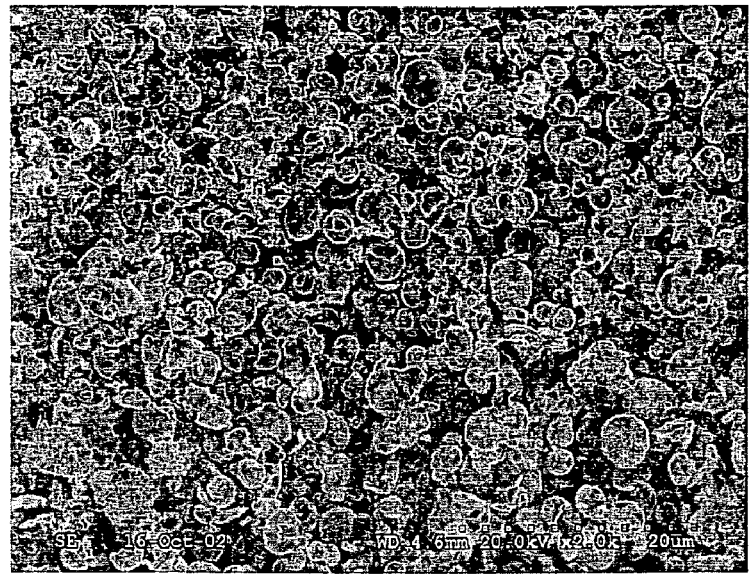
FIGS. 16(a) and 16(b) illustrate SEM photomicrographs for a Zn-oxide absorbent powder according to the present invention.
Figure 16:
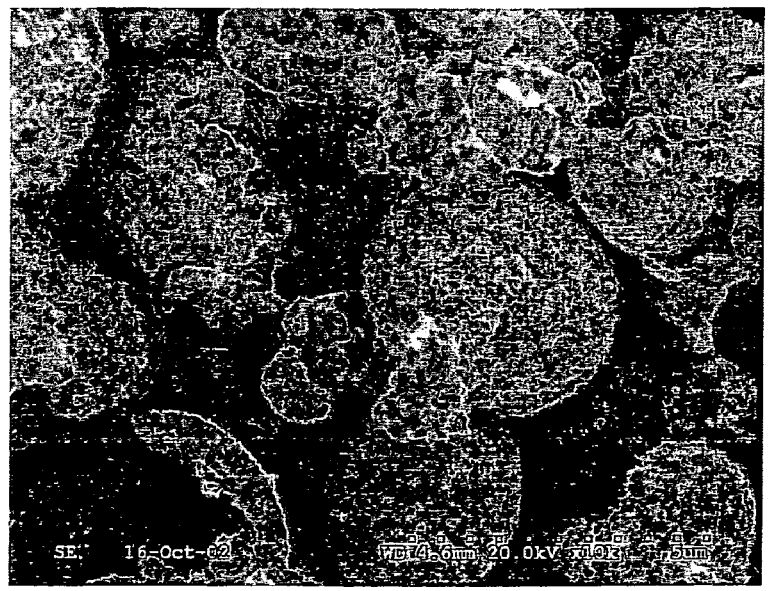

FIGS. 16(a) and 16(b) illustrate SEM photomicrographs of Example Z-39. It is generally agreed that when ZnO has a larger accessible surface area $H_2S$ removal will be improved, thus, these two samples could have better $H_2S$ removal capability such as higher sulfur removal capacity and lower sulfur slip point (i.e., the point of absorbent failure in the reactor bed). In addition, since the accessible surface area is a function of not only the BET surface area but also to the average pore size, it is likely that these samples have a more advantageous structure as sulfur absorbents.

Table 9 summarizes ZnO samples made by spray drying Zn-nitrate and $NH_4$-nitrate as precursors followed by the post processing at 300° C. Between them, Z-43 is made with 5 wt. % $NH_4$-nitrate while Z-3 is made with 20 wt. % of $NH_4$-nitrate. Their corresponding post-processed samples, Z44 and Z4, have similar particle size distributions (FIG. 14, $d_{50}$~3 μm) and BET surface area (6.1~6.7 $m^2/g$), but the average pore size and pore volumes are different, the former having much higher average pore size than the latter (FIG. 15).

TABLE 9

| Example | Composition | Precursor | Inlet Temp. (° F.) | Post-Processing Conditions |
|---|---|---|---|---|
| Z-43 | ZnO (5% $NH_4$-nitrate) | Zn-nitrate | 975 | N/A |
| Z-44 | ZnO (5% $NH_4$-nitrate) | Z-43 | | 300° C., 3 h |
| Z-3 | ZnO (20% $NH_4$-nitrate) | Zn-nitrate | 975 | N/A |
| Z-4 | ZnO (20% $NH_4$-nitrate) | Z-3 | | 300° C., 3 h |

The sample prepared with 20 wt. % $NH_4$-nitrate has smaller average pore size (5.5 nm) and pore volume (0.008 $cm^3/g$) as compared to the sample fabricated from 5% $NH_4$-nitrate (14.9 nm vs 0.025 $cm^3/g$).

Figure 17:
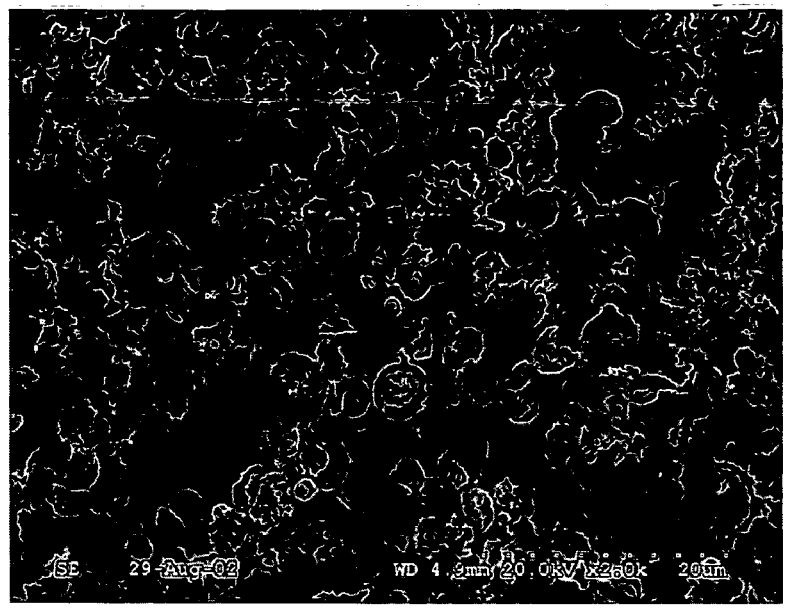
FIGS. 17(a) and 17(b) illustrate SEM photomicrographs for a Zn-oxide absorbent powder according to the present invention.
Figure 17:
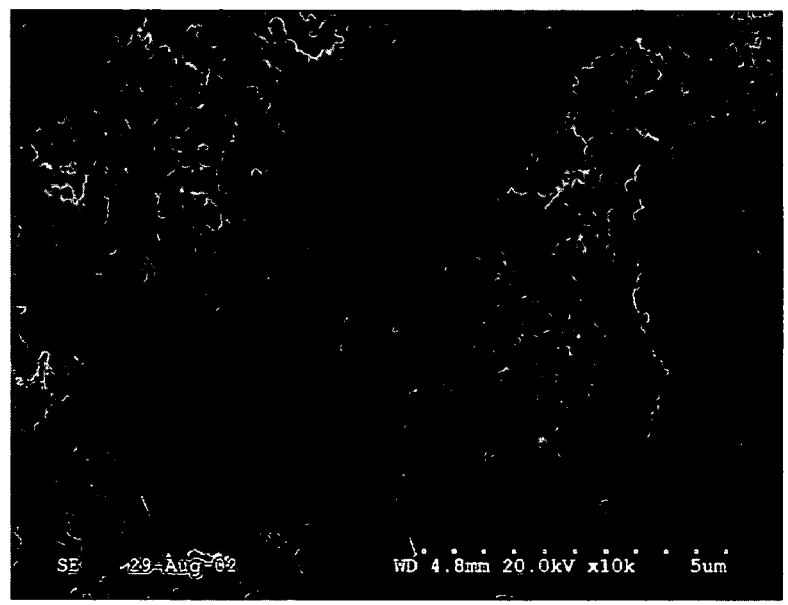

FIGS. 17(a) and 17(b) illustrate SEM photomicrographs for Example Z44. By selectively controlling the type and concentration of precursor additives, the pore properties of ZnO can be selectively tailored. For $H_2S$ removal, the smaller pores (<5 nm) can be easily plugged during the early stage of sulfurization of ZnO with $H_2S$, leaving the rest of ZnO internal surface inaccessible to $H_2S$ and resulting in low absorption capacity.

Table 10 summarizes ZnO samples fabricated by spray drying with $NH_4$-oxalate and $NH_4$-carbonate as precursors, followed by post processing at different temperatures. After post-processing at 300° C., the sample from the oxalate precursor is only partially converted to ZnO.

TABLE 10

| Example | Composition | Precursor | Inlet Temp. (° F.) | Post-Processing Conditions |
|---|---|---|---|---|
| Z-5 | ZnO/partial $ZnC_2O_4$ | $Zn(NO_3)/NH_4(C_2O_4)$ | 975 | N/A |
| Z-6 | $ZnC_2O_4$/little ZnO | Z-6 | | 300° C., 3 h |
| Z-12 | $ZnC_2O_4$/little ZnO | $Zn(OAc)/NH4)2C_2O_4$ | 975 | N/A |
| Z-13 | ZnO/partial $ZnC_2O_4$ | Z-12 | | 300° C., 3 h |
| Z-14 | ZnO | Z-12 | | 500° C., 3 h |

TABLE 10-continued

| Example | Composition | Precursor | Inlet Temp. (° F.) | Post-Processing Conditions |
|---|---|---|---|---|
| Z-7 | ZnO (Partial conv. carbonate) | Zn(NO₃)/NH₄(CO₃) | 975 | N/A |
| Z-8 | ZnO (Partial conv. carbonate) | Z-7 | | 300° C., 3 h |

Figure 18:
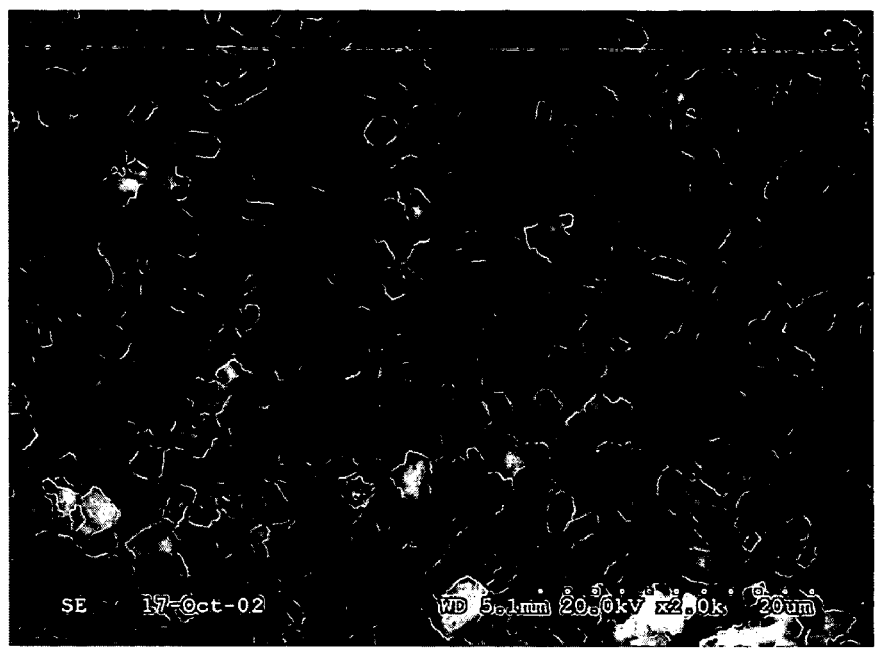
FIGS. 18(a) and 18(b) illustrate SEM photomicrographs of a Zn-based powder according to the present invention.
Figure 18:
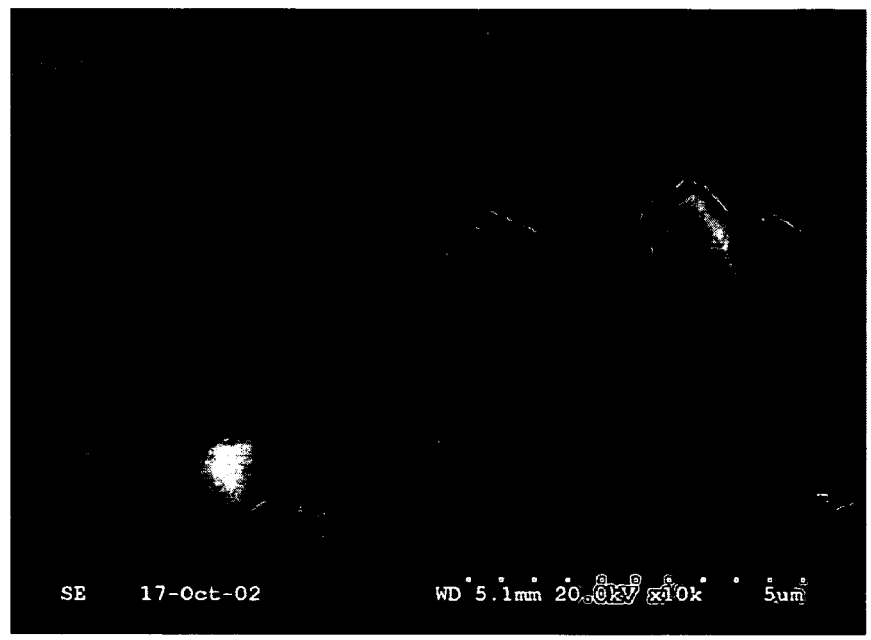

However, post-processing the oxalate at 500° C. can completely convert the powder into ZnO. From the PSD shown in FIG. 14, it can be seen that the partially converted ZnO has a larger particle size ($d_{50}$ of about 5 to 7 μm) than pure ZnO made by spray drying. The lower post processing treatment preserves the sample porosity to a higher extent—up to 20 nm average pore size for Example Z-6. FIGS. 18(a) and 18(b) illustrate SEM photomicrographs of Example Z-6.

Table 11 summarizes ZnO samples made by spray drying precursors including Zn-acetate and lactic acid, including post-processing at 300° C. and 500° C. The powder maintains a similar PSD ($d_{50}$ of about 6 μm), even after it is post processed at 500° C. However, the porosity is quite different, as shown in FIG. 15. Post-processing at relatively low temperatures (300° C.) preserves the higher surface area, pore volume and average pore diameter.

TABLE 11

| Example | Composition | Precursor | Inlet Temp. (° F.) | Post-Processing Conditions |
|---|---|---|---|---|
| Z-9 | ZnO | Zn(OAc)/ lactic acid | 975 | N/A |
| Z-10 | ZnO | Z-9 | | 300° C., 3 h |
| Z-11 | ZnO | Z-9 | | 500° C., 3 h |

Al₂O₃/ZnO Samples

Table 12 summarizes ZnO samples with different Al₂O₃ content and utilizing Al₂O₃ from different sources and the samples obtained by post-processing at different temperatures. Details of the synthesis of Examples Z-15, Z-16, Z-17, Z-18, Z-19 and Z-20 are given above.

TABLE 12

| Example | Composition | Precursor | Inlet Temp. (° F.) | Post-Processing Conditions |
|---|---|---|---|---|
| Z-45 | ZnO (5% Al₂O₃) | Zn(OAC)/ AlNO₃ | 975 | N/A |
| Z-46 | ZnO (5% Al₂O₃) | Z-45 | | 300° C., 3 hr |
| Z-47 | ZnO (5% Al₂O₃) | Z-45 | | 300° C., 3 hr |
| Z-15 | ZnO (15% Al₂O₃) | Zn-nitrate/ Al(NO₃) | 975 | N/A |
| Z-16 | ZnO (15% Al₂O₃) | Z-15 | | 300° C., 3 hr |
| Z-17 | ZnO (15% Al₂O₃) | Zn-nitrate/ Al₂O₃ | 975 | N/A |
| Z-18 | ZnO (15% Al₂O₃) | Z-17 | | 300° C., 3 hr |
| Z-48 | ZnO (15% Al₂O₃) | Zn(NO₃)/α- Al₂O₃ | 975 | N/A |
| Z-49 | ZnO (15% Al₂O₃) | Z-48 | | 300° C., 3 hr |
| Z-19 | ZnO (15% Al₂O₃) | Zn(OAc)/Al₂O₃ | 975 | N/A |
| Z-20 | ZnO (15% Al₂O₃) | Zn(OAc)/Al₂O₃/ NH₄NO₃ | 975 | N/A |
| Z-50 | ZnO (25% Al₂O₃) | Zn-nitrate/ Al₂O₃ | 975 | N/A |
| Z-51 | ZnO (25% Al₂O₃) | Z-50 | | 300° C., 3 hr |

The addition of alumina into Example Z-45 and Z-15 is by the use of Al-nitrate in the precursor solution, while the alumina in Examples Z-17, Z-49, Z-23 and Z-50 is formed from an alumina dispersion.

Figure 19:
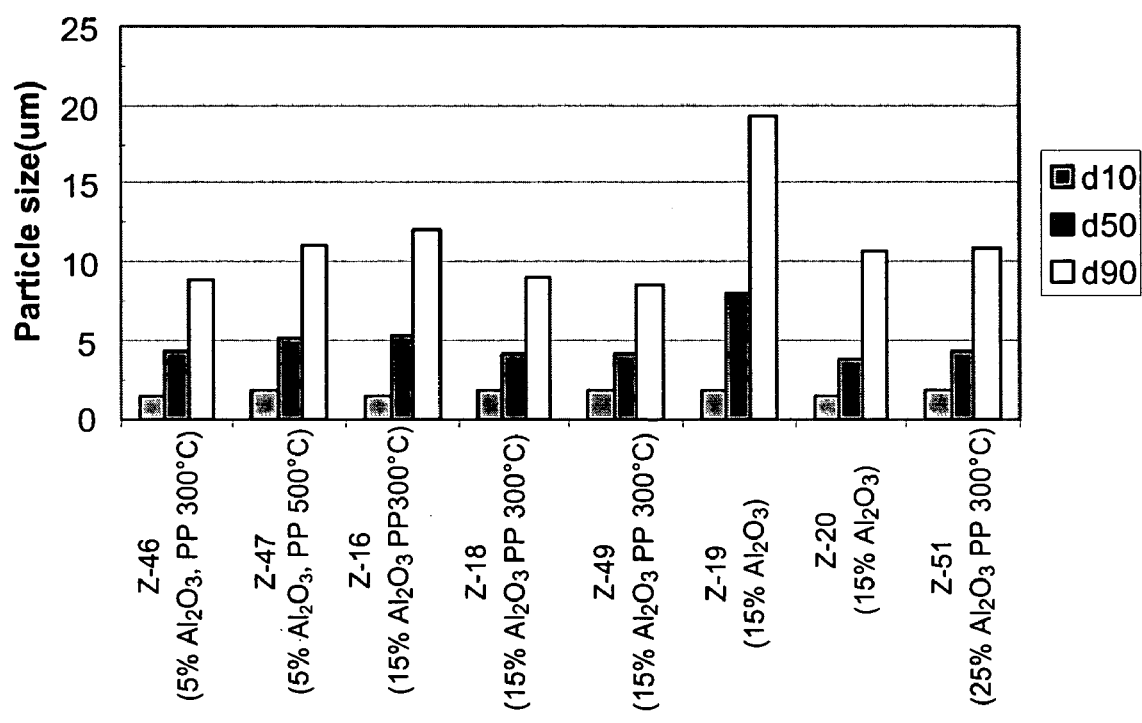
FIG. 19 illustrates the particle size distribution of Zn-based absorbent powders according to the present invention.
Figure 20:
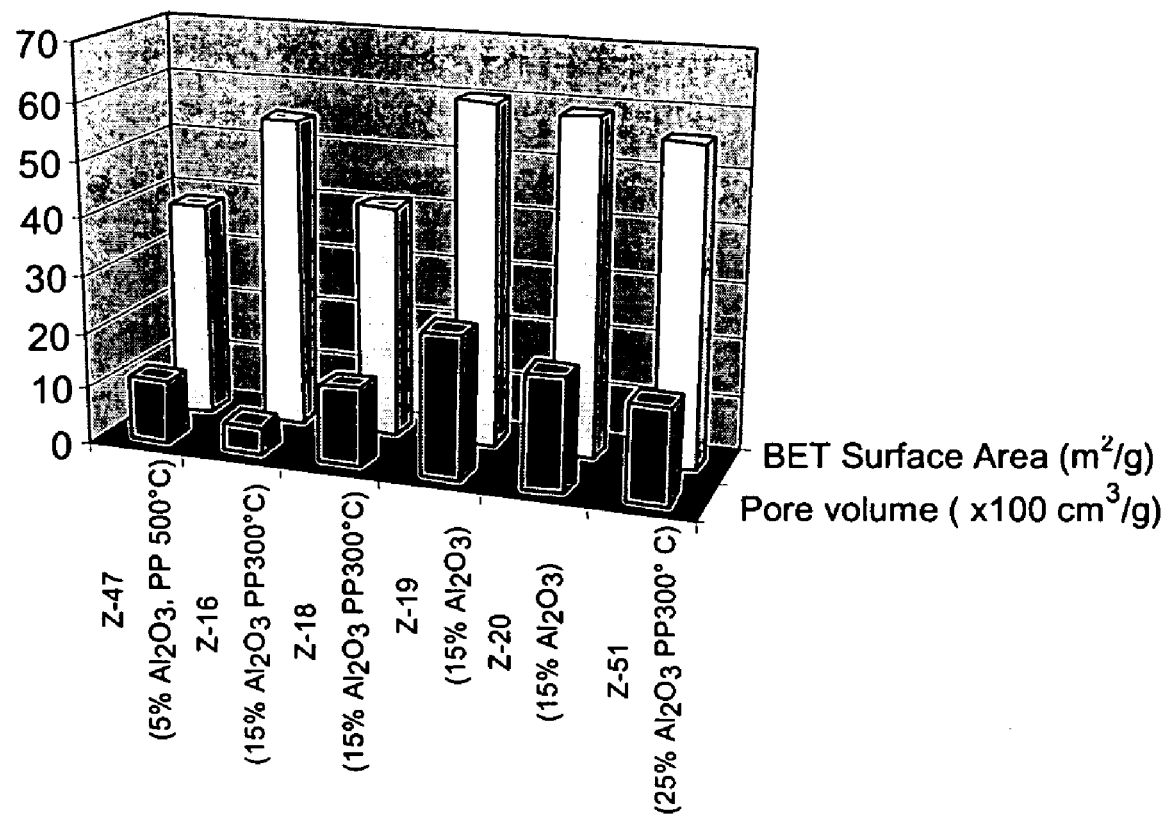
FIG. 20 illustrates the pore volume and BET surface area of Zn-based absorbent powders according to the present invention.
Figure 21:
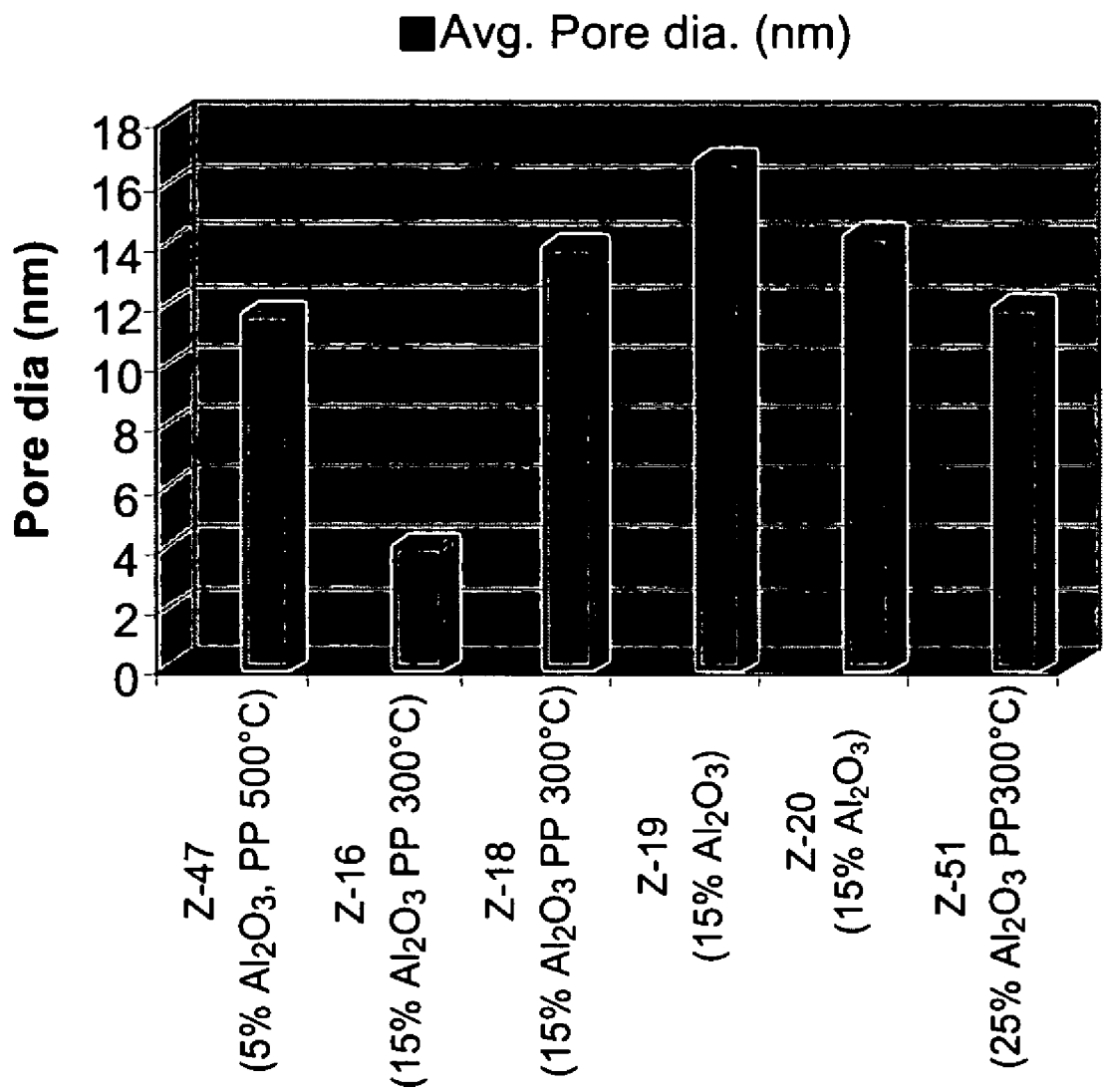
FIG. 21 illustrates the average pore diameter for Zn-based absorbent powders according to the present invention.

The characterization data shown in FIG. 19 (particle size distribution), FIG. 20 (BET and pore volume) and FIG. 21 (average pore diameter) illustrates that the major difference between the examples is the average pore diameter. The example made from Al-nitrate has higher BET surface area, but the average pore diameter is less than 5 nm, which is much smaller than the Example fabricated using particulate Al₂O₃. The smaller average pore diameter can be more easily plugged during the early stage of H₂S removal, leaving the rest of surface inaccessible to H₂S.

SiO₂/ZnO and ZnO Containing Al₂O₃ and SiO₂

Table 13 summarizes ZnO samples containing SiO₂ and Al₂O₃ and their post processing conditions. Typical fabrication parameters are given above for Example Z-22.

TABLE 13

| Example | Composition | Precursor | Inlet Temp. (° F.) | Post-Processing Conditions |
|---|---|---|---|---|
| Z-21 | ZnO (5% SiO₂) | Zn(NO₃).SiO₂ | 975 | N/A |
| Z-22 | ZnO (5% SiO₂) | Z-21 | | 300° C. 3 h |
| Z-52 | ZnO (15% SiO₂) | Zn(NO₃).SiO₂ | 975 | N/A |
| Z-53 | ZnO (15% SiO₂) | Z-52 | | 300° C., 3 h |
| Z-23 | ZnO (10% Al₂O₃, 5% SiO₂) | Zn-nitrate/ Al₂O₃/SiO₂ | 975 | N/A |
| Z-24 | ZnO (10% Al₂O₃, 5% SiO₂) | Z-23 | | 300° C., 3 h |

Figure 22:
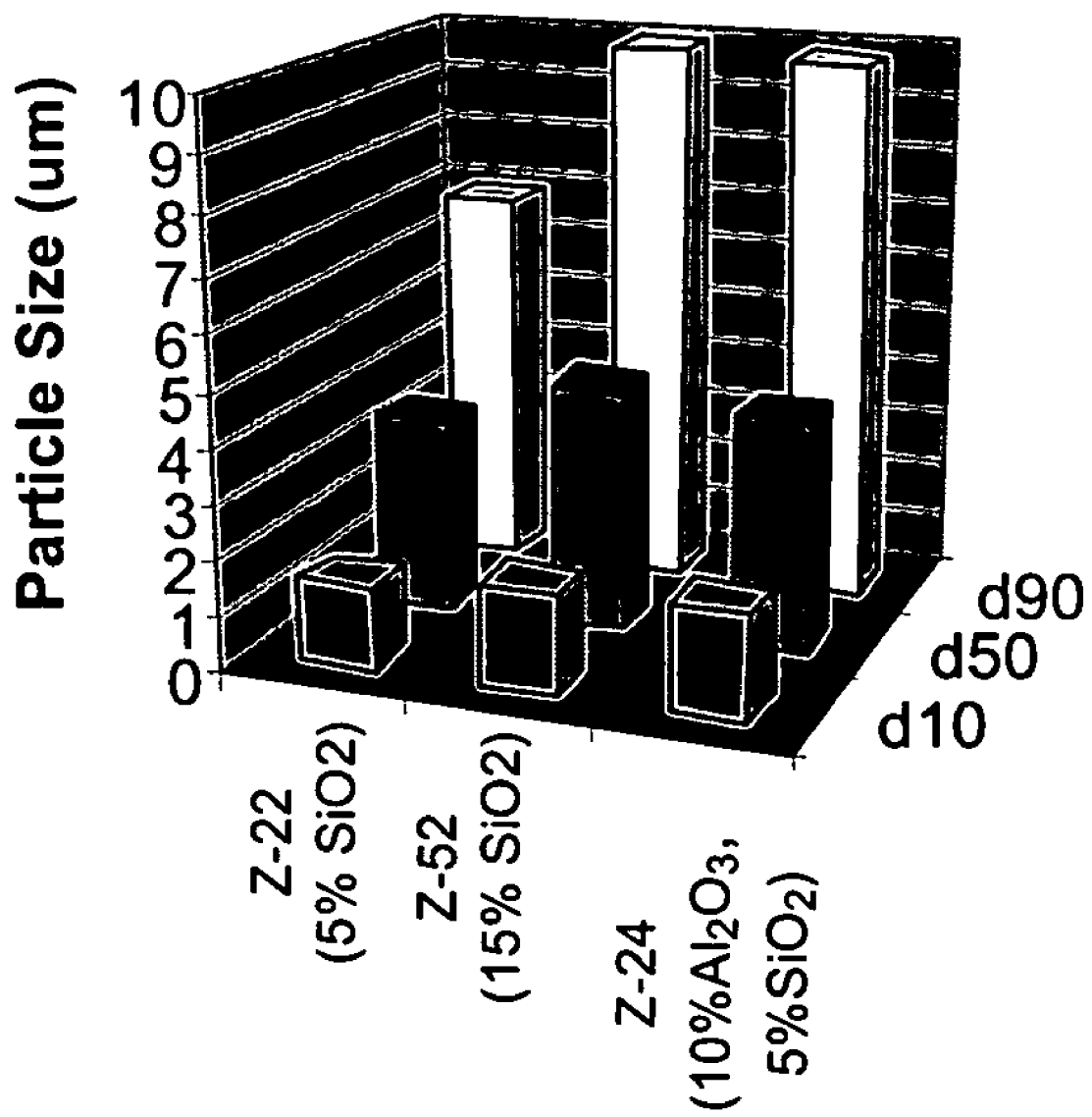
FIG. 22 illustrates the particle size distribution for Zn-based composite absorbent powders according to the present invention.
Figure 23:
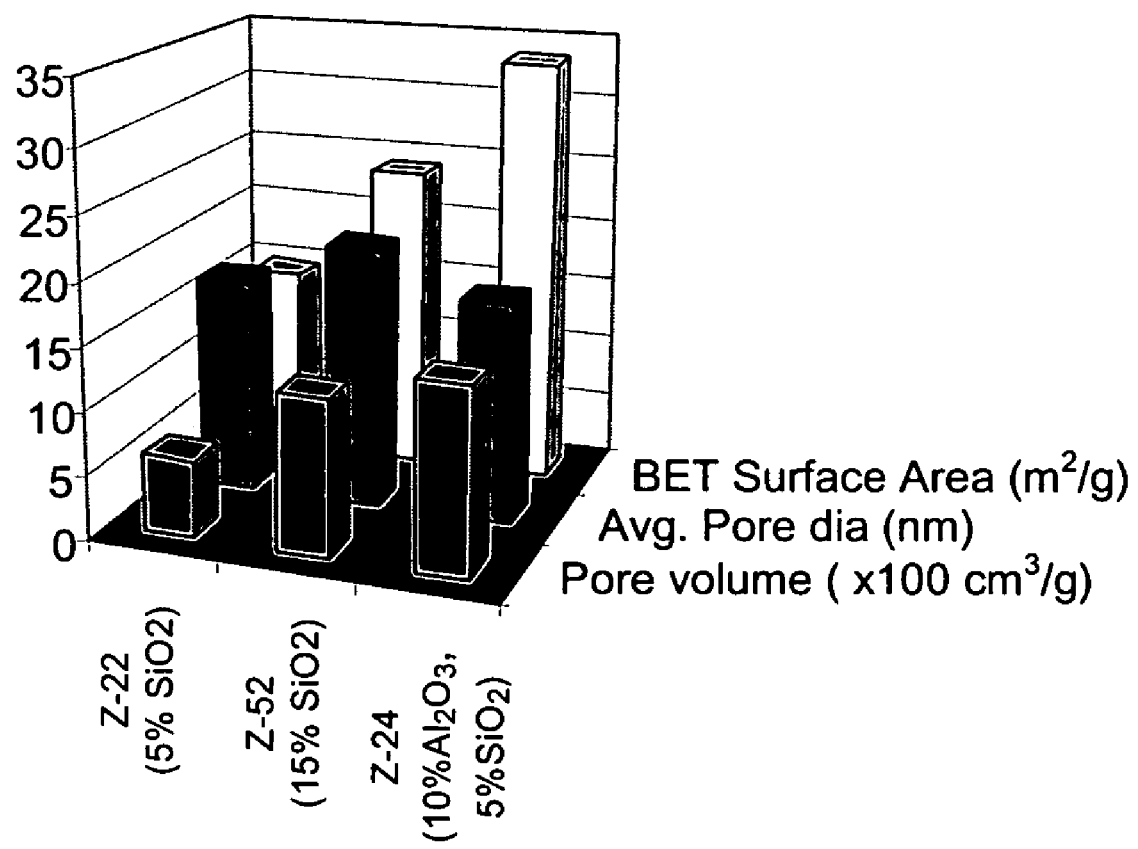
FIG. 23 illustrates the pore volume, average pore diameter and BET surface area of Zn-based composite absorbent powders according to the present invention.

FIGS. 22 and 23 compare the PSD (FIG. 22) and the pore volume, BET surface area and average pore diameter (FIG. 23). The samples have similar physicochemical properties.

Cycling of Absorbents

Figure 24:
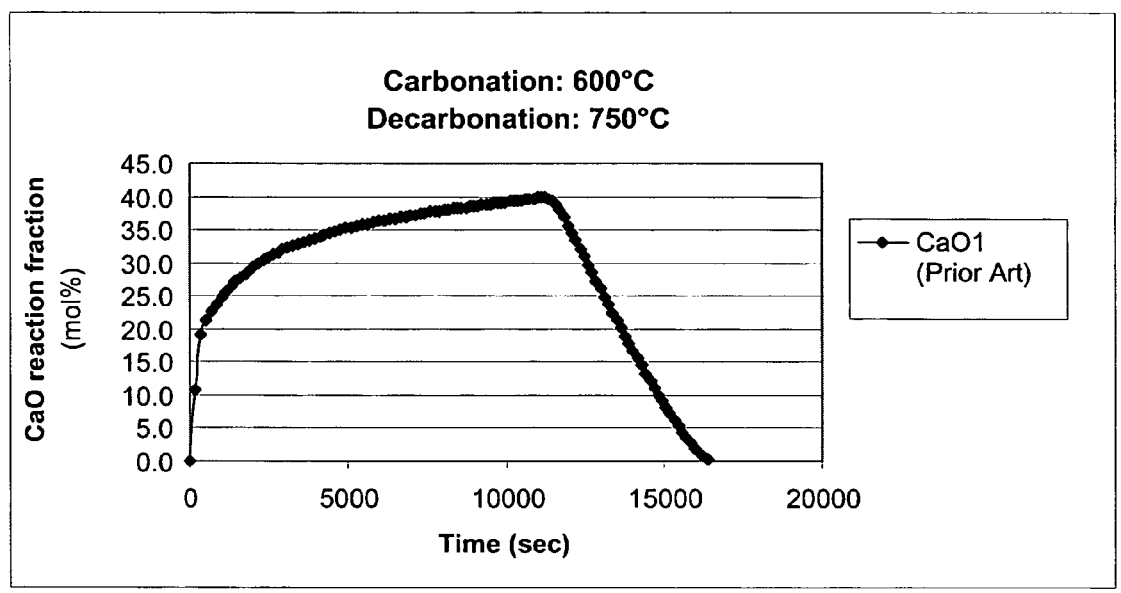
FIG. 24 illustrates the carbonation and decarbonation kinetics of a commercial CaO powder according to the prior art.

FIG. 24 illustrates the carbonation and decarbonation kinetics of CO₂ using commercially available CaO (J.T.

Baker) as measured by thermogravimetric analysis (TGA). FIG. 24 illustrates that the carbonation of CaO is divided into two distinct regions, the fast region and the slow region. The fast region (less than 800 seconds) corresponds to the easily accessible CaO active sites present on the external surface and the slow region (1000 to 10,000 seconds) corresponds to the penetration of $CO_2$ through the carbonate layer into unreacted CaO near the particle core. The portion of CaO reactivity and kinetics in these two regions depend on the material properties and operating conditions. Decarbonation takes place (>10,000 seconds) when the bed temperature is raised up to 750° C. or higher. FIG. 24 illustrates that the overall absorption capacity, expressed as a CaO reaction fraction is around 40 mol. % at a time of 10000 seconds. As used herein, the CaO reaction fraction is the ratio of CaO converted to $CaCO_3$ relative to the amount of available absorbent compound (e.g., CaO) in the absorbent material, usually expressed as a mol. %.

Based on this interpretation, for the standard sample measurements illustrated in FIG. 24, about 50% of the total absorption capacity is consumed by the available surface area of the absorbent, and the remaining 50% of the capacity requires a long reaction time. It is therefore advantageous to increase the absorbent available surface area to enable faster absorption. This is illustrated in more detail below.

Figure 25:
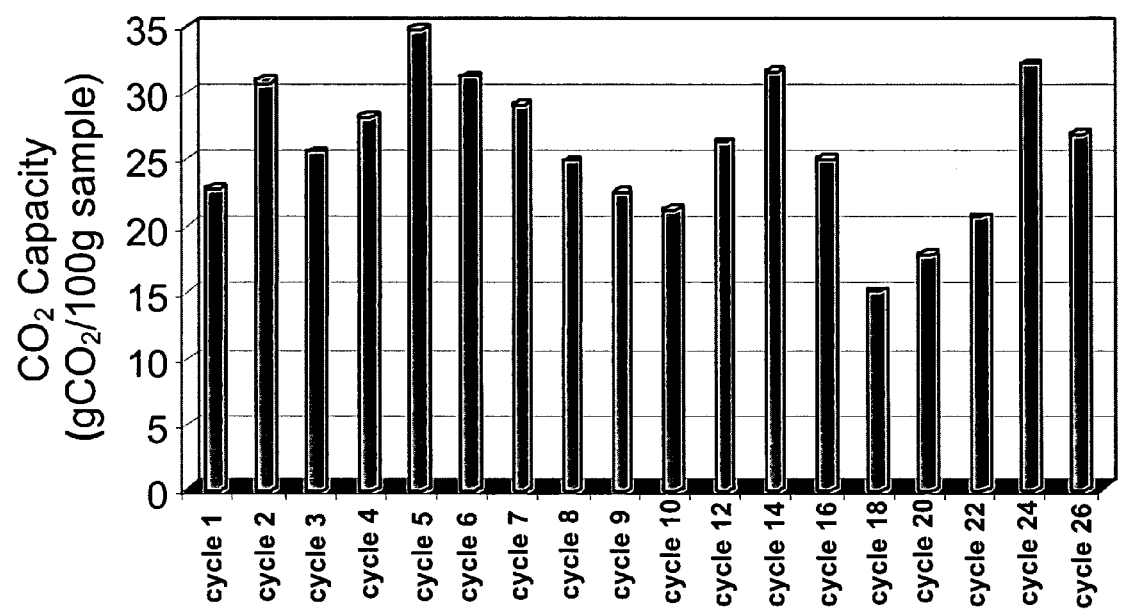
FIG. 25 $CO_2$ illustrates the absorption capacity of a commercial CaO absorbent powder over 26 cycles.

FIG. 25 illustrates the absorption performance of the commercial CaO sample over 26 cycles with the carbonation occurring at 600° C. and decarbonation occurring at 750° C.

For this example and the remaining examples herein, a cycle of absorbent-containing material includes heating the sample disposed in a crucible in a thermogravimetric analysis (TGA) unit to 750° C. or 800° C. at a rate of 10-20° C./min in the presence of $N_2$ until/the TGA baseline is stable. The crucibles are then cooled down to 7401t/he carbonation temperature (600° C.), and pure $CO_2$ is introduced into the /*/chamber. Once the stable baseline is reached, decarbonation starts by switching the gas to $N_2$ and raising the temperature to 750° C. or 800° C. The weight loss of the absorbent is then recorded as a function of time until a stable weight is reached and the sample is then cooled down to room temperature. All carbonation takes place at 600° C., and the sample pre-treatment and decarbonation temperature are kept the same.

Referring to FIG. 25, the initial absorption capacity of the commercial CaO is about 22 g $CO_2$/100 g of sample and the peak absorption capacity is about 35 g $CO_2$/100 g of sample (Cycle 5). It is noteworthy that the absorption capacity fluctuates from about 15 g to 35 g $CO_2$/100 g of sample. Such fluctuations in absorption capacity are undesirable for commercial operations since the device must then be designed to accommodate the lowest capacity (e.g., to accommodate 15 g $CO_2$/100 g for the sample illustrated in FIG. 25).

Figure 26:
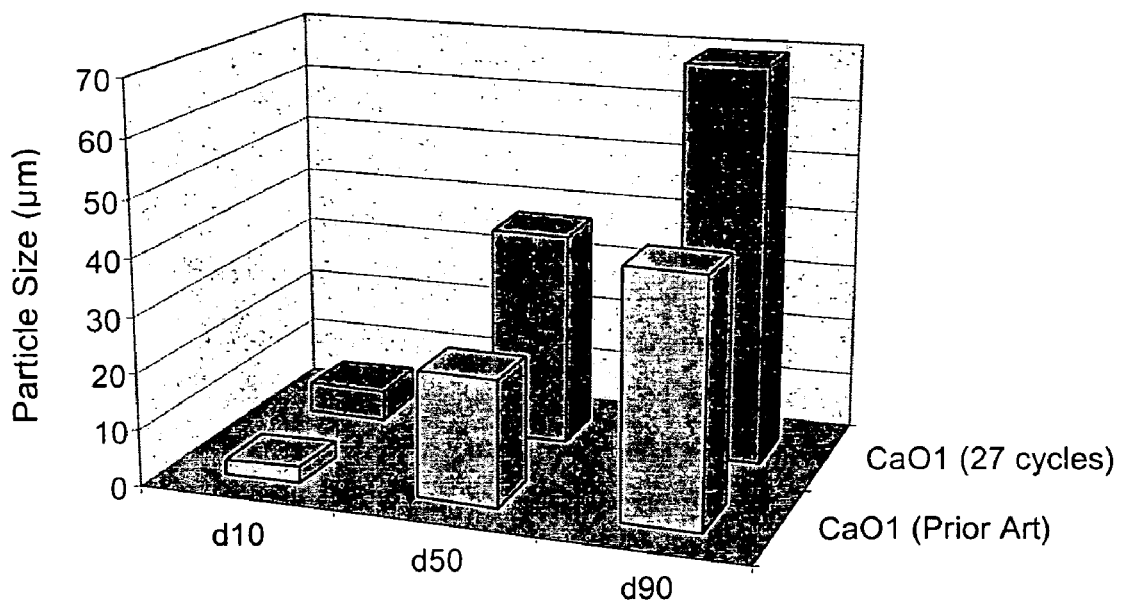
FIG. 26 illustrates the particle size distribution of a commercial CaO absorbent powder before and after 27 cycles.
Figure 27:
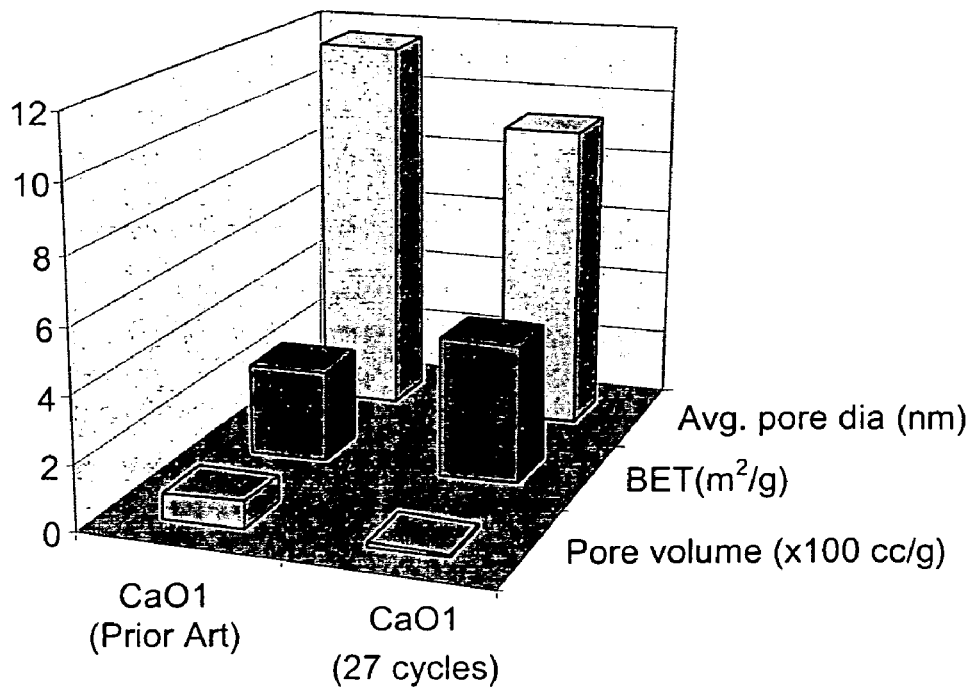
FIG. 27 illustrates the pore volume, BET surface area and average pore size of a commercial CaO absorbent powder before and after 27 cycles.

FIGS. 26 and 27 illustrate the change in particle size distribution ($d_{10}$, $d_{50}$ and $d_{90}$), pore volume (for pores <100 nanometers), BET surface area and pore diameter for the commercial CaO powder after 27 cycles. It is evident that sintering of the powder has occurred, resulting in a significant increase in average particle size (FIG. 26). The pore volume and average pore diameter decreased slightly and the BET surface area increased slightly (FIG. 27).

Table 14 summarizes the change in BET surface area, pore volume and pore diameter after cycling select absorbent materials according to the present invention 12 times.

TABLE 14

| | As-Made | | | After 12 Cycles | | |
|---|---|---|---|---|---|---|
| Example | BET ($m^2/g$) | Pore Volume ($cm^3/g$) | Average Pore Diameter (nm) | BET ($m^2/g$) | Pore Volume ($cm^3/g$) | Average Pore Diameter (nm) |
| A-7 | 60.1 | 0.242 | 16.1 | 12.37 | 0.0612 | 19.5 |
| A-18 | 61.7 | 0.235 | 15.2 | 7.97 | 0.044 | 22.2 |
| A-22 | 17.5 | 0.055 | 14 | 6.07 | 0.019 | 12.7 |
| A-20 | 15.7 | 0.066 | 15.1 | 2.7 | 0.012 | 17.5 |
| A-4 | 17.7 | 0.019 | 9.7 | 5.48 | 0.012 | 8.9 |
| A-12 | 7.7 | 0.058 | 13.1 | 0.66 | 0.001 | 8.5 |
| A-16 | 5.6 | 0.057 | 13.2 | 1.65 | 0.033 | 8.11 |

Figure 28:
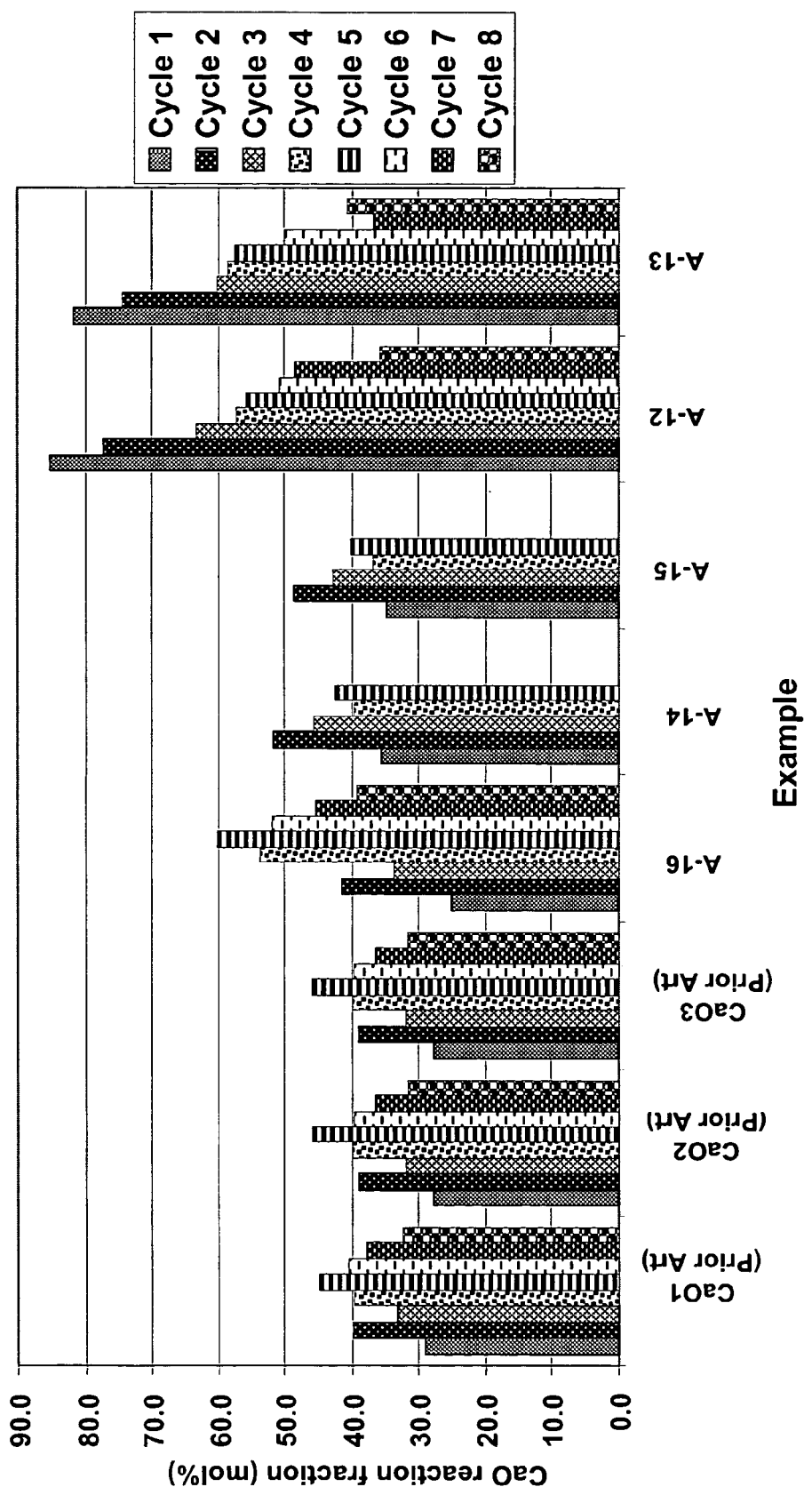
FIG. 28 illustrates the absorption capacity in terms of CaO reaction fraction of CaO-based absorbents over 8 cycles according to the present invention compared to the prior art.

FIG. 28 illustrates the absorption capacity in terms of CaO reaction fraction through multiple cycles for commercial CaO (3 samples) and CaO obtained from different spray processing methods, namely spray pyrolysis (Examples A-14 and A-15), and conversion in a spray dryer with post-processing (Examples A-12 and A-13).

Referring to FIG. 28, the capacity of some CaO absorbents made by spray pyrolysis is only slightly higher compared to the commercial CaO absorbents (30 mol. % vs. 25 mol. % CaO reaction fraction in the first cycle). It can also be seen that CaO samples from oxalate precursors (Example A-12, by XRD $CaCO_3$ and Example A-1 3, by XRD a mix of $CaCO_3$ an CaO, made by spray drying followed by post-processing at 500° C. and 750° C., respectively) have a high initial absorption capacity—up to 80 mol. % CaO reaction fraction, nearly three times higher than commercial CaO. These results clearly demonstrate the advantages of spray processing in the development of CaO-based absorbents. However, the absorption capacity decreases very rapidly after a limited number of cycles (from 85 mol. % to 32 mol. %) due to the loss of microstructure and porosity, as mentioned above. Therefore, further addition of materials into CaO is necessary to prevent the materials from sintering during temperature swing operation and to maintain the cyclability.

Figure 29:
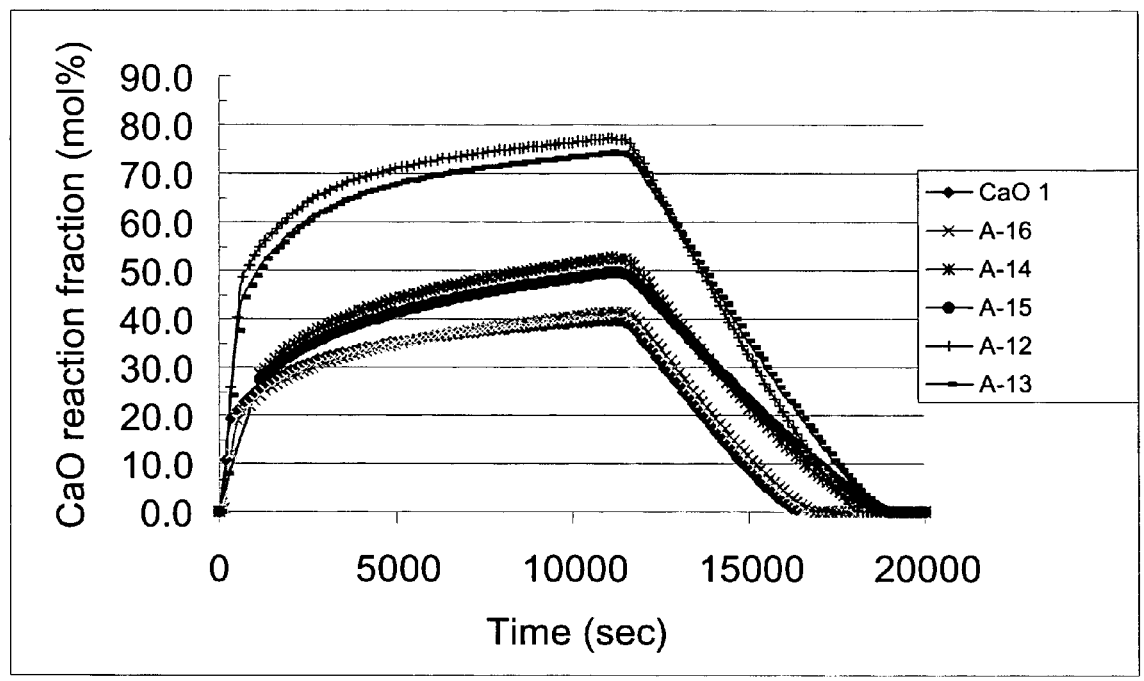
FIG. 29 illustrates the carbonation and decarbonation kinetics of CaO-based absorbents according to the present invention compared to the prior art.

FIG. 29 illustrates a comparison between the initial carbonation and decarbonation profiles of CaO absorbent materials from different sources including a commercial samples. The CaO fabricated from calcium nitrate and ammonium oxalate precursors and post processed at 500° C. (A-12) or at 750° C. (A-13) has faster kinetics and higher reactivity in the fast region and improved kinetics upon decarbonation.

Figure 30:
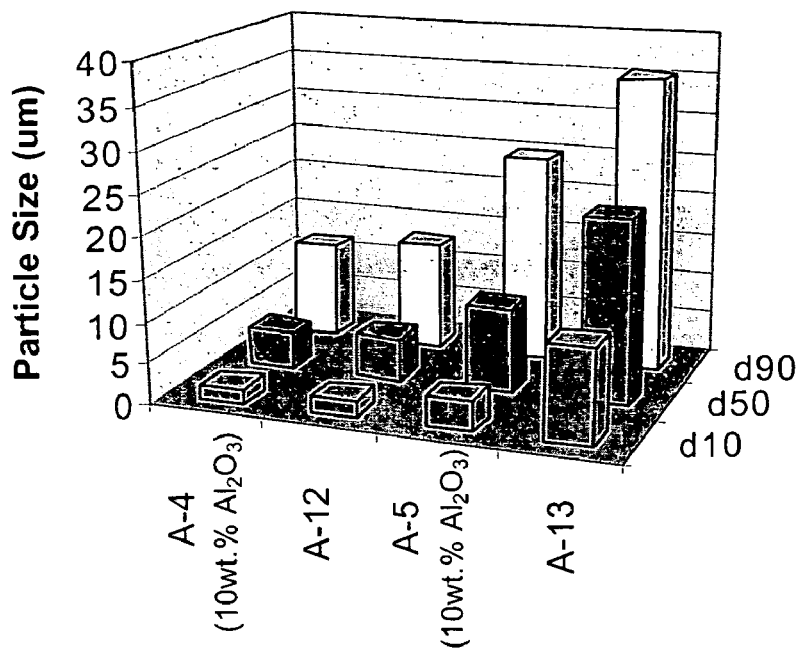
FIG. 30 illustrates the particle size distribution of absorbent powders according to the present invention.
Figure 31:
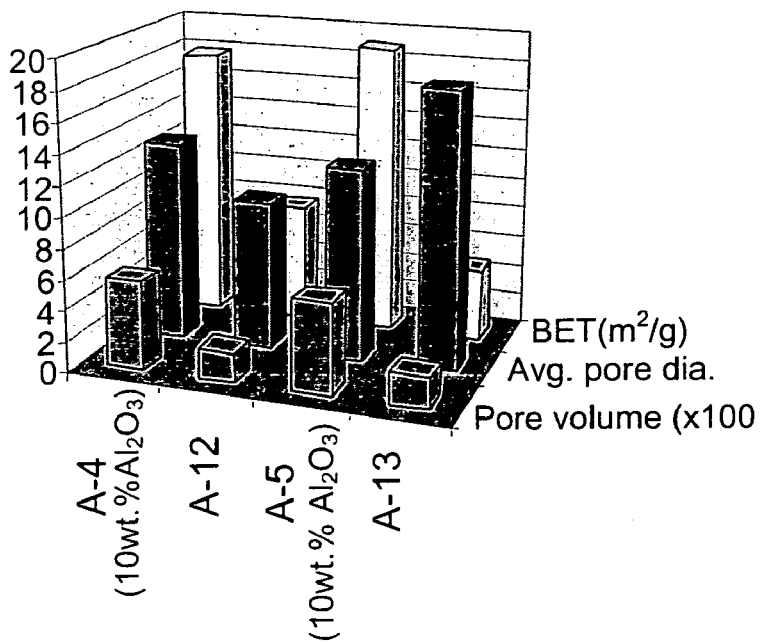
FIG. 31 illustrates the pore volume, BET surface area and average pore diameter for absorbent powders according to the present invention.

FIGS. 30 and 31 illustrate the particle size distribution (FIG. 30) and the pore volume, average pore diameter (pores<100 nanometers) and BET surface area (FIG. 31) for Examples A-4, A-12, A-5 and A-13. It is evident that the addition of 10% $Al_2O_3$ reduces the initial particle size of the absorbent materials (Example A-4 compared to Example A-12 and Example A-5 compared to Example A-13) and increases the average pore volume and surface area of the powders.

Figure 32:
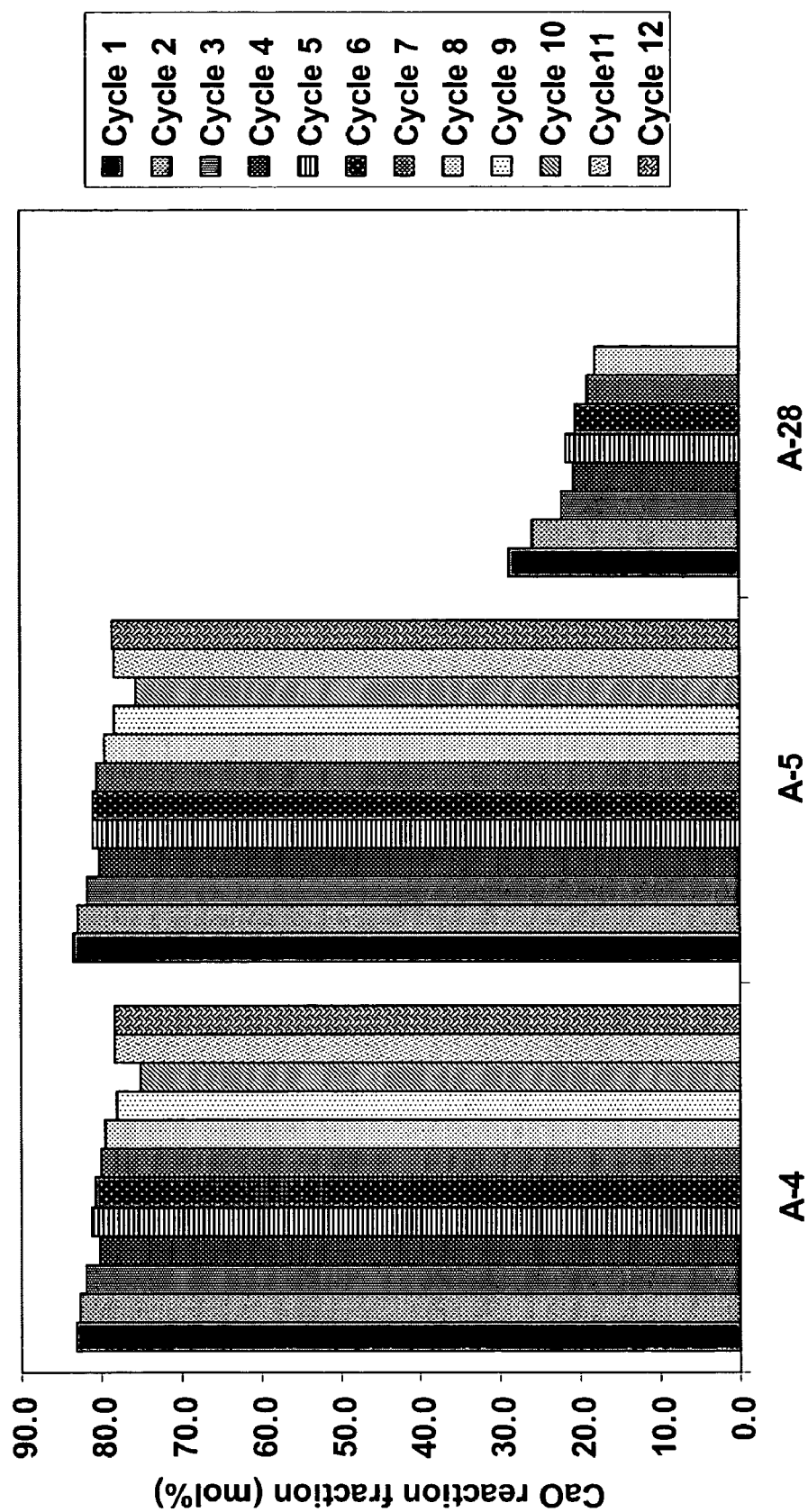
FIG. 32 illustrates the absorption capacity in terms of CaO reaction fraction of absorbent powders according to the present invention over 12 cycles.

FIG. 32 illustrates the CaO absorption capacity in terms of CaO reaction fraction as a function of the number of cycles for 3 different examples. The addition of 10 wt. % $Al_2O_3$ to CaO in Examples A-4 and A-5 can significantly improve the absorbent stability while maintaining the original high $CO_2$ absorption, retaining an absorption capacity above 70 mol. % for each cycle up to 12 cycles. One reason for good cyclability of 10 wt. % $Al_2O_3$/CaO samples is the particle size stability after the multiple cycles, as demonstrated in Table 15.

TABLE 15

| Example | Composition | Particle Size (μm) $d_{10}, d_{50}, d_{90}$ Before Cycling | After Cycling |
|---|---|---|---|
| A-12 | 100% CaO | 2.0, 5.1, 13.2 | 5.6, 14.5, 26.2 |
| A-4 | 90% CaO 10% $Al_2O_3$ | 1.7, 4.4, 11.7 | 1.0, 2.7, 11.4 |
| A-28 | 57% CaO 43% $Al_2O_3$ | 1.2, 5.9, 17.1 | 3.2, 7.5, 22.4 |

It is noteworthy that the PSD for Example A4 actually decreases after cycling.

Figure 33:
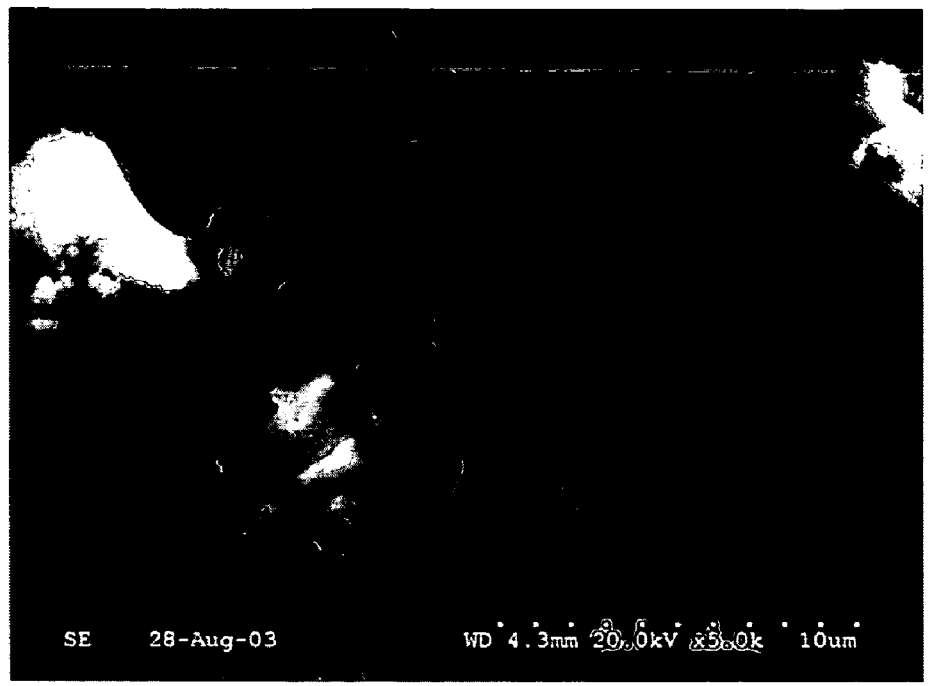
FIGS. 33(a) and 33(b) illustrate SEM photomicrographs of a commercial CaO powder before and after 27 cycles.
Figure 33:
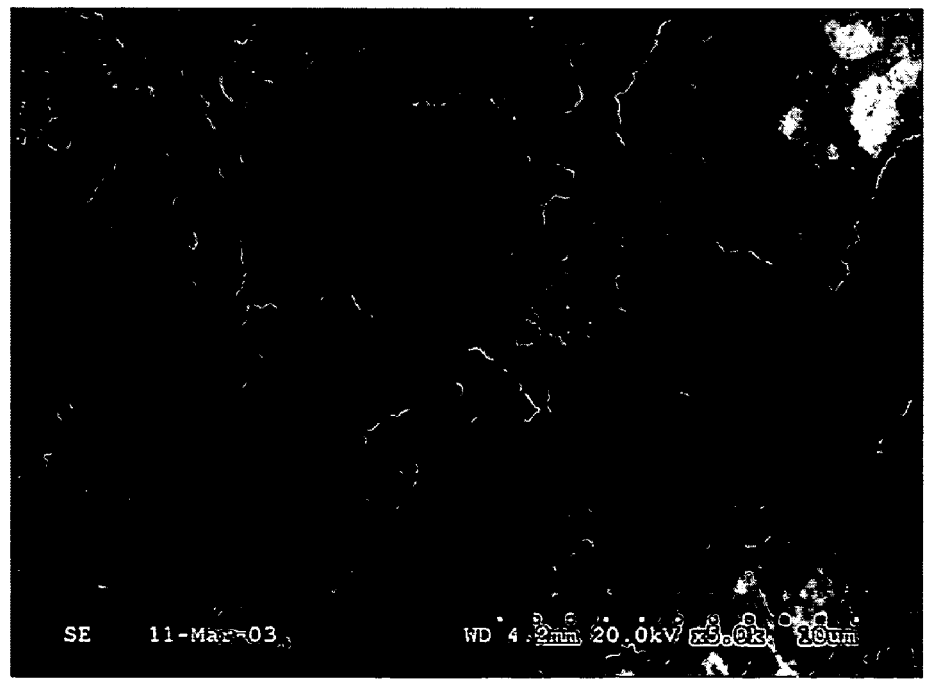
Figure 34:
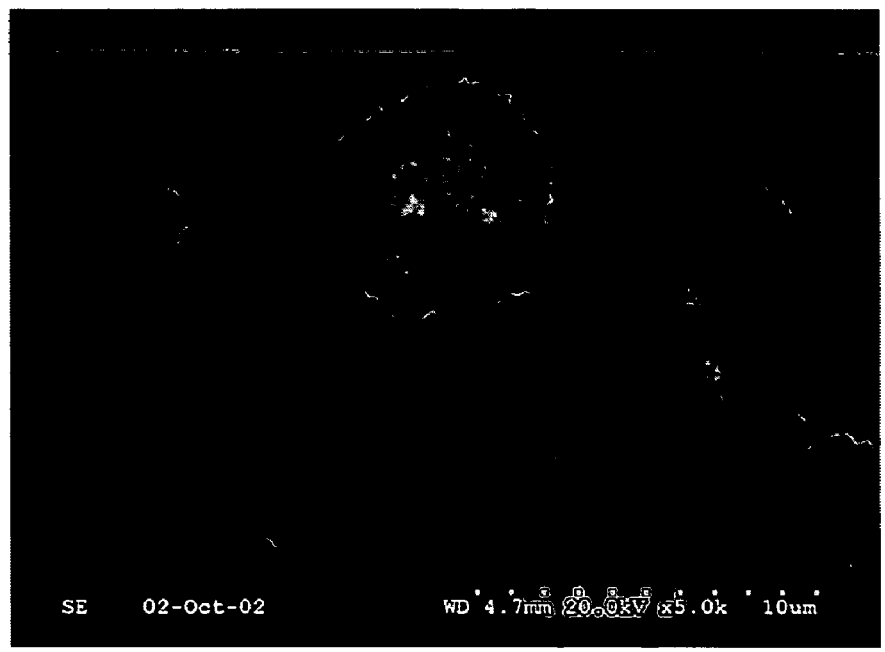
FIGS. 34(a) and 34(b) illustrate SEM photomicrographs of an absorbent powder according to the present invention before and after 12 cycles.
Figure 34:
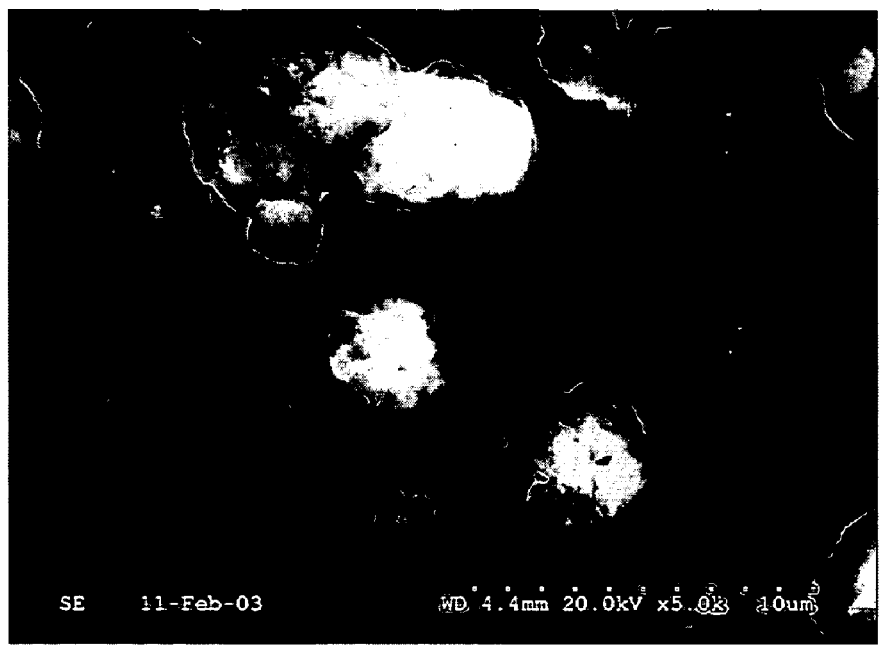
Figure 35:
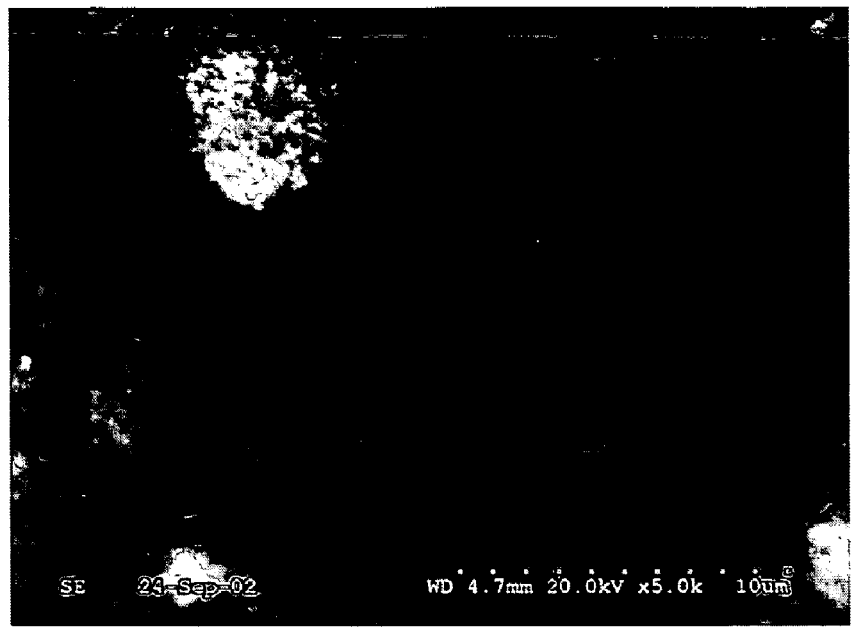
FIGS. 35(a) and 35(b) illustrate SEM photomicrographs of an absorbent powder according to the present invention before and after 12 cycles.
Figure 35:
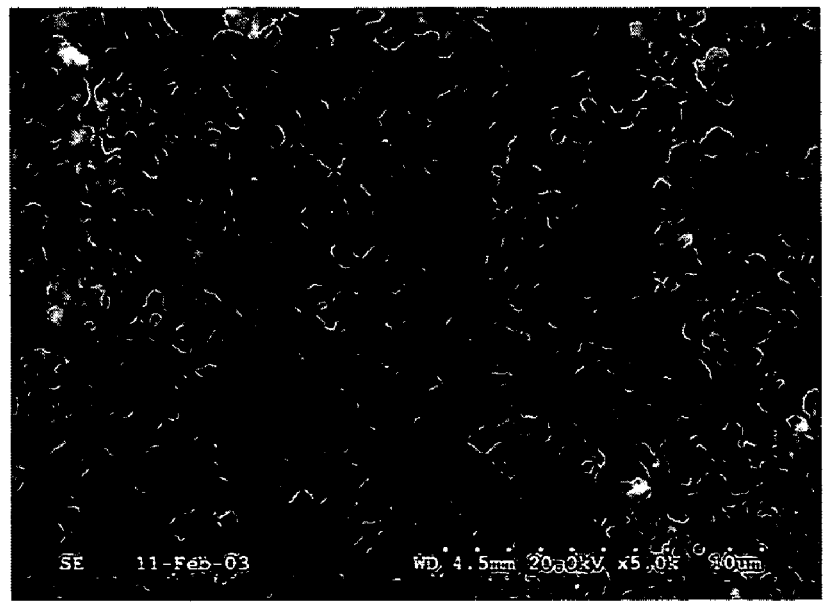

FIGS. 33(a) and (b) illustrate the SEM photomicrographs of a commercially available CaO powder before and after 27 cycles. FIGS. 34(a) and (b) illustrate SEM photomicrographs of Example A-12 before and after 12 cycles. FIGS. 35(a) and (b) illustrate SEM photomicrographs of Example A-4 before and after 12 cycles.

Figure 36:
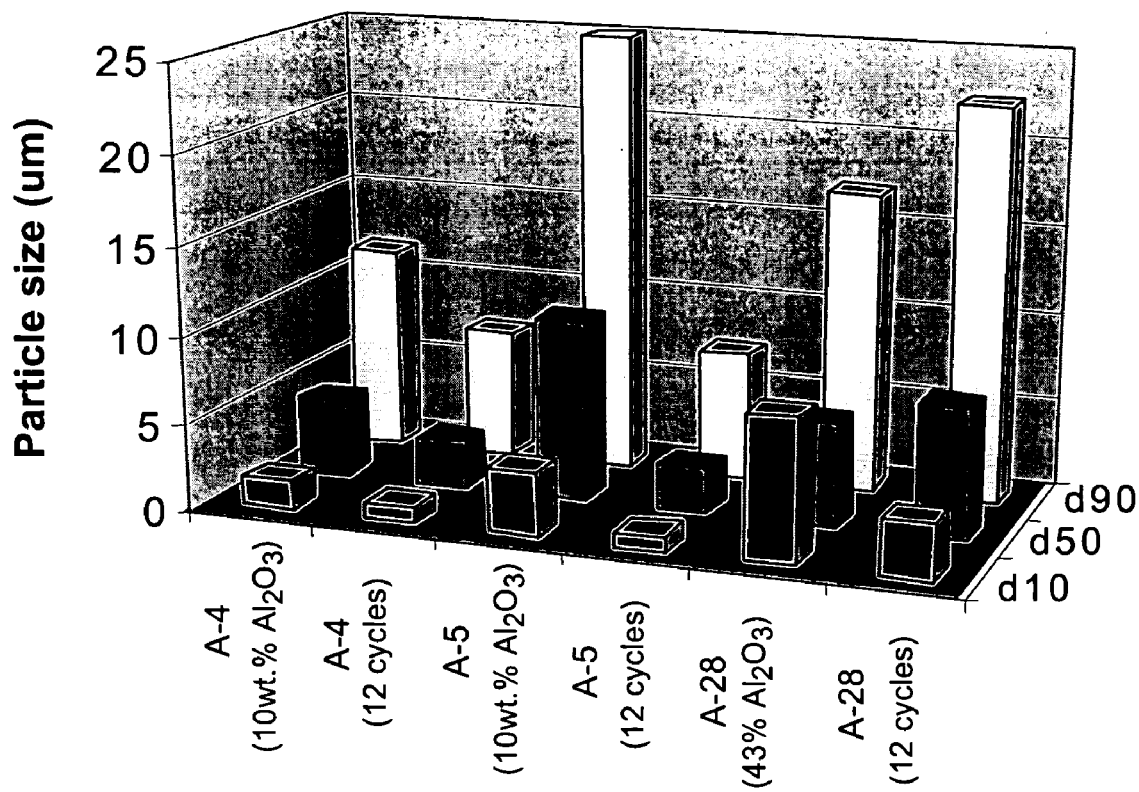
FIG. 36 illustrates the particle size distribution of absorbent powders according to the present invention before and after 12 cycles.

FIG. 36 illustrates the change in particle size distribution for $Al_2O_3$/CaO examples according to the present invention before and after 12 cycles. It is evident that the examples having good recyclability (Examples A-4 and A-5) also exhibit an overall decrease in particle size. Example A-28 (43% $Al_2O_3$) shows an increase in the $d_{50}$ and $d_{90}$ size ranges.

Figure 37:
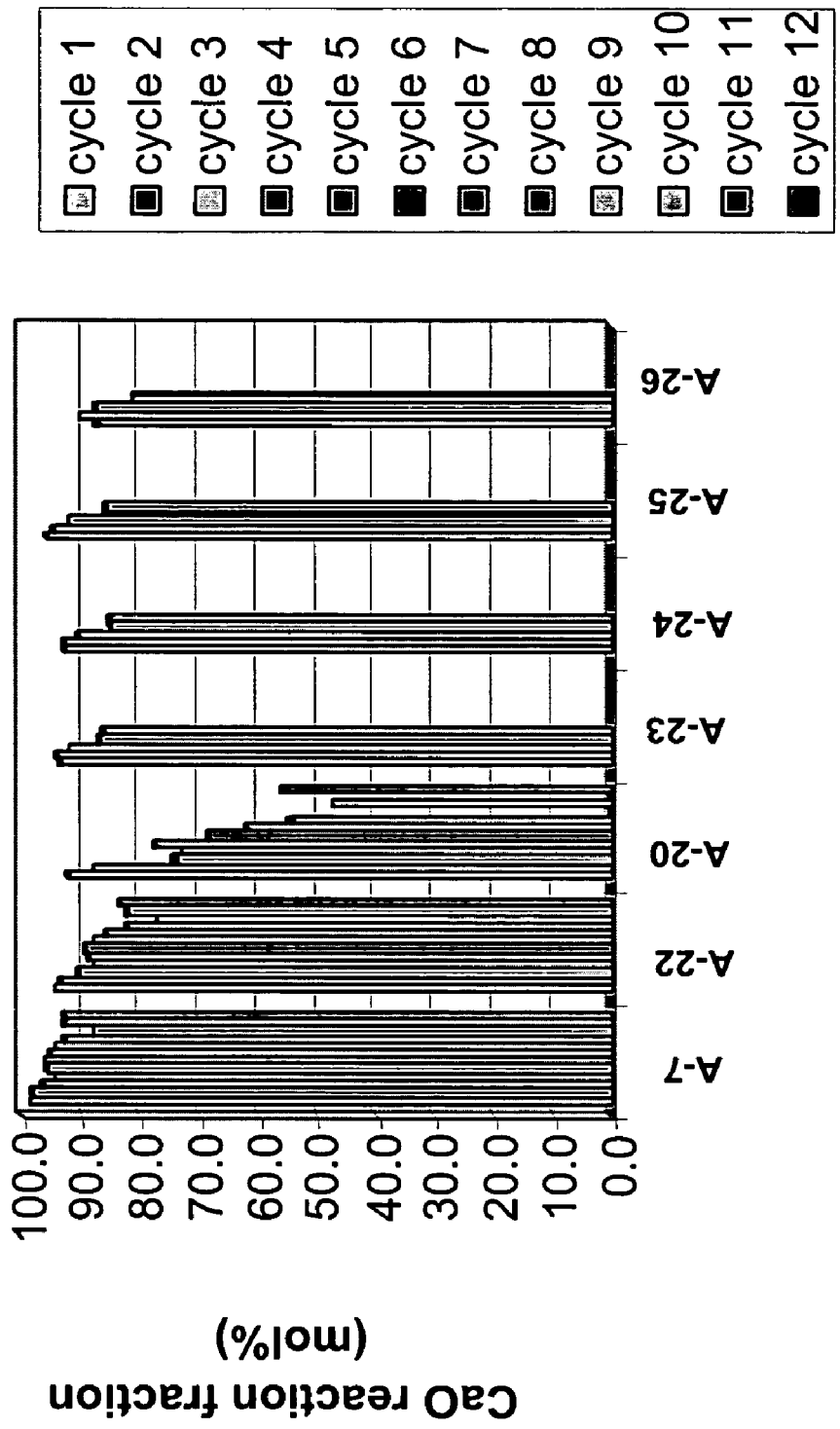
FIG. 37 illustrates the absorption capacity in terms of CaO reaction fraction of absorbent powders according to the present invention over 12 cycles.
Figure 38:
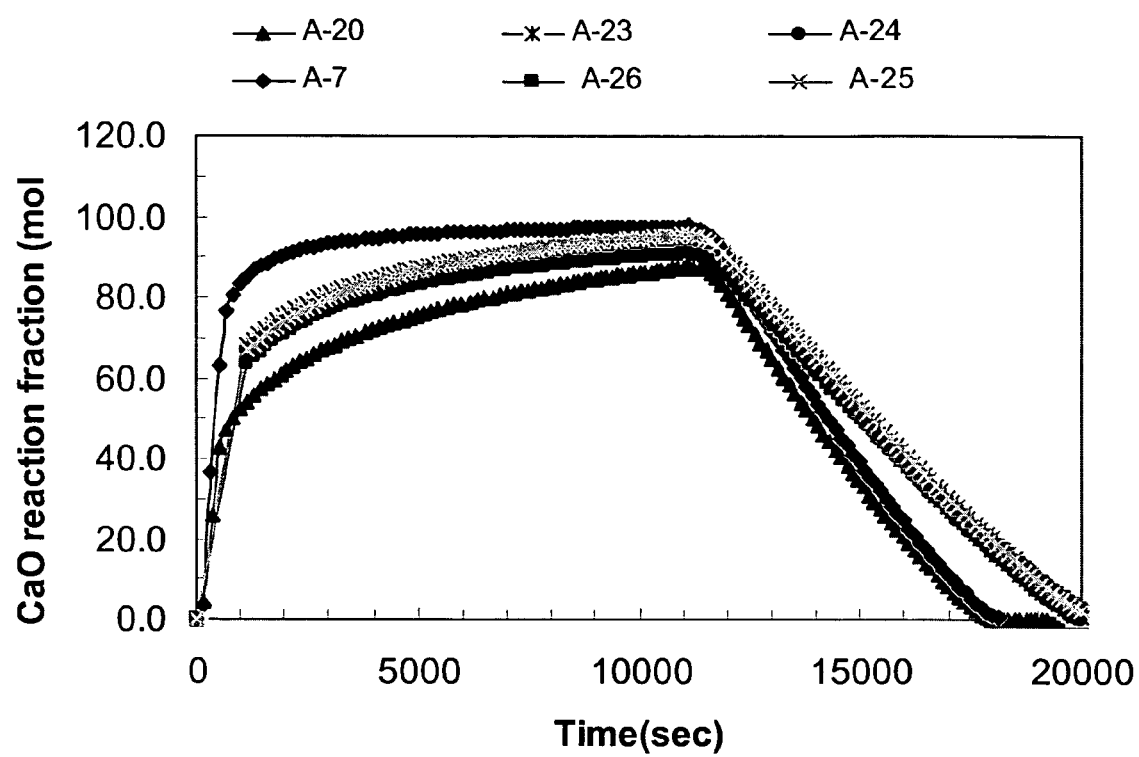
FIG. 38 illustrates the carbonation and decarbonation kinetics of several absorbent powders according to the present invention.

MgO can also be added to the absorbent materials in accordance with the present invention. FIG. 37 illustrates the performance achieved by adding MgO into CaO at different ratios of CaO:MgO and also by adding $Al_2O_3$. It can be seen that CaO:MgO with different ratios (from 90:10 to 50:50) made by spray drying followed by post processing at 500° C. have a similar initial absorption capacity in terms of CaO reaction fraction. However, the stability is quite different—only a CaO:MgO ratio of 50:50 stabilizes the recyclability. Example A-7 with a CaO:MgO ratio of 50:50 retains a capacity of over 90% even after 12 cycles, while the capacity of Example A-20 with a CaO:MgO ratio of 90:10 decreases to less than 60% after 12 cycles. The initial differences of carbonation/decarbonation kinetics among samples with the same composition depend on the specific conditions used for spray processing, as is illustrated in FIG. 38. However, both Example A-26 made by spray pyrolysis and Example A-7 made by spray drying followed by post-processing at 500° C. have similar carbonation/decarbonation rates. This observation supports the conclusion that absorbents with good absorption kinetics and recyclability can be derived by various spray processing methods, as described in detail above, as long as the right combination of composition and processing conditions have been utilized.

Figure 39:
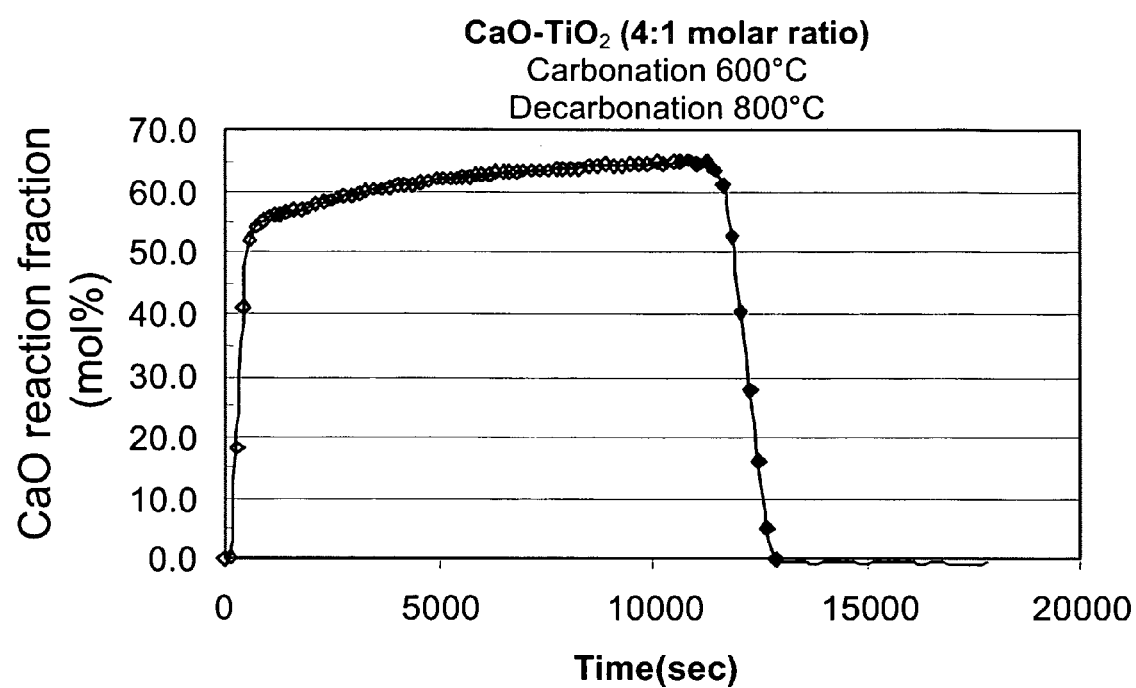
FIG. 39 illustrates the carbonation and decarbonation kinetics of a composite absorbent powder according to the present invention.

As shown above, absorbents with various compositions deliver high reactivity for $CO_2$ absorption in terms of mol. % fraction of CaO. The composition of the inert additives is not limited to $Al_2O_3$ and MgO—other oxides such as $TiO_2$ or a combination thereof can be added to the absorbent formulation to produce an absorbent with faster kinetics, as is illustrated in FIG. 39. The Example illustrated in FIG. 39 is a composite of CaO and $TiO_2$ (CaO:$TiO_2$=4:1) fabricated by spray drying and post-processing at 500° C. for 3 hours.

Figure 40:
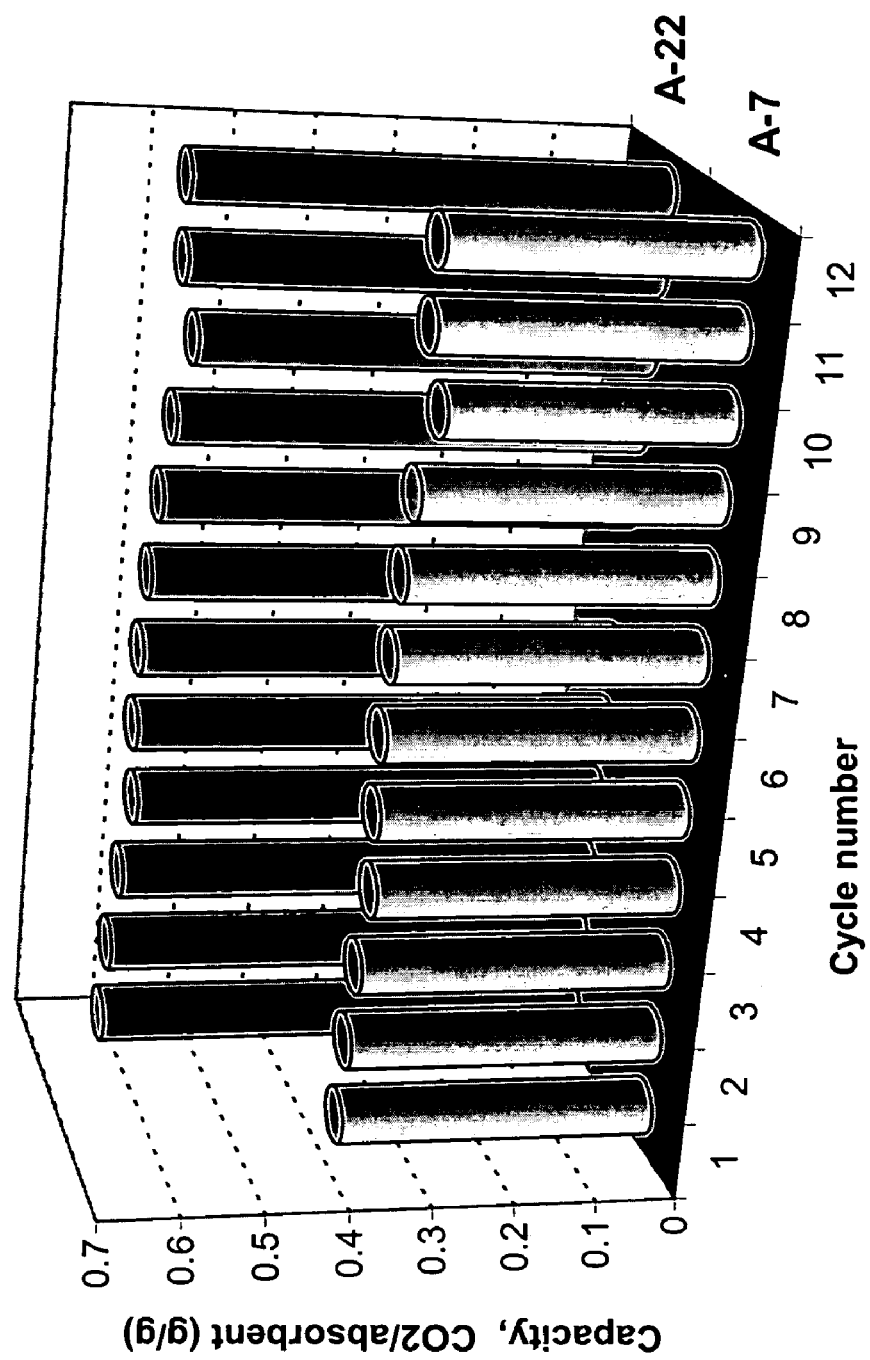
FIG. 40 illustrates the adsorption capacity over 12 cycles for 2 absorbent materials according to the present invention.

From a practical point of view, the total absorption capacity in terms of $CO_2$ weight or weight percentage based on the total weight of the absorbent is more important. By comparing the effects of inert additives such as $Al_2O_3$ and MgO, both showing high initial capacity and stable recyclability at the proper composition and spray processing conditions, significantly improved results are achieved with respect to the total $CO_2$ capacity per gram absorbent by using only a small portion of 10 wt. % $Al_2O_3$ into CaO, as compared to CaO:MgO with 50 wt. % MgO. For example, FIG. 40 illustrates the absorption capacity for Examples A-22 and A-7 expressed as the total $CO_2$ capacity based on the mass of total absorbent. Each example has a relatively constant absorption capacity through 12 cycles and each is close to the theoretical value (66.78 g $CO_2$/100 g absorbent for A-22 and 39.28 g $CO_2$/100 g absorbent for A-7).

Figure 41:
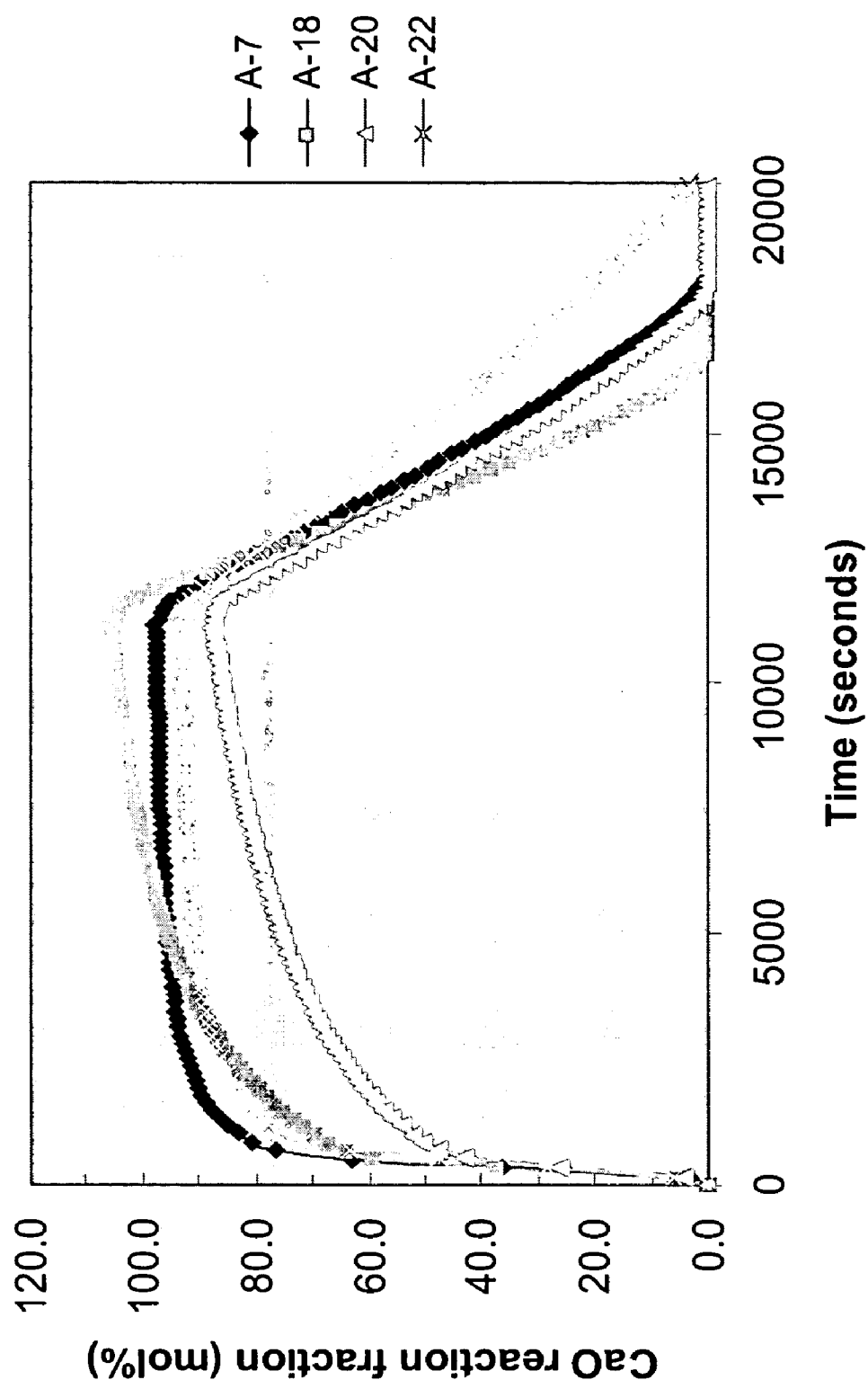
FIG. 41 illustrates the carbonation and decarbonation kinetics of absorbent powders according to the present invention.

FIG. 41 illustrates the carbonation and decarbonation kinetics for four examples according to the present invention. It can be seen that the larger percentage of MgO in the CaO sample, the faster kinetics in the first carbonation region. Also the addition of $Al_2O_3$ can improve the kinetics in first carbonation region, as seen by comparing Examples A-20 and A-22. The most rapid decarbonation kinetics occur with Example A-18.

Figure 42:
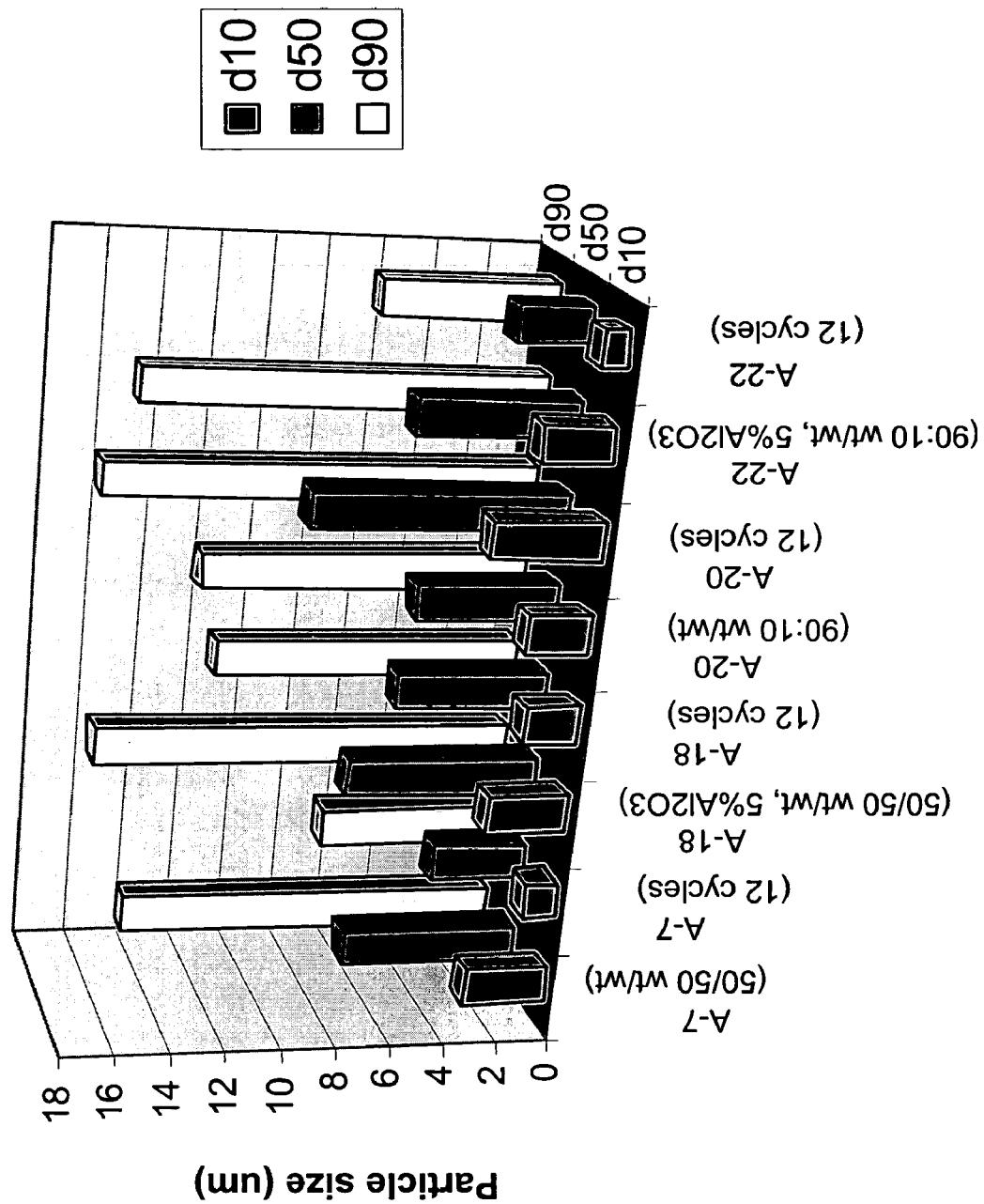
FIG. 42 illustrates the particle size distribution of absorbent powders according to the present invention before and after 12 cycles.
Figure 43:
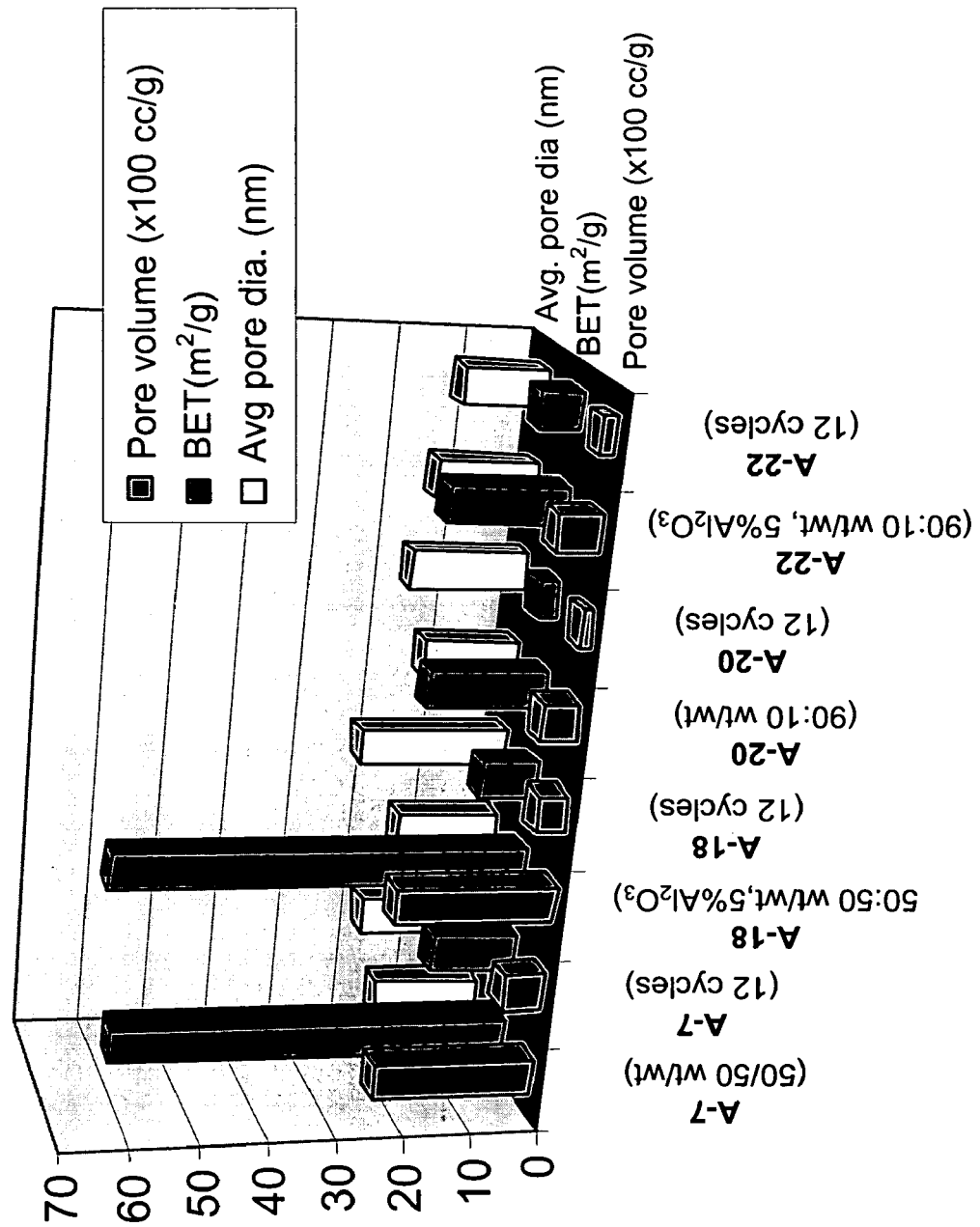
FIG. 43 illustrates the pore volume, BET surface area and average pore diameter of absorbent powders according to the present invention before and after 12 regeneration cycles.

FIG. 42 illustrates the particle size distribution before and after 12 cycles for certain CaO:MgO examples, with and without $Al_2O_3$ additions. FIG. 43 illustrates the pore volume, BET surface area and average pore diameter (pores<100 nanometers) for the same examples. The presence of MgO effectively increases the porosity, particularly at high MgO contents, and maintains a small particle size.

Pelletization

The following illustrates $CO_2$ absorbent performance after pelletizing and how the selected powder precursors for pellet extrusion affect $CO_2$ absorption by altering the microstructure and porosity.

Table 16 summarizes examples of extruded pellets made from powders that were produced on a spray dryer without further post-processing (see Tables 4 and 5 for the synthesis conditions). Among the extrudates, the binder (boehmite alumina) used for extrusion is kept the same.

TABLE 16

| Example | Powder Composition | Extrudate |
|---|---|---|
| A-2 | Ca-oxalate | EA-2 |
| A-3 | Ca-oxalate 5% $Al_2O_3$ | EA-3 |
| A-3A | Ca-oxalate 25% $Al_2O_3$ | EA-3A |
| A-6 | CaO:MgO (50:50 wt. %) | EA-6 |
| A-7 | CaO:MgO (50:50 wt. %) 5% $Al_2O_3$ | EA-7 |
| A-19 | CaO:MgO (90:10 wt. %) | EA-19 |
| A-21 | CaO:MgO (90:10 wt. %) 5% $Al_2O_3$ | EA-21 |

Figure 44:
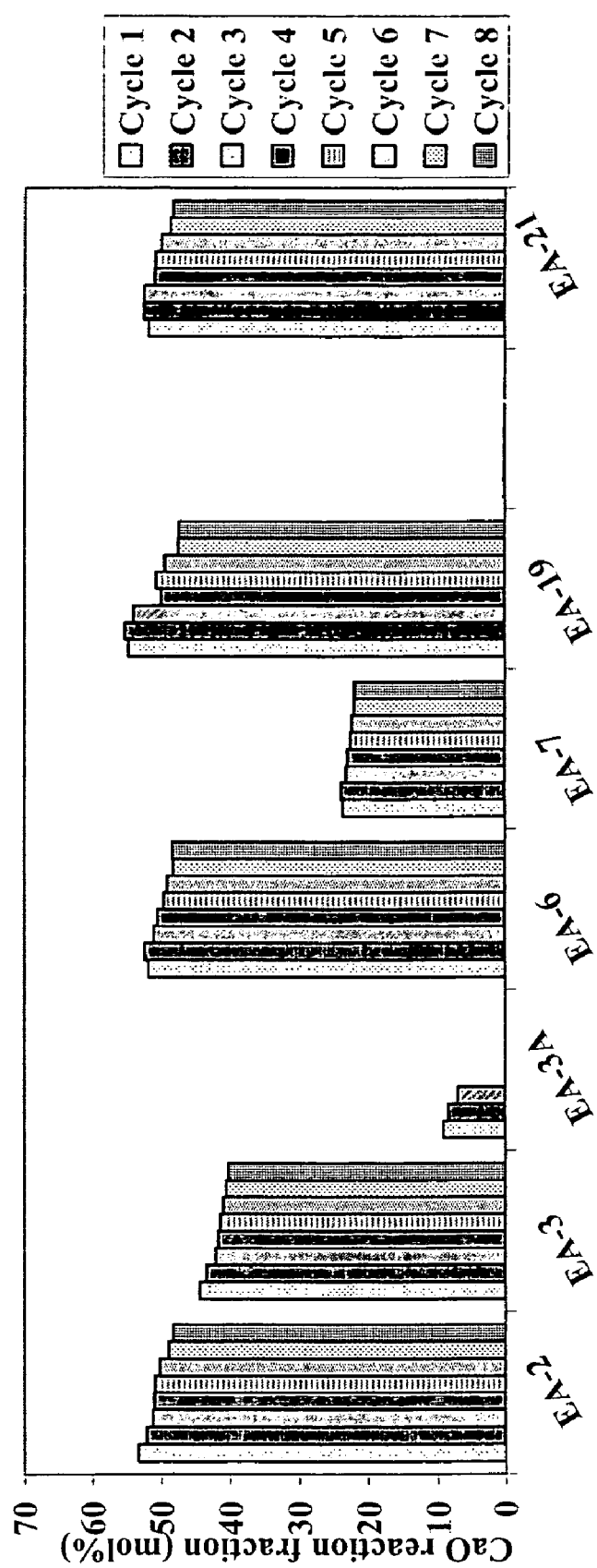
FIG. 44 illustrates the absorption capacity in terms of CaO reaction fraction of pelletized absorbent powders according to the present invention.
Figure 45:
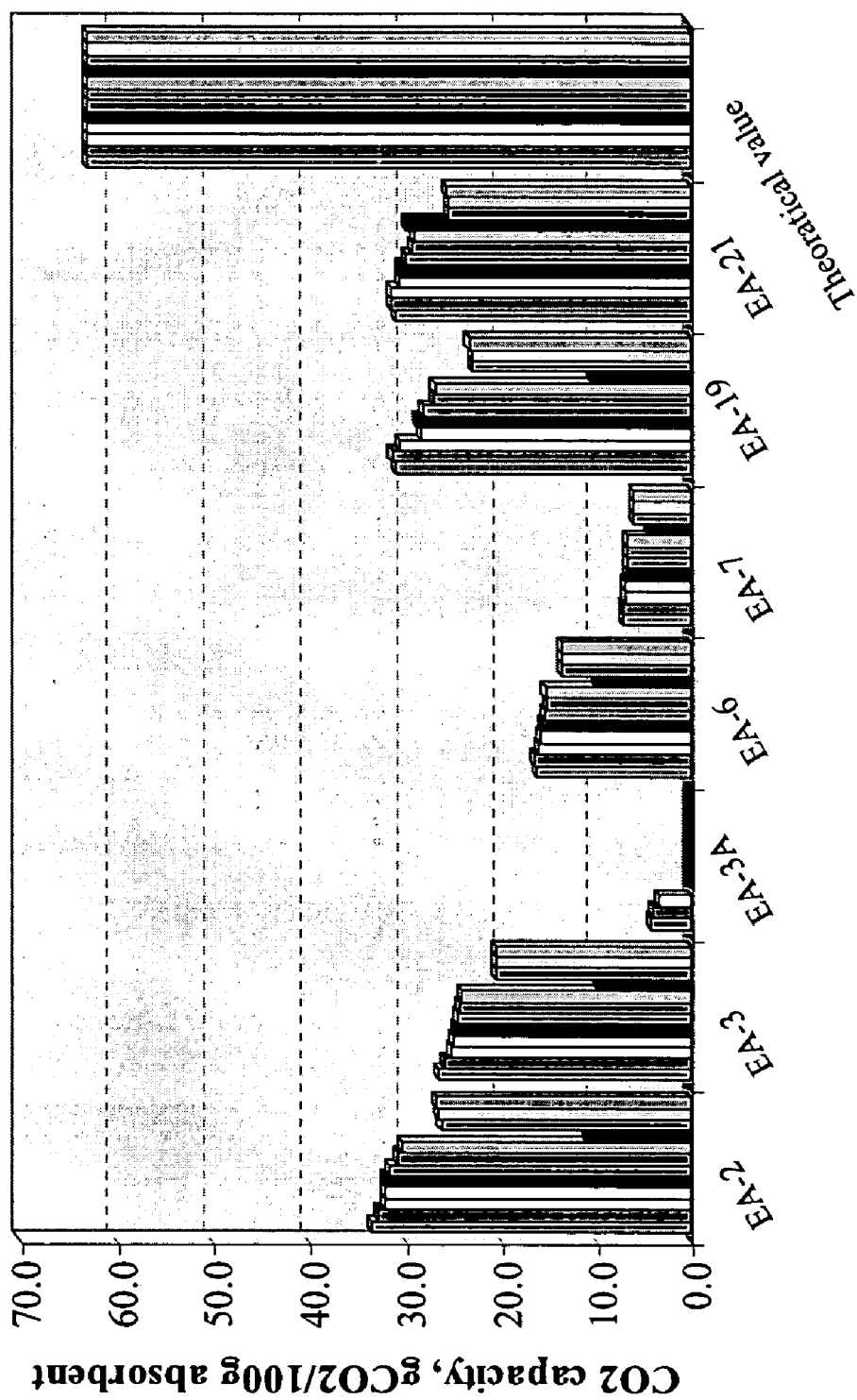
FIG. 45 illustrates the absorption capacity of pelletized absorbent powders according to the present invention.

FIGS. 44 and 45 illustrate the carbonation performance of extrudates formed from precursors including calcium oxalate or calcium carbonate. FIG. 44 illustrates the CaO reaction fraction and FIG. 45 illustrates the total $CO_2$ capacity in mass $CO_2$ per mass of absorbent. After pelletization, CaO reactivity to $CO_2$ carbonation decreases due to microstructural changes caused by the presence of a binder. In the case of sample EA-3A the activity to $CO_2$ carbonation is very low due to the use of large amount of $Al_2O_3$ in the powder precursor sample, similar to the results described for the non-pelletized powder. The presence of a large amount of $Al_2O_3$ will possibly cause it to react with CaO to form a new phase such as a spinel structure and prevent access of $CO_2$ to unreacted CaO.

Figure 46:
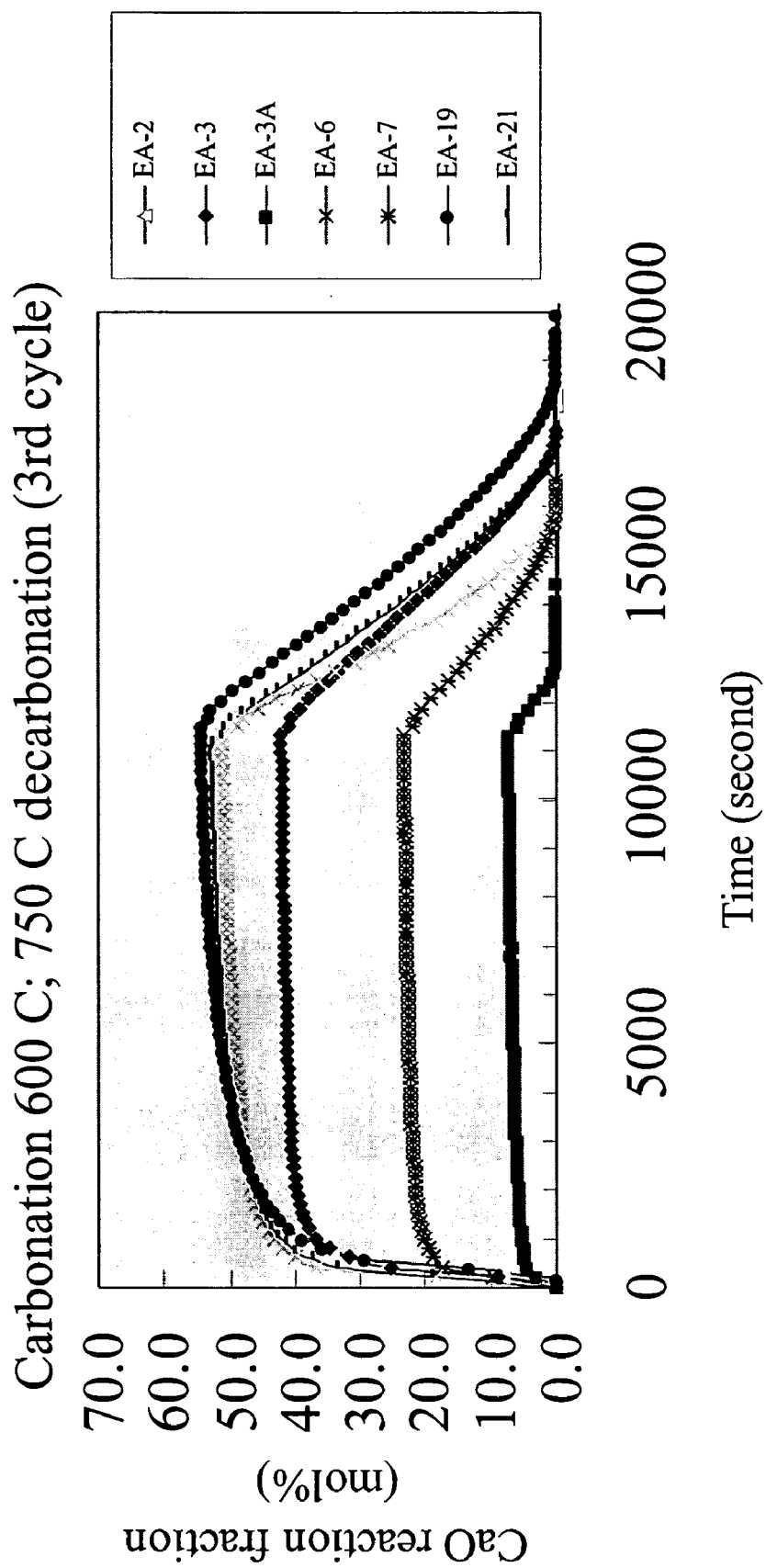
FIG. 46 illustrates the carbonation and decarbonation kinetics of pelletized absorbent powders according to the present invention.

FIG. 46 illustrates a comparison of the carbonation and decarbonation kinetics for selected extrudates.

Figure 47:
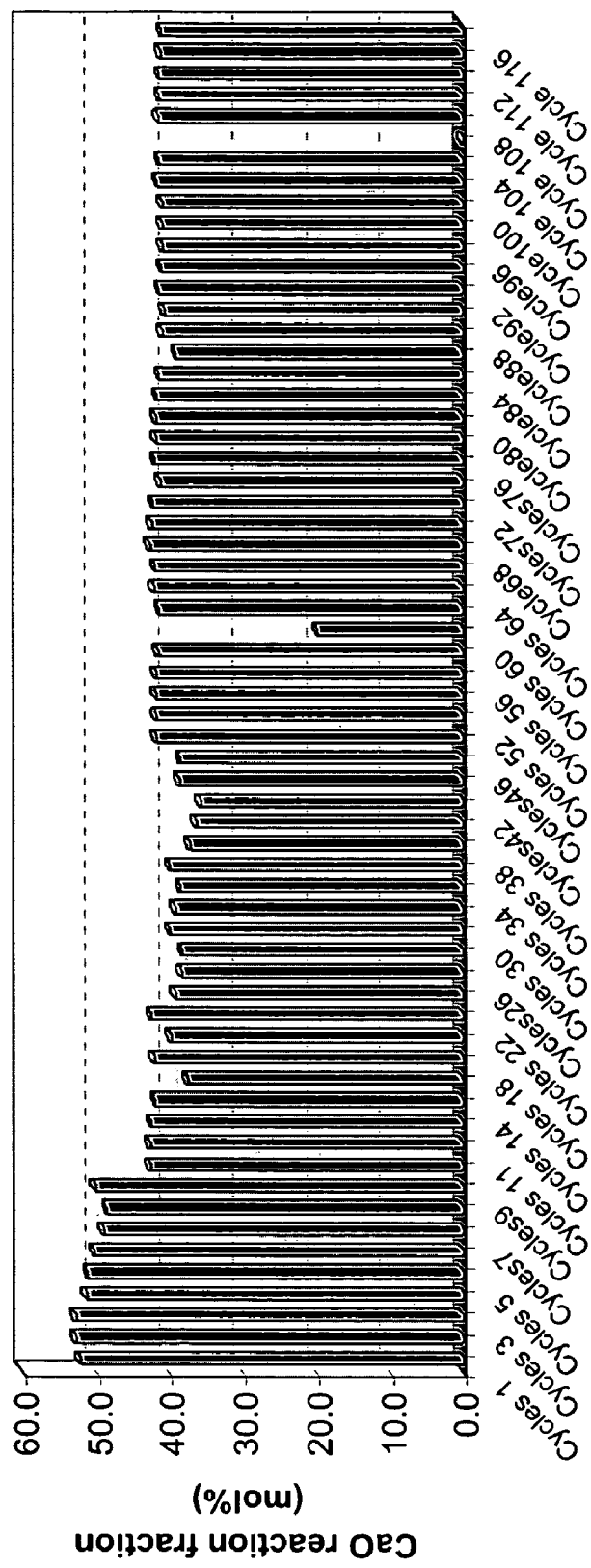
FIG. 47 illustrates the absorption capacity in terms of CaO reaction fraction of pelletized absorbent powders according to the present invention over 116 cycles.
Figure 48:
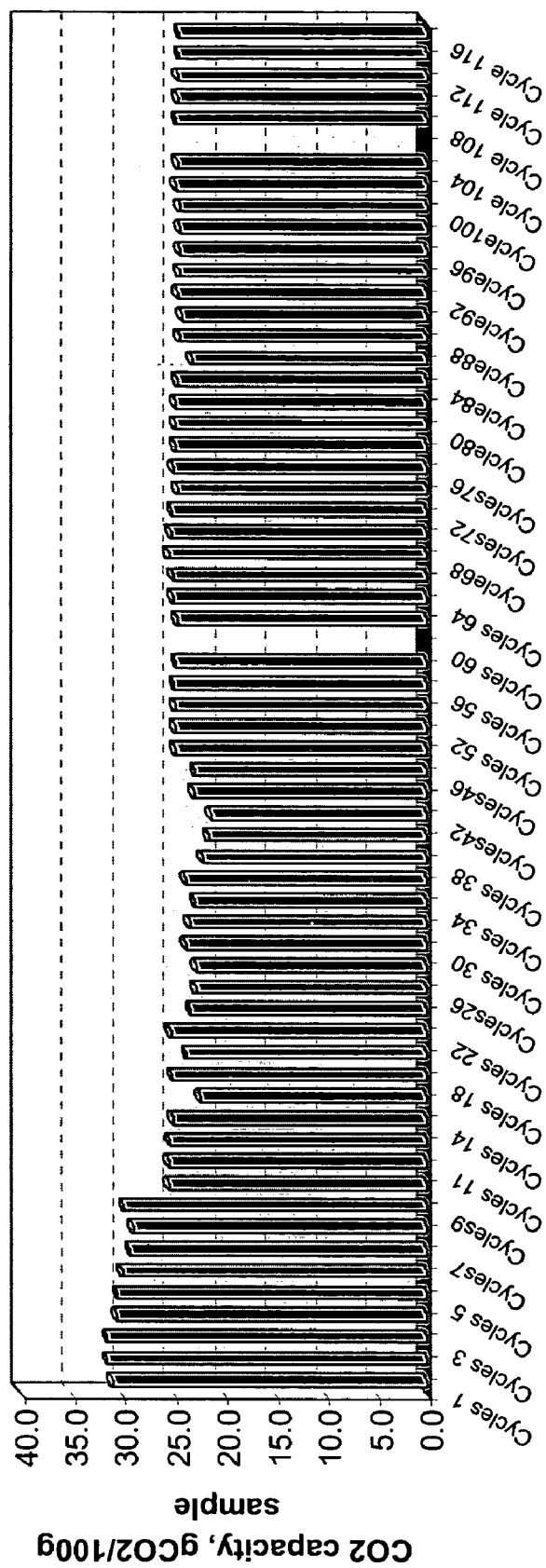
FIG. 48 illustrates the absorption capacity of pelletized absorbent powders according to the present invention over 116 cycles.

FIG. 47 illustrates the absorption capacity over 116 cycles of Extrudate EA-21, which is pelletized from a powder made by spray drying with a composition of Ca-oxalate and Mg-oxalate precursor containing 5 wt. % $Al_2O_3$. It can be seen that CaO reactivity to $CO_2$ carbonation is around 40 mol. % and is very stable over the 116 cycles of the test. (The dips in absorption at cycle numbers 60 and 108 are due to the depletion of the $CO_2$ source during testing). The absolute capacity for $CO_2$ absorption, illustrated in FIG. 48, during the same cycling test is around 23 to 25 grams $CO_2$/per 100 grams of extrudate.

Table 17 lists the powders made from spray pyrolysis used for additional pelletization testing.

TABLE 17

| Sample | Composition | Extrudate |
| --- | --- | --- |
| A-14 | CaO | EA-14 |
| A-15 | CaO | EA-15 |
| A-23 | CaO:MgO (50:50 at. %) | EA-23 |
| A-24 | CaO:MgO (50:50 at. %) | EA-24 |
| A-25 | CaO:MgO (50:50 at. %) | EA-25 |
| A-26 | CaO:MgO (50:50 at. %) | EA-26 |

The details of the powder preparation conditions are listed in Tables 4 and 5.

The amount of the binders used for extrusion for these powders are all kept the same.

Figure 49:
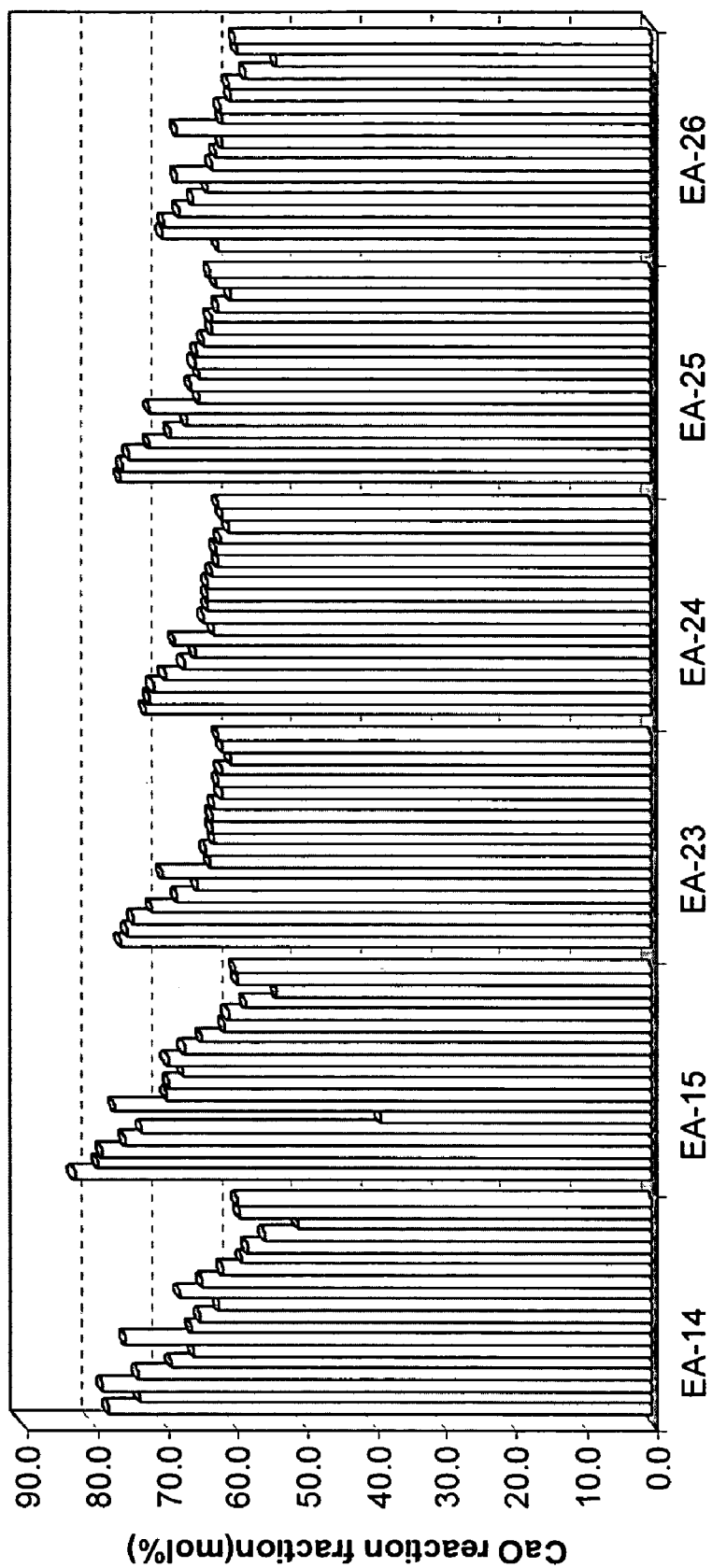
FIG. 49 illustrates the absorption capacity in terms of CaO reaction fraction of pelletized absorbent powders according to the present invention over multiple cycles.
Figure 50:
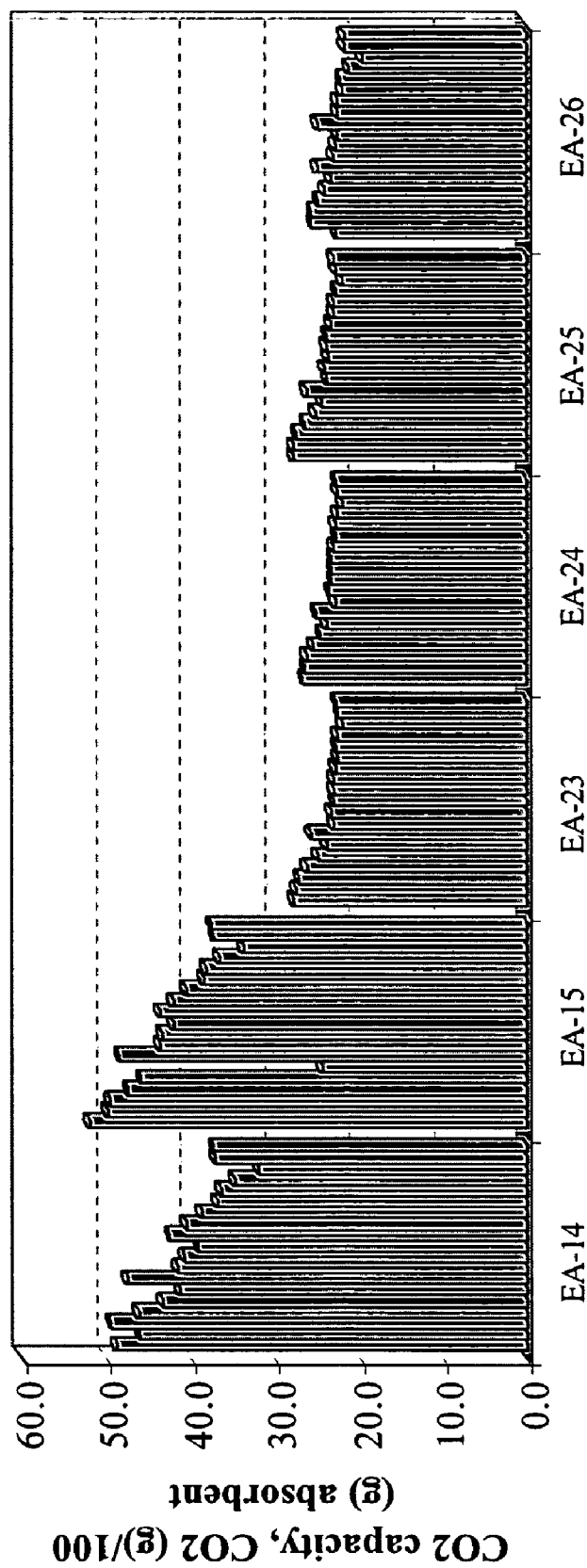
FIG. 50 illustrates the absorption capacity of pelletized absorbent powders according to the present invention over multiple cycles.

FIGS. 49 and 50 show the results of $CO_2$ carbonation reactivity and cyclability over the extrudates. FIG. 49 illustrates the CaO reaction fraction over multiple cycles. For the Examples illustrated in FIGS. 49 to 61, carbonation occurs at 600° C. and decarbonation occurs at 800° C. At the initial stage, the CaO reactivity is higher, then gradually becomes stable and levels at around 60 mol. % during multiple cycles. As compared to the extrudates from CaO:MgO, the extrudates from CaO (EA-14 and EA-15) have a low stability and the absorption capacity gradually decreases during multiple cycles.

FIG. 50 illustrates the total $CO_2$ capacity over the same cycle test as illustrated in FIG. 49. The capacity for the extrudates made from CaO powders (EA-14 and EA-15) is higher than the extrudates made from CaO:MgO powders (EA-23, EA-24, EA-25 and EA-26). However, the extrudates from CaO:MgO powders show more stable recyclability and the capacity for $CO_2$ removal is around 22 g $CO_2$ per 100 g absorbent.

Figure 51:
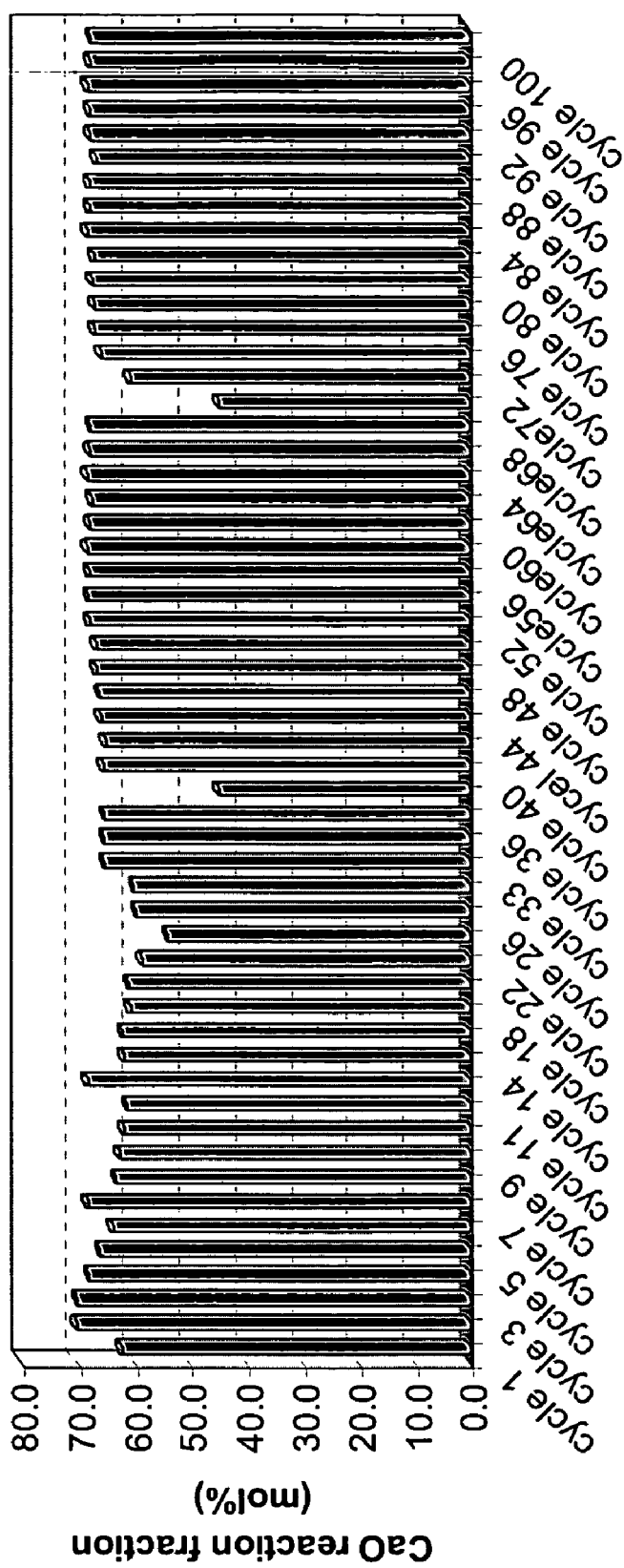
FIG. 51 illustrates the absorption capacity in terms of CaO reaction fraction of pelletized absorbent powders according to the present invention over multiple cycles.
Figure 52:
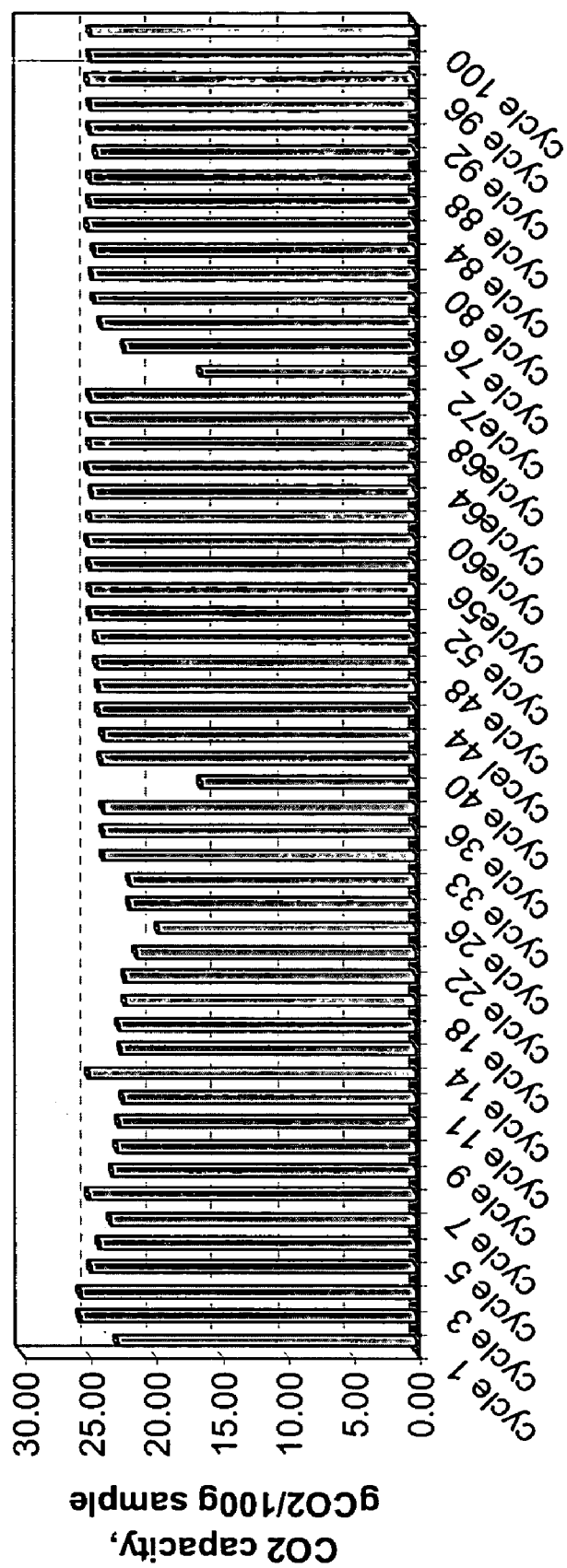
FIG. 52 illustrates the absorption capacity of pelletized absorbent powders according to the present invention over multiple cycles.

FIGS. 51 and 52 illustrate the cyclability of Extrudate EA-26 over 100 cycles. FIG. 51 illustrates the CaO reaction fraction and FIG. 52 illustrates the total $CO_2$-capacity. (The deviations at Cycles 40 and 72 are due to depletion of the $CO_2$ source during testing). This extrudate maintains a high absorption capacity over at least 100 cycles.

Pellets can also be formed from powders made by spray drying and post-processing according to the present invention. Table 18 lists several such examples.

TABLE 18

| Extrudate | Powder Composition | Process Conditions |
| --- | --- | --- |
| EA-101 | CaO:MgO (50:50 by wt.) | SD, PP at 500° C. |
| EA-102 | CaO:MgO (50:50 by wt.) | SD, PP at 750° C. |
| EA-103 | CaO:MgO (50:50 by wt.) | SD, PP at 500° C. |
| EA-104 | 95% CaO 5% $CaTiO_3$ | SD, PP at 750° C. |
| EA-105 | CaO:MgO (50:50)/$CaTiO_3$ (3/1 by at.) | SD, PP at 650° C. |
| EA-106 | CaO/$CaTiO_3$ (3/1 by at.) | SD, PP at 750° C. |
| EA-107 | Ca-oxalate 5 wt. % $Al_2O_3$ | SD, PP at 500° C. |
| EA-108 | Ca-oxalate 5 wt. % $Al_2O_3$ | SD, PP at 750° C. |
| EA-109 | CaO:MgO (80:20 by wt.) | SD, PP at 500° C. |
| EA-110 | CaO:MgO (80:20 by wt.) | SD, PP at 500° C. |

Figure 53:
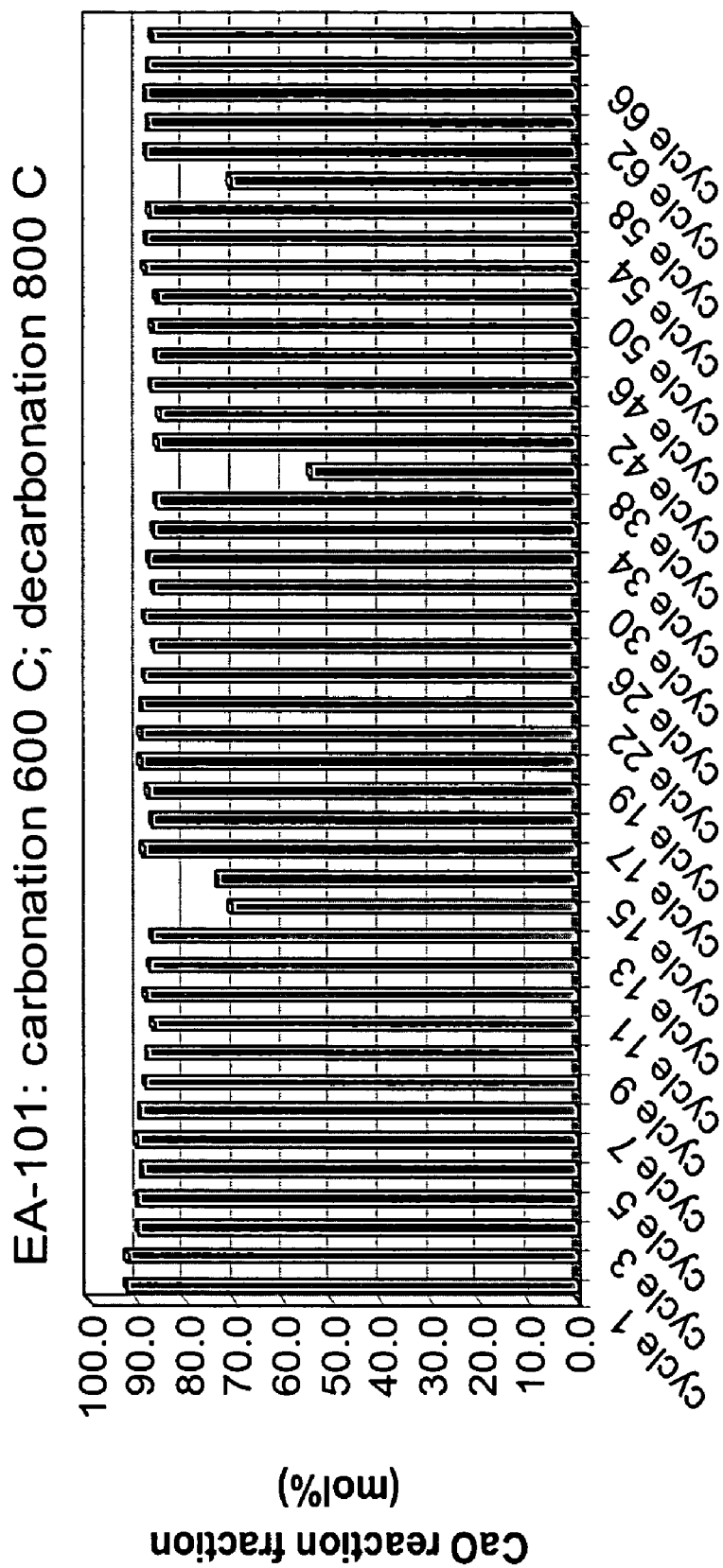
FIG. 53 illustrates the absorption capacity in terms of CaO reaction fraction of pelletized absorbent powders according to the present invention over multiple cycles.
Figure 54:
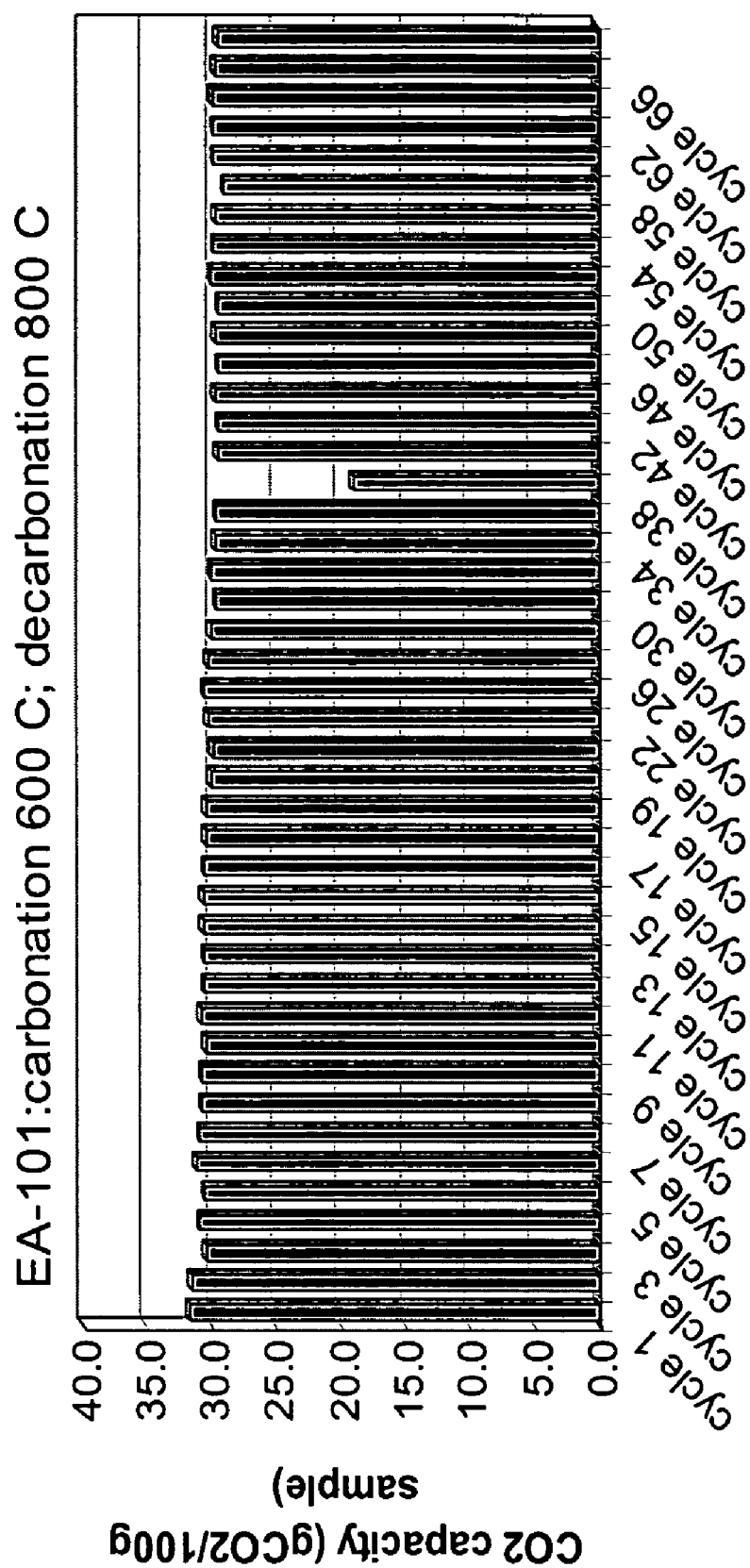
FIG. 54 illustrates the absorption capacity over 66 cycles of pelletized absorbent powders according to the present invention.

FIGS. 53 and 54 illustrate the reactivity and cyclability of extrudate EA-101 made from the powder with CaO/MgO (50:50 wt. ratio) followed by post processing at 500° C. FIG. 53 illustrates the CaO reaction fraction over 66 cycles and FIG. 54 illustrates the $CO_2$ capacity for the same cycle tests. The dips in CaO reaction fraction (e.g., at Cycle 42) is believed to be due to a depletion of the $CO_2$ source. These figures demonstrate that the absorbent powder formed by spray drying and post-processing at 500° C. can be formed into a pellet having a high absorption capacity over a large number of cycles.

Figure 55:
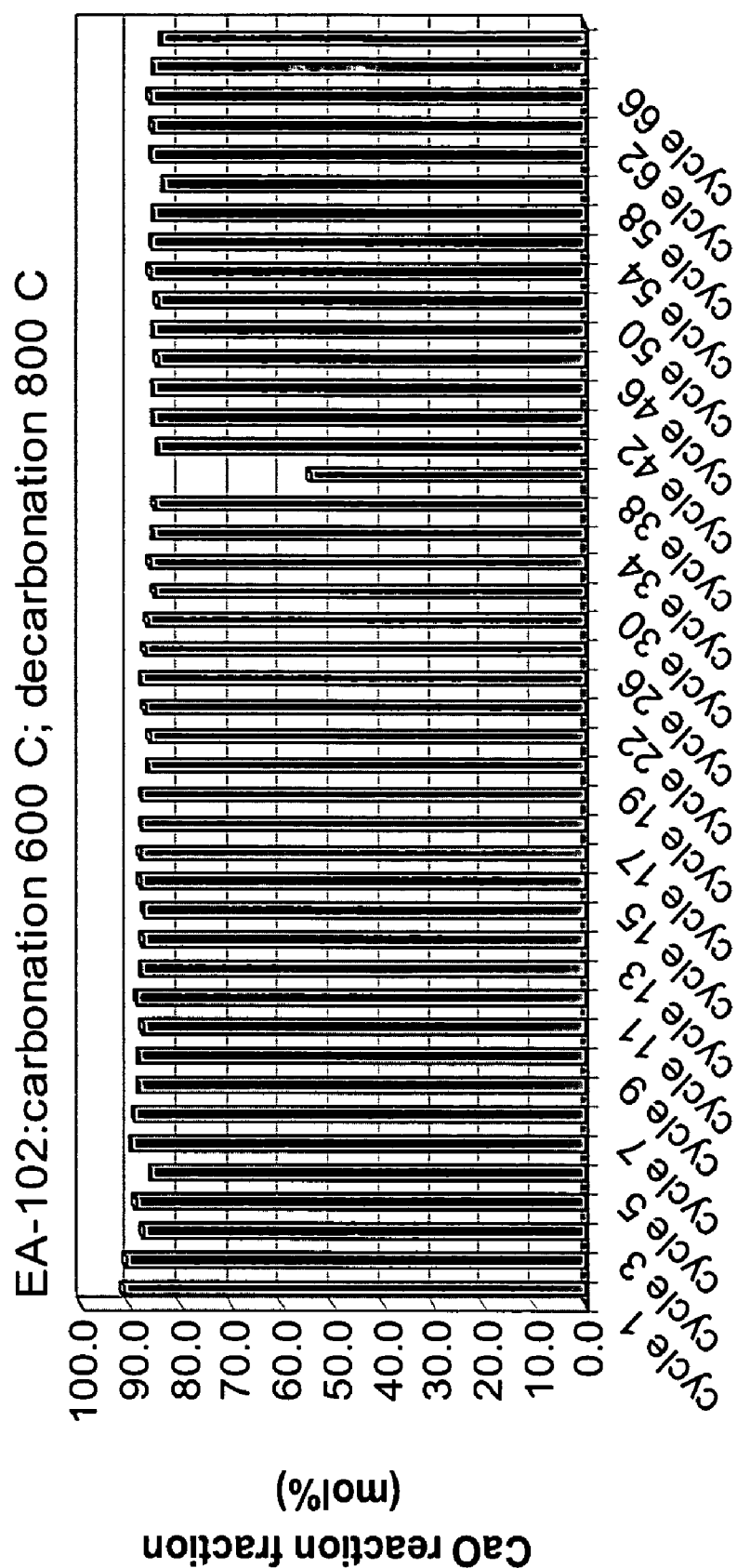
FIG. 55 illustrates the absorption capacity over 66 cycles in terms of CaO reaction fraction of pelletized absorbent powders according to the present invention.
Figure 56:
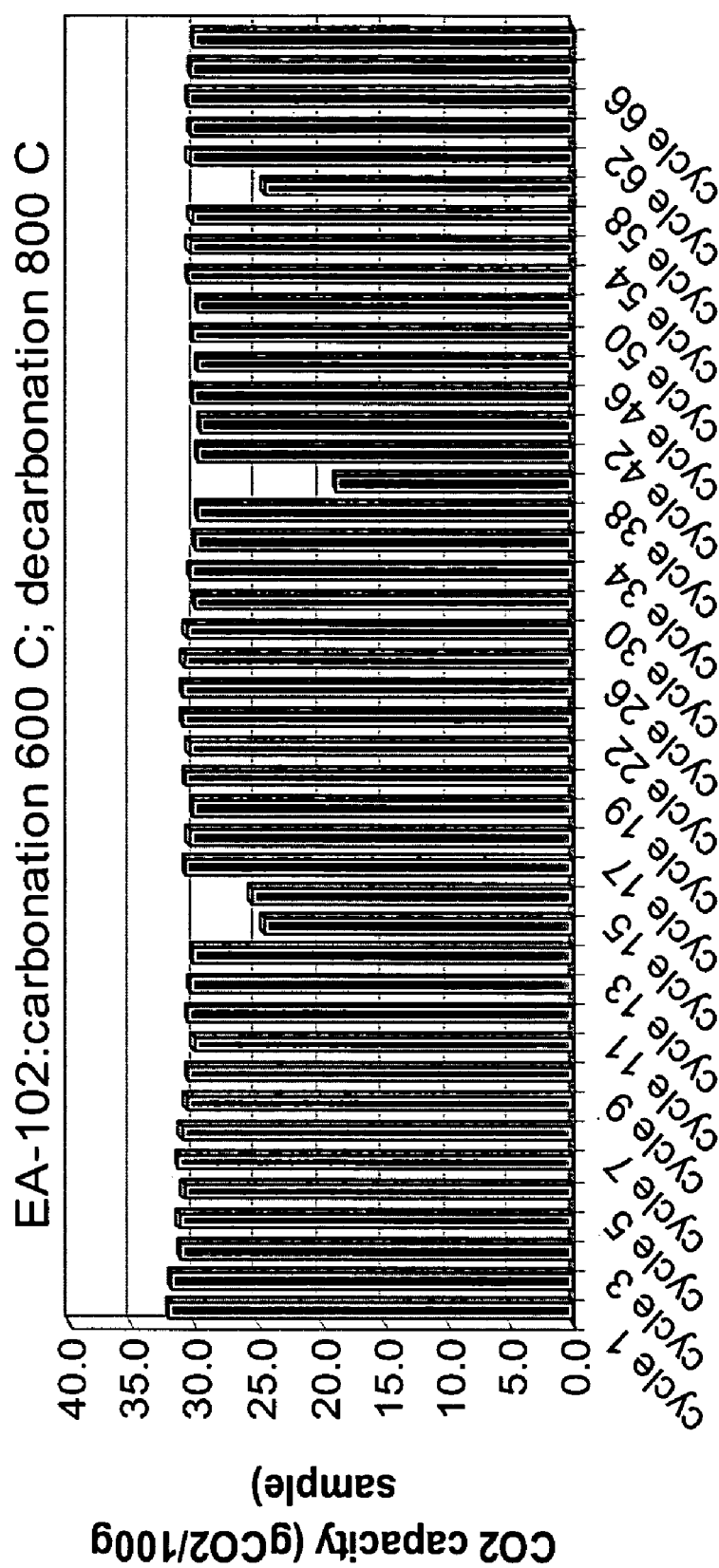
FIG. 56 illustrates the absorption capacity over 66 cycles of pelletized absorbent powders according to the present invention.

FIGS. 55 and 56 illustrate the reactivity and cyclability of extrudate EA-102 made from the powder with CaO:MgO (50:50 wt. ratio) followed by post processing at 750° C. FIG. 55 illustrates the CaO reaction fraction over 66 cycles and FIG. 56 illustrates the $CO_2$ capacity for the same cycle tests. These examples were tested at the same time as the examples illustrated in FIGS. 53 and 54, and the dips in CaO reaction fraction (e.g., at Cycle 42) is believed to be due to a depletion of the $CO_2$ source. These figures demonstrate that the absorbent powder formed by spray drying and post-processing at 750° C. can be formed into a pellet having a high absorption capacity over a large number of cycles.

Figure 57:
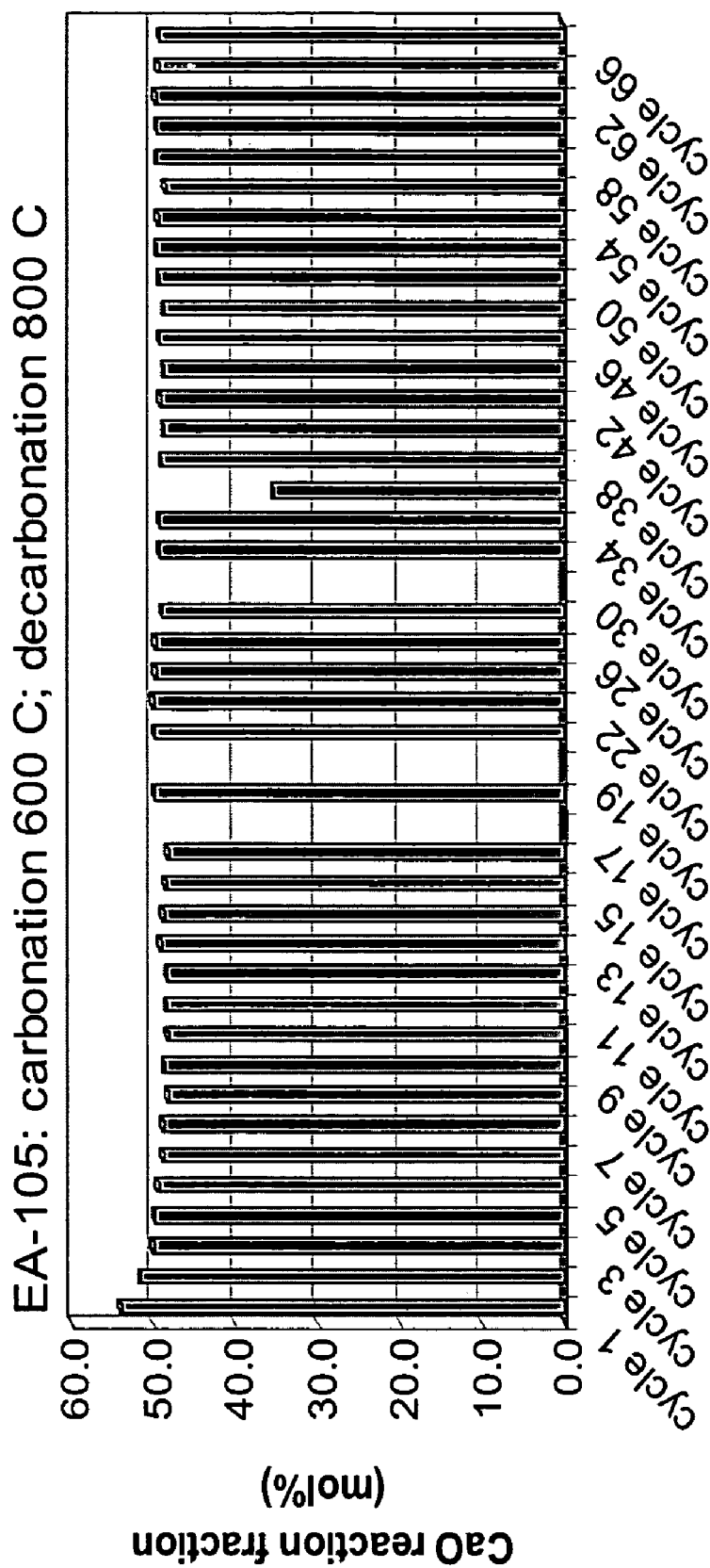
FIG. 57 illustrates the absorption capacity over 66 cycles in terms of CaO reaction fraction of pelletized absorbent powders according to the present invention over multiple cycles.
Figure 58:
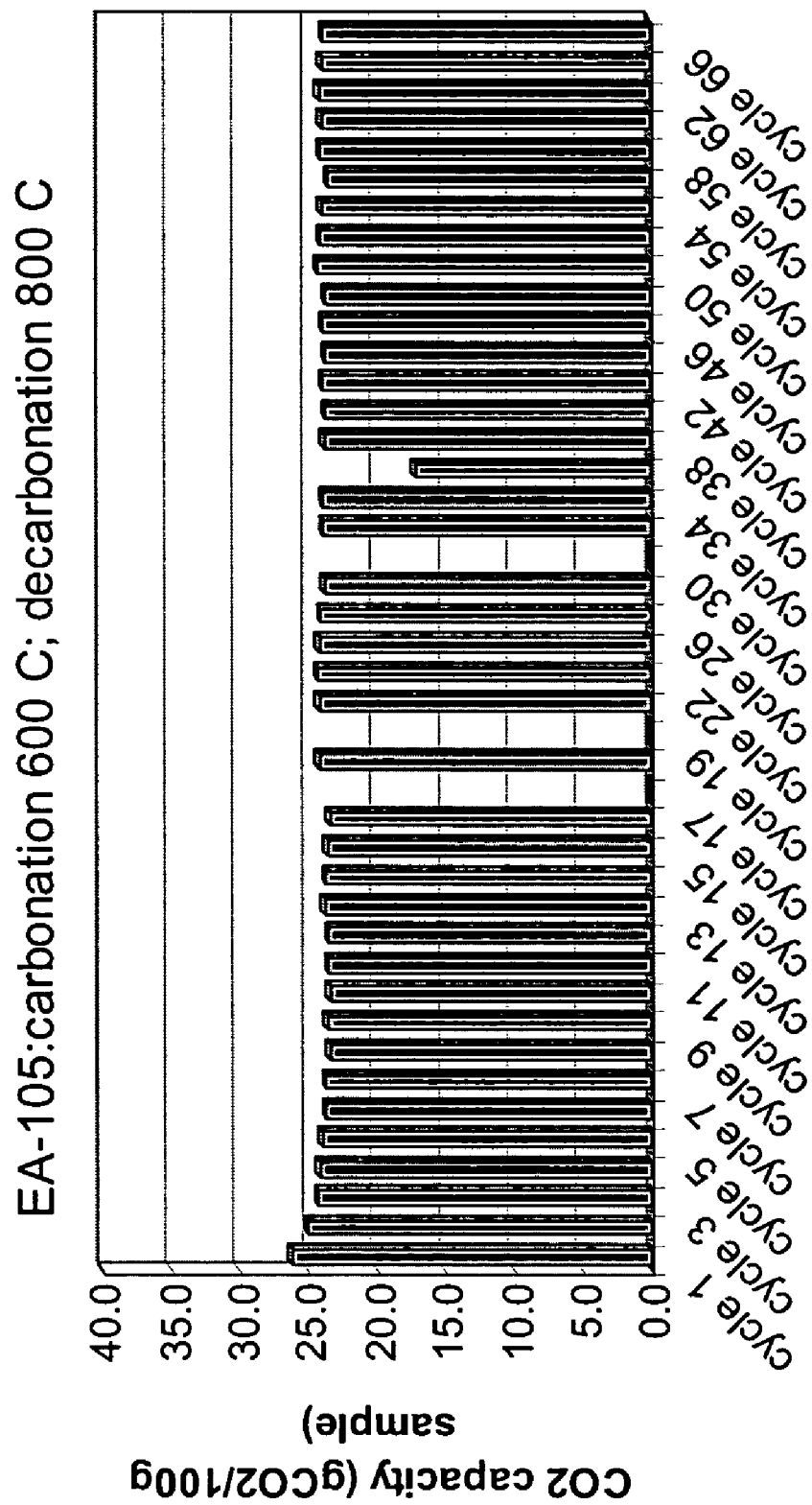
FIG. 58 illustrates the absorption capacity over 66 cycles of pelletized absorbent powders according to the present invention.

FIGS. 57 and 58 illustrate the reactivity and cyclability of extrudate EA-105 made from the powder with CaO:MgO (50:50 wt. ratio) containing 33 mol. % of $CaTiO_3$ followed by post processing at 750° C. FIG. 57 illustrates the CaO reaction fraction over 66 cycles and FIG. 58 illustrates the $CO_2$ capacity for the same cycle tests. Again, the dips in capacity (e.g., at cycles 17, 30 and 38) are due to depletion of the $CO_2$ source.

Figure 59:
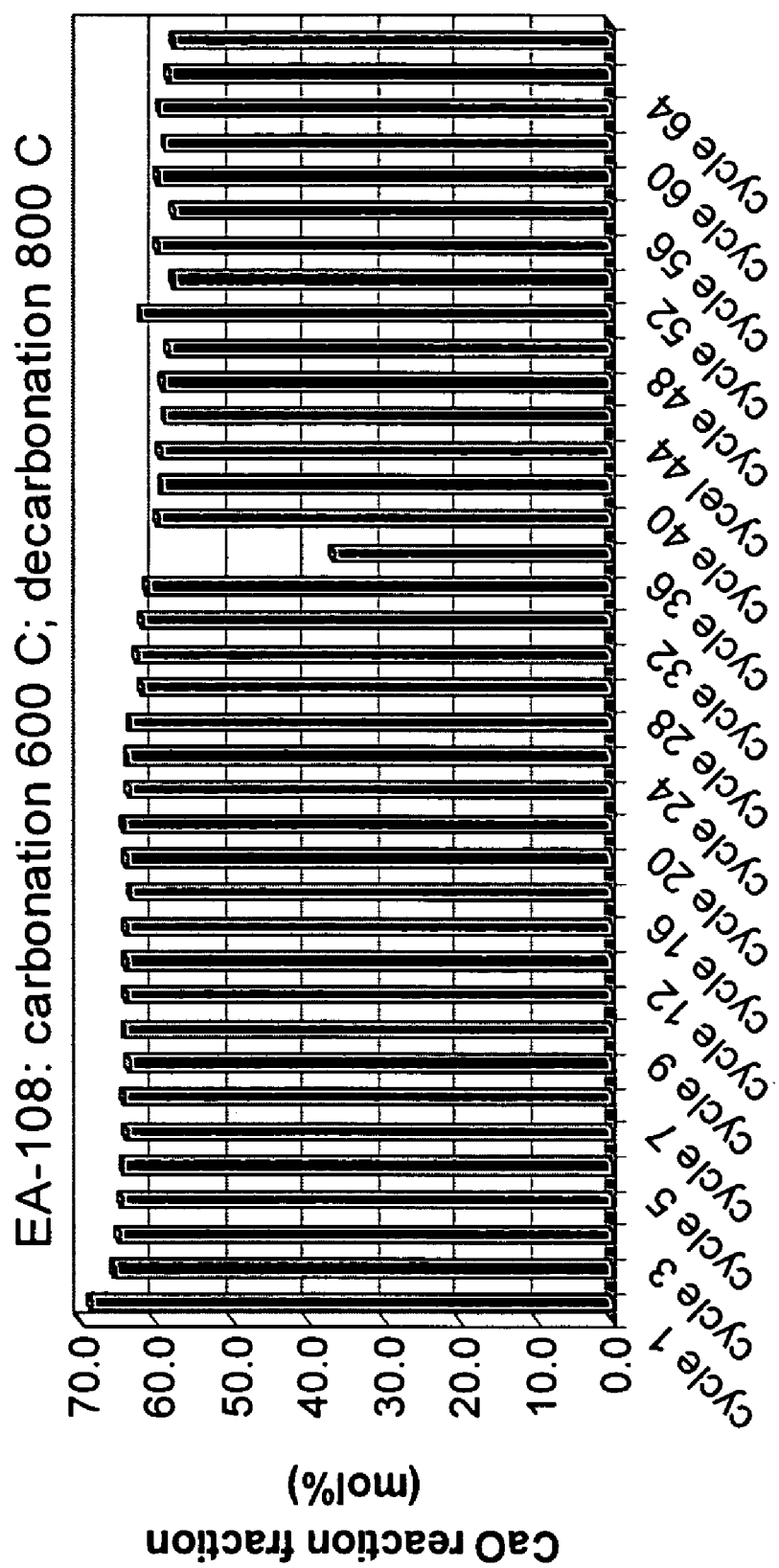
FIG. 59 illustrates the absorption capacity over 64 cycles in terms of CaO reaction fraction of pelletized absorbent powders according to the present invention.
Figure 60:
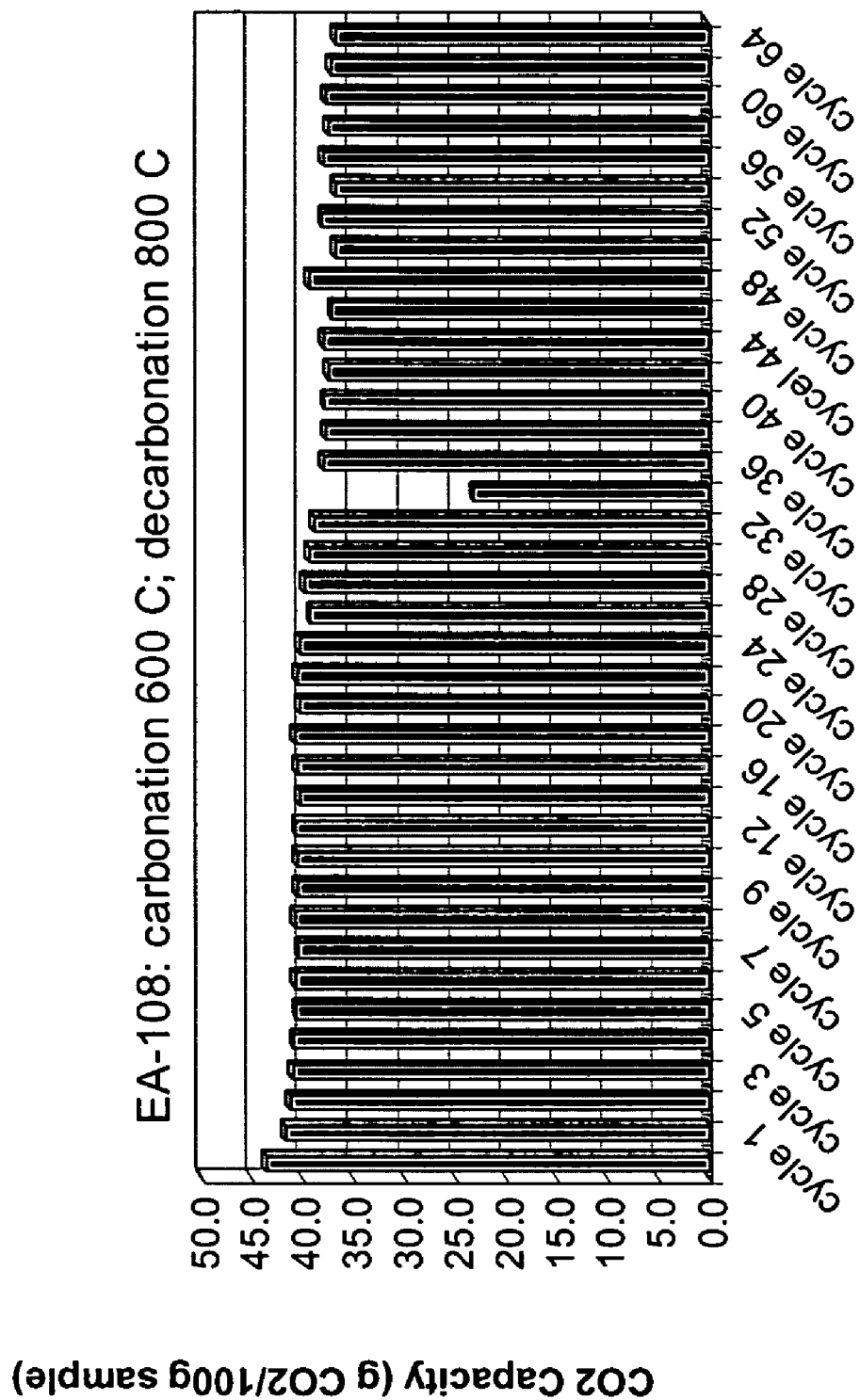
FIG. 60 illustrates the absorption capacity over 64 cycles in terms of CaO reaction fraction of pelletized absorbent powders according to the present invention.

FIGS. 59 and 60 illustrate the cyclability of extrudate EA-108 made from the powder with 10 wt. % $Al_2O_3$ followed by post processing at 750° C. FIG. 59 illustrates the CaO reaction fraction over 64 cycles and FIG. 60 illustrates the $CO_2$ capacity for the same cycle tests.

Figure 61:
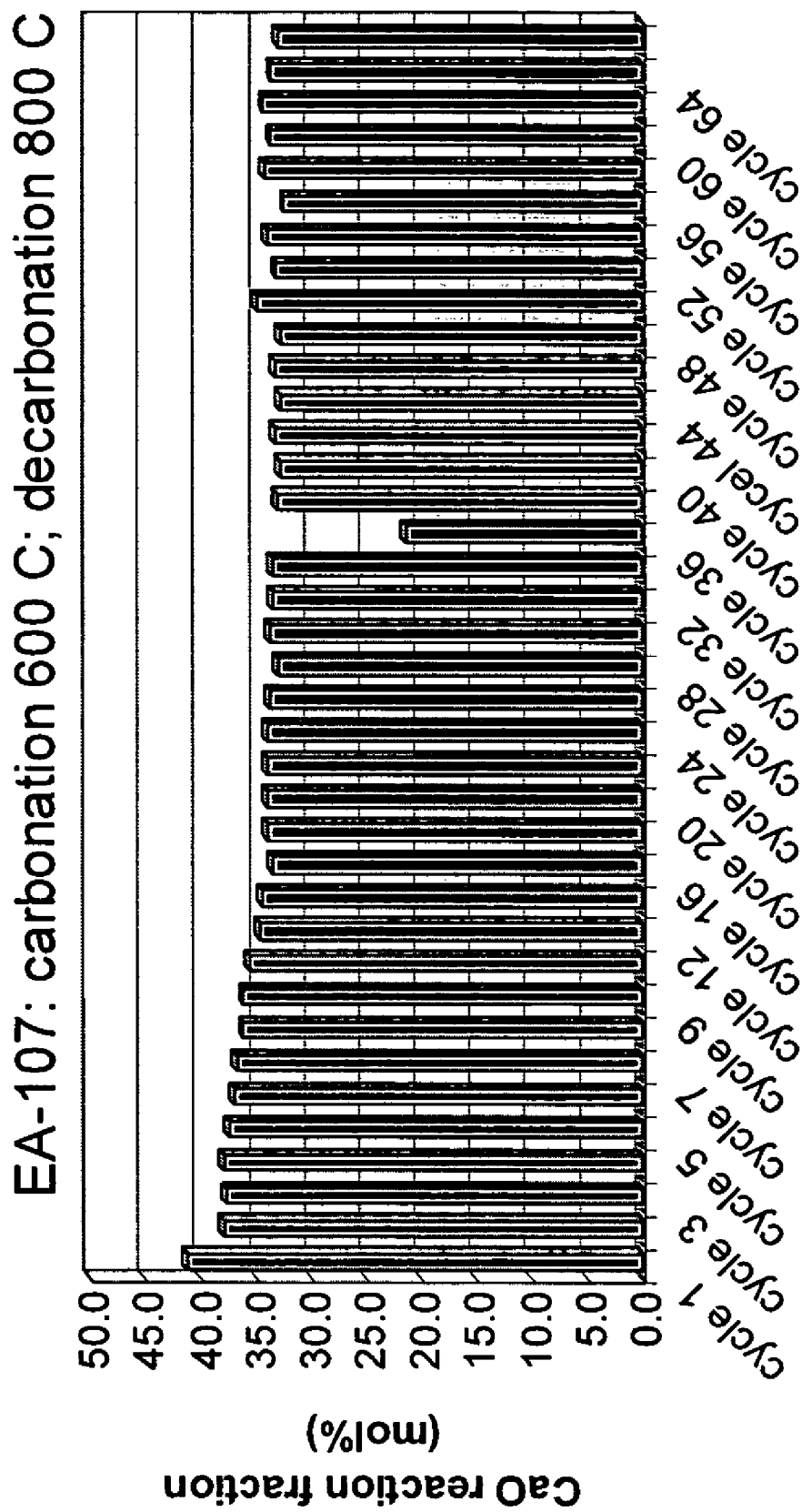
FIG. 61 illustrates the absorption capacity over 64 cycles in terms of CaO reaction fraction of pelletized absorbent powders according to the present invention.

FIG. 61 illustrates the CaO reaction fraction for Extrudate EA-107 made from the powder with 10 wt. % $Al_2O_3$ followed by post processing at 500° C. over 64 cycles.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A particulate absorbent material for the absorption of a chemical species from a fluid, wherein said absorbent material is fabricated by a process comprising the steps of:
   (a) providing a precursor solution comprising at least a first precursor to an absorbent compound selected from Group 1 and Group 2 metal oxides;
   (b) atomizing said precursor solution to form precursor droplets comprising said first precursor;
   (c) heating said precursor droplets remove liquid therefrom and form dried precursor droplets; and (d) converting said dried precursor droplets to a particulate absorbent material comprising said absorbent compound, wherein said particulate absorbent material is adapted to absorb $CO_2$ and has a $CO_2$ mass absorption capacity of at least about 20 grams $CO_2$ per 100 grams unreacted absorbent material.

2. An absorbent material as recited in claim 1, wherein said heating step and said converting step occur sequentially in a spray pyrolysis reactor.

3. An absorbent material as recited in claim 1, wherein said heating step forms an intermediate compound capable of being post-processed to form a particulate absorbent material, and wherein said converting step comprises heating said intermediate compound to form said particulate absorbent material.

4. A particulate absorbent material as recited in claim 1, wherein said first precursor is selected from the group consisting of a metal nitrate, a metal acetate, a metal oxalate and a metal hydroxide.

5. A particulate absorbent material as recited in claim 1, wherein said first precursor comprises a metal oxalate.

6. A particulate absorbent material as recited in claim 1, wherein said absorbent compound comprises a metal oxide selected from the group consisting of magnesium oxide, calcium oxide, strontium oxide and barium oxide.

7. A particulate absorbent material as recited in claim 1, wherein said absorbent compound comprises calcium oxide.

8. A particulate absorbent material as recited in claim 1, wherein said precursor solution comprises a metal salt of a Group 1 or a Group 2 metal selected from the group consisting of a metal oxalate salt and a metal hydroxide salt.

9. A particulate absorbent material as recited in claim 1, wherein said heating step comprises heating said droplets in the presence of an oxygen-containing gas.

10. A particulate absorbent material as recited in claim 1, wherein said precursor solution further comprises a morphology-enhancing agent.

11. A particulate absorbent material as recited in claim 1, wherein said precursor solution further comprises a morphology-enhancing agent selected from the group consisting of lactic acid, glycine, alcohols, ammonium nitrate, polymers and carbohydrazide.

12. A particulate absorbent material as recited in claim 1, wherein said precursor solution further comprises a precursor to a second compound selected from the group consisting of aluminum oxide, magnesium oxide, silicon oxide and titanium oxide.

13. A particulate absorbent material as recited in claim 1, wherein said particulate absorbent material comprises CaO: MgO.

14. A particulate absorbent material as recited in claim 1, wherein said precursor solution further comprises a precursor to magnesium oxide.

15. A particulate absorbent material as recited in claim 1, wherein said precursor solution further comprises magnesium nitrate.

16. A particulate absorbent material as recited in claim 1, wherein said precursor solution further comprises a precursor to alumina.

17. A particulate absorbent material as recited in claim 1, wherein said precursor solution further comprises particulate alumina.

18. A particulate absorbent material as recited in claim 1, wherein said precursor solution further comprises a precursor to a metal selected from the group consisting of Mg, Ni, Zn and Cu.

19. A particulate absorbent material as recited in claim 1, wherein said heating step comprises heating said precursor droplets to a temperature of at least about 300° C.

20. A particulate absorbent material as recited in claim 1, wherein said atomizing step comprises atomizing said precursor solution using a spray nozzle.

21. A particulate absorbent material as recited in claim 1, wherein said atomizing step comprises atomizing said precursor using ultrasonic transducers.

22. A particulate absorbent material as recited in claim 1, wherein said particulate absorbent material has an average size of from about 1 µm to about 50 µm.

23. A particulate absorbent material as recited in claim 1, further comprising the step of pelletizing said particulate absorbent material.

24. A particulate absorbent material as recited in claim 1, further comprising the step of coating said particulate absorbent material on a support structure.

25. A particulate absorbent material as recited in claim 1, wherein said particulate absorbent material has a substantially spherical morphology.

26. A particulate absorbent material as recited in claim 1, further comprising the step of heating said particulate absorbent material.

27. A particulate absorbent material as recited in claim 1, wherein said particulate absorbent material has a pore volume of at least about 0.04 $g/cm^3$.

28. A particulate absorbent material as recited in claim 1, wherein said particulate absorbent material has a pore volume of at least about 0.15 $g/cm^3$.

29. A particulate absorbent material as recited in claim 1, wherein said particulate absorbent material has a surface area of at least about 15 $m^2/g$.

30. A particulate absorbent material as recited in claim 1, wherein said particulate absorbent material has a surface area of at least about 30 $m^2/g$.

31. A particulate absorbent material as recited in claim 1, wherein said absorbent compound maintains said $CO_2$ mass absorption capacity over at least 100 cycles.

32. A particulate absorbent material as recited in claim 1, wherein said absorbent material has a $CO_2$ mass absorption capacity of at least about 30 grams $CO_2$ per 100 grams of unreacted absorbent material.

33. A particulate absorbent material as recited in claim 1, wherein said absorbent compound has a $CO_2$ molar absorption capacity of at least about 70 mol. %.

34. A particulate absorbent material as recited in claim 1, wherein said absorbent compound has a $CO_2$ molar absorption capacity of at least about 90 mol. %.

35. A particulate absorbent material as recited in claim 33, wherein said absorbent compound maintains said $CO_2$ molar absorption capacity over at least 100 cycles.

36. A particulate absorbent material as recited in claim 1, wherein said heating step comprises heating said droplets in a spray dryer.

37. A particulate absorbent material adapted for the absorption of a chemical species from a fluid, wherein said particulate absorbent material comprises an intimate mixture of at least a first absorbent compound selected from Group 1 and Group 2 metal oxides and at least a first metal oxide inert additive that is different than said first absorbent compound, wherein said particulate absorbent material has a surface area of at least about 5 $m^2/g$ and wherein said particulate absorbent material comprises not greater than 50 wt. % metal oxide inert additives.

38. A particulate absorbent material as recited in claim 37, wherein said absorbent compound is a calcium compound.

39. A particulate absorbent material as recited in claim 37, wherein said first metal oxide inert additive is selected from the group consisting of $Al_2O_3$, MgO, $SiO_2$ and $TiO_2$.

40. A particulate absorbent material as recited in claim 37, wherein said particulate absorbent material is in the form of substantially spherical particles.

41. A particulate absorbent material as recited in claim 37, wherein said surface area is at least about 10 $m^2/g$.

42. A particulate absorbent material as recited in claim 37, wherein said surface area is at least about 15 $m^2/g$.

43. A particulate absorbent material as recited in claim 37, wherein said surface area is at least about 30 $m^2/g$.

44. A particulate absorbent material as recited in claim 37, wherein said particulate absorbent material has a pore volume of at least about 0.01 $cm^3/g$.

45. A particulate absorbent material as recited in claim 37, wherein said particulate absorbent material has a pore volume of at least about 0.04 $cm^3/g$.

46. A particulate absorbent material as recited in claim 37, wherein said particulate absorbent material has a pore volume of at least about 0.15 $cm^3/g$.

47. A particulate absorbent material as recited in claim 37, wherein said first metal oxide inert additive comprises from about 1 wt. % to 50 wt. % of said particulate absorbent material.

48. A particulate absorbent material as recited in claim 37, where said first metal oxide inert additive comprises from about 5 wt. % to about 25 wt. % of said particulate absorbent material.

49. A particulate absorbent material as recited in claim 37, wherein said first absorbent compound has an absorption capacity of at least about 50 mol. % for at least one selected chemical species.

50. A particulate absorbent material as recited in claim 37, wherein said first absorbent compound has an absorption capacity of at least about 70 mol. % for at least one selected chemical species.

51. A particulate absorbent material as recited in claim 37, wherein said first absorbent compound has an absorption capacity of at least about 90 mol. % for at least one selected chemical species.

52. A particulate absorbent material as recited in claim 37, wherein said first absorbent compound has an absorption capacity of at least about 50 mol. % for at least one selected chemical species after at least 100 cycles.

53. A particulate absorbent material as recited in claim 37, wherein said first absorbent compound has an absorption capacity of at least about 70 mol. % for at least one selected chemical species after at least 100 cycles.

54. A particulate absorbent material as recited in claim 37, wherein said first absorbent compound has an absorption capacity of at least about 90 mol. % for at least one selected chemical species after at least 100 cycles.

55. A particulate absorbent material as recited in claim 37, wherein said particulate absorbent material is pelletized.

* * * * *